United States Patent
Takahashi et al.

(10) Patent No.: US 7,433,102 B2
(45) Date of Patent: Oct. 7, 2008

(54) REPRODUCTION COLOR PREDICTION APPARATUS AND METHOD

(75) Inventors: Kosei Takahashi, Kanagawa (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 693 days.

(21) Appl. No.: 10/974,888

(22) Filed: Oct. 28, 2004

(65) Prior Publication Data

US 2005/0083346 A1    Apr. 21, 2005

Related U.S. Application Data

(63) Continuation of application No. PCT/JP03/05776, filed on May 8, 2003.

(30) Foreign Application Priority Data

| May 10, 2002 | (JP) | ............................... 2002-136138 |
| May 10, 2002 | (JP) | ............................... 2002-136139 |
| Jul. 30, 2002 | (JP) | ............................... 2002-221825 |
| Jul. 30, 2002 | (JP) | ............................... 2002-221826 |

(51) Int. Cl.
*G03F 3/08* (2006.01)
*H04N 1/46* (2006.01)
*H04N 1/60* (2006.01)
*G09G 5/02* (2006.01)
*G06K 9/00* (2006.01)

(52) U.S. Cl. .......................... 358/518; 358/504; 358/1.9; 358/3.23; 345/600; 345/604; 345/605; 382/162; 382/167

(58) Field of Classification Search .................. 358/1.9, 358/518, 504, 3.23; 356/402, 425; 706/1, 706/13–14; 382/156, 162, 167; 345/600, 345/604–605

See application file for complete search history.

(56) References Cited

U.S. PATENT DOCUMENTS

| 5,742,296 | A | 4/1998 | Yamada et al. | ............... 345/431 |
| 5,915,076 | A | 6/1999 | Sugita | ........................ 395/109 |

(Continued)

FOREIGN PATENT DOCUMENTS

EP    0 763 929 A1    3/1997

(Continued)

*Primary Examiner*—Edward L. Coles
*Assistant Examiner*—Charlotte M Baker
(74) *Attorney, Agent, or Firm*—Fitzpatrick, Cella, Harper & Scinto

(57) ABSTRACT

A primary color dot gain correction unit corrects the spectral reflectance of each of a plurality of color agents on the basis of the dot quantity set for each color agent. An initial estimated value calculator estimates a mixed color by the KM theory using spectral reflectance data corrected by the primary color dot gain correction unit. An ink overlap correction coefficient storage unit stores correction coefficients, which are determined on the basis of errors between the actually measured values of spectral reflectance data of color patches obtained using the plurality of color agents, and estimated values estimated by the initial estimated value calculator based on the dot quantities of the respective color agents on the color patches. An ink overlap correction unit obtains the prediction result of a reproduction color by correcting the spectral reflectance data of the mixed color calculated by the initial estimated value calculator on the basis of the correction coefficients stored in the ink overlap correction coefficient storage unit.

9 Claims, 38 Drawing Sheets

U.S. PATENT DOCUMENTS

| | | | |
|---|---|---|---|
| 5,929,906 A | 7/1999 | Arai et al. | 348/223 |
| 5,933,252 A | 8/1999 | Emori et al. | 358/500 |
| 6,052,195 A * | 4/2000 | Mestha et al. | 356/425 |
| 6,061,153 A | 5/2000 | Sugita | 358/518 |
| 6,072,464 A | 6/2000 | Ozeki | 345/154 |
| 6,081,796 A * | 6/2000 | Takagi et al. | 706/1 |
| 6,342,952 B1 * | 1/2002 | Chan | 358/1.9 |
| 6,343,137 B1 | 1/2002 | Kimura et al. | 382/100 |
| 6,504,960 B2 | 1/2003 | Takahashi | 382/305 |
| 6,642,930 B1 | 11/2003 | Matsuura et al. | 345/601 |
| 6,738,168 B1 | 5/2004 | Usui et al. | 358/520 |
| 2002/0012461 A1 | 1/2002 | MacKinnon et al. | 382/164 |
| 2002/0044292 A1 | 4/2002 | Yamada et al. | 358/1.9 |
| 2002/0060803 A1 | 5/2002 | Iida et al. | 358/1.13 |
| 2002/0071605 A1 | 6/2002 | Iida et al. | 382/165 |
| 2002/0113880 A1 | 8/2002 | Iida et al. | 348/222 |
| 2003/0020727 A1 | 1/2003 | Newman | 345/604 |
| 2003/0048464 A1 | 3/2003 | Yamada et al. | 358/1.9 |
| 2003/0142222 A1 | 7/2003 | Hordley | 348/223.1 |
| 2003/0142377 A1 | 7/2003 | Yamada et al. | 358/521 |
| 2003/0161530 A1 | 8/2003 | Yamada et al. | 382/167 |
| 2003/0202194 A1 | 10/2003 | Torigoe et al. | 358/1.9 |
| 2003/0210395 A1 | 11/2003 | Takahashi et al. | 356/405 |
| 2003/0219155 A1 * | 11/2003 | Azuma et al. | 382/156 |
| 2003/0234931 A1 * | 12/2003 | Sano et al. | 356/402 |

FOREIGN PATENT DOCUMENTS

| | | |
|---|---|---|
| EP | 1 054 560 A2 | 11/2000 |
| EP | 1 096 787 A2 | 5/2001 |
| JP | 63-32313 | 2/1988 |
| JP | 2-241271 | 9/1990 |
| JP | 5-296836 | 11/1993 |
| JP | 6-189122 | 7/1994 |
| JP | 8-94440 | 4/1996 |
| JP | 8-107508 | 4/1996 |
| JP | 9-33347 | 2/1997 |
| JP | 9-120185 | 5/1997 |
| JP | 9-163382 | 6/1997 |
| JP | 10-262157 | 9/1998 |
| JP | 2001-8047 | 1/2001 |
| JP | 2001-53976 | 2/2001 |
| JP | 2001-128020 | 5/2001 |
| JP | 2001-186364 | 7/2001 |
| JP | 2002-098590 | 4/2002 |
| JP | 2002-136138 | 5/2002 |
| JP | 2002-136139 | 5/2002 |
| JP | 2002-221825 | 8/2002 |
| JP | 2002-221826 | 8/2002 |
| JP | 2002-290756 | 10/2002 |
| JP | 2002-365133 | 12/2002 |
| JP | 2003-169224 | 6/2003 |
| WO | WO 03/095212 | 11/2003 |

* cited by examiner

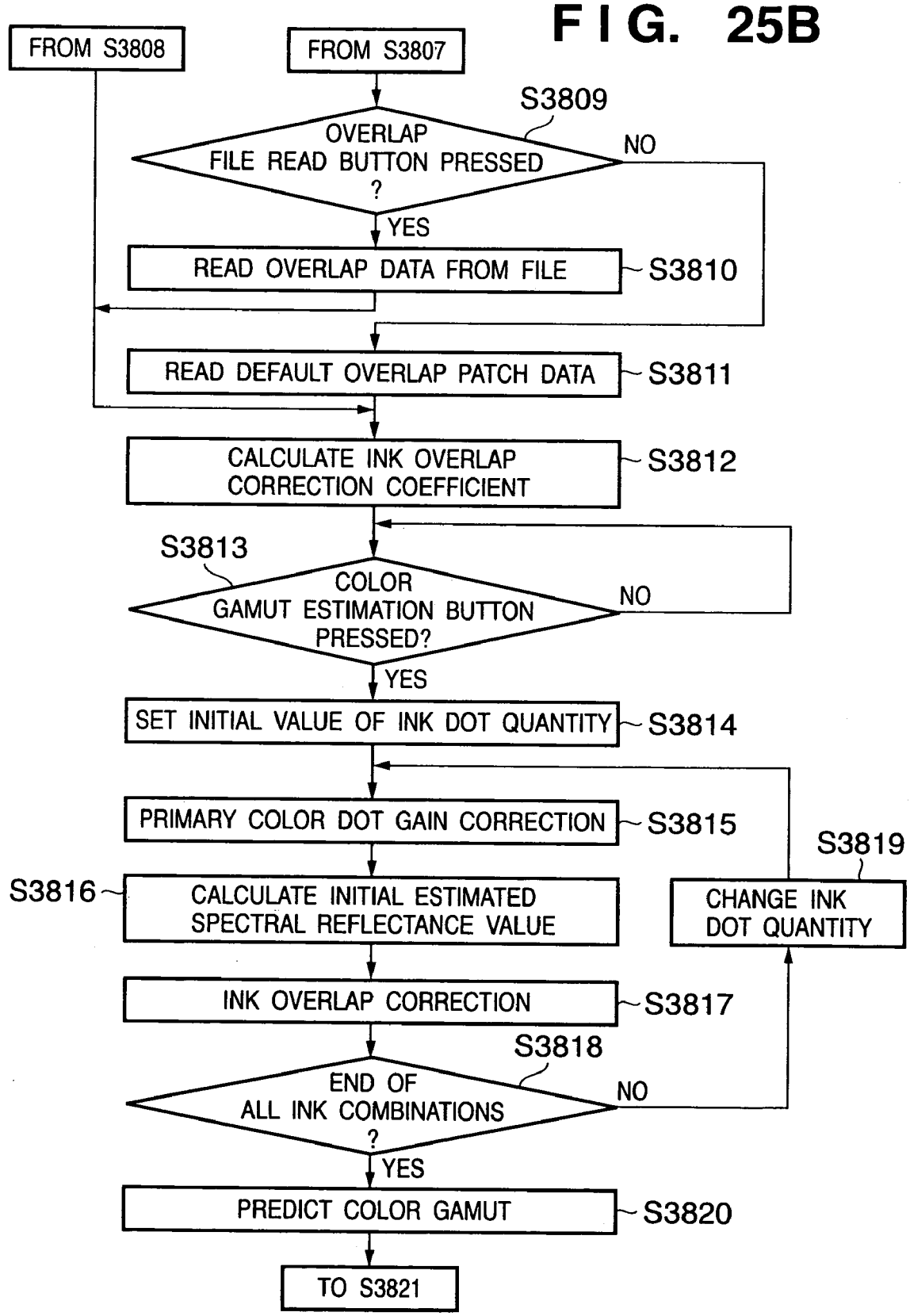

CLIENT SIDE          SERVER SIDE

REPRODUCTION COLOR PREDICTION APPARATUS AND METHOD

CROSS REFERENCE TO RELATED APPLICATION

This is a Continuation of Application No. PCT/JP03/05776 filed on May 8, 2003, and published in English as International Publication No. WO 03/095212 A1 on Nov. 20, 2003, the priority of which is claimed herein (35 U.S.C. § 120) and which claims priority of Japanese Application No. 2002-136138 filed May 10, 2002, Japanese Application No. 2002-136139 filed May 10, 2002, Japanese Application No. 2002-221825 filed Jul. 30, 2002 and Japanese Application No. 2002-221826, filed Jul. 30, 2002, the priorities of which are also claimed herein (35 U.S.C. § 119). International Application No. PCT/JP03/05776 is incorporated by reference herein in its entirety, as if fully set forth herein.

TECHNICAL FIELD

The present invention relates to a technique for predicting colors reproduced by a multi-color reproduction process using specific color inks, e.g., a multi-color print process or a multi-color print using a color printer, i.e., reproduction colors.

The present invention also relates to a method of predicting a possible color reproduction range, i.e., a color gamut, on the basis of the predicted reproduction colors.

The present invention relates to an information processing apparatus, system, and method, which customize an optimal ink set required for the user to obtain a desired color reproduction result on the basis of the predicted reproduction colors.

BACKGROUND ART

As a conventional method of predicting reproduction colors of an image generated by subtractive color mixing (e.g., a print process), reproduction color prediction using a lookup table (to be abbreviated as an LUT hereinafter) disclosed in Japanese Patent Laid-Open No. 2001-053976, and a reproduction color prediction method using the Kubelka-Munk theory (to be abbreviated as a KM theory hereinafter) disclosed in Japanese Patent Laid-Open No. 09-120185 are known.

In reproduction color prediction using an LUT, a large number of patches formed by changing step by step the dot quantity of ink used in a print process are output, and the obtained colorimetric data are geometrically laid out on a color space such as CIELAB, as shown in FIG. 10 (each vertex of cubes shown in FIG. 10 stores a colorimetric value and the dot quantity of each ink in correspondence with each other). After that, an ink dot quantity corresponding to a desired tristimulus value (a point indicated by an open circle in FIG. 10) is interpolated on the basis of the geometrical layout with neighboring existing points (points indicated by full circles in FIG. 10), thus calculating a desired dot quantity.

The KM theory examines I, ΔI, J, and ΔJ with respect to infinitesimal thickness dx in ink, as shown in FIG. 11, and calculates reflectance (J/I) by solving:

$$dI = -(S+K)Idx + SJdx \quad (1)$$

$$dJ = (S+K)Jdx - SIdx \quad (2)$$

S: scattering coefficient of ink
K: absorption coefficient of ink

In reproduction color prediction using an LUT, the number N of patches that must be output to generate an LUT is given by:

$$N = \left(\frac{100}{P} + 1\right)^I \quad (3)$$

N: number of patches to be output
P: interval (%) upon changing dot quantity
I: number of inks used Therefore, when interval P upon changing the dot quantity is decreased or when the number I of inks used upon executing a print process using multi-color inks is increased to improve the prediction precision, the number N of patches to be output increases exponentially, resulting in huge cost of output and colorimetry.

The KM theory predicts reproduction colors when a coloring material such as ink is applied to have a uniform thickness. Therefore, when a print process is made using an area-modulation printer shown in FIG. 12, a mechanical dot gain (a phenomenon that the effective area ratio becomes larger than the theoretical area ratio due to physical spread of ink) and an optical dot gain (a phenomenon that an actual dot looks larger than its original area due to scattering of light in ink or paper) which occurs at the boundaries between portions with and without ink cannot be precisely predicted.

For example, the reproduction color-prediction method of Japanese Patent Laid-Open No. 09-120185 expands the KM theory to apply it to an actual printer, and predicts reproduction colors by independently modeling a portion where a plurality of inks mix, and a portion where a plurality of inks overlap each other. However, since this method does not consider the influence of an optical dot gain, it cannot implement precise reproduction color prediction.

A general color print is printed by a process print method, which uses a total of four color inks (C, M, Y, and. K), i.e., three color inks cyan, magenta, and yellow that are generated from a color document via three-primary color separation, and black. When an identical image is to be printed in large quantity like those of magazines, posters, and the like, a print process is made by adding several different special color inks suited to that original image, thus realizing delicate color appearance and the color gamut that cannot be reproduced by the process print. For example, upon developing an ink-jet or laser printer, C, M, Y, and K inks are normally used. However, C, M, Y, and K inks of various characteristics are available, and many companies have addressed development of inks with higher quality. A technique that adds another ink in addition to the C, M, Y, and K inks, and prints using five or more inks has been studied. In order to improve such ink development efficiency, it is demanded to automatically optimize inks.

For this purpose, recently, a method of automatically and precisely making color separation into respective plates upon using special color inks has been developed. For example, Japanese Patent Laid-Open No. 2001-053976 discloses a special color color-separation method for separating an original image into Y, M, and C plates and a special color plate. On the other hand, as a technique for improving the color reproduction precision, a spectral color reproduction technique that matches spectral distributions themselves in addition to the tristimulus values of colors has been disclosed in Japanese Patent Laid-Open No. 05-296836. In this way, in order to precisely reproduce a target color, there are two different approaches, i.e., a method of using a special color ink (special color color-separation method) and a method of making spectral distribution characteristics as closer as possible although conventional inks are used (spectral color reproduction).

The conventional special color color-separation method makes color separation for given C, M, Y, and K inks and special color ink. For example, Japanese Patent Laid-Open No. 2001-053976 requires colorimetric data of the special color ink for color separation, and is premised on the use of the special color ink manually selected in advance. However, as for a selection method of inks themselves, i.e., a method that specifies combinations of inks which allow optimal color reproduction, no clear method is established yet. For this reason, a skillful engineer selects special color ink by trial and error in practice.

On the other hand, in spectral color reproduction, a spectral distribution is made closer to that of a target color using given inks so as to realize color reproduction closest to the target color. However, it is impossible for spectral approximation to reproduce spectral distribution characteristics of a target image or color using given inks alone. Furthermore, no technique that specifies inks of spectral distribution characteristics that can reproduce those of a target color/image is available.

As described above, a printer as an image output apparatus normally outputs an image using C, M, Y, and K inks (or toners) if it is a four-color printer. A six-color printer outputs an image using two light inks or special color inks in addition to the above four colors. Note that the color gamut of the printer is determined by the colors of color agents such as inks, toners, and the like.

In general, as a method of measuring the color gamut of an image generated by subtractive color mixing (e.g., a print process), for example, a method of approximating the color gamut using a polynomial of higher degree, as disclosed in Japanese Patent Publication No. 63-32313, a method of approximating the color gamut using a neural network, as disclosed in Japanese Patent Laid-Open No. 2-241271, and the like can be used. Also, a method of generating a device model using a method of generating a plurality of patches and predicting the color gamut using the weighted mean of colorimetry results of these patches is available, as disclosed in Japanese Patent Laid-Open No. 10-262157.

As described above, Japanese Patent Laid-Open No. 09-120185 describes the color reproduction prediction method using the KM theory.

However, the aforementioned polynomial of higher degree, neural network, and device model based on the weighted mean normally requires a huge number of patches to attain gamut prediction with higher precision. The KM theory cannot precisely predict a mechanical or optical dot gain if a print process is made using an area-modulation printer, as shown in FIGS. 11 and 12.

As described above, upon printing an identical image in large quantity like those on magazines, posters, and the like, a print process is made by adding several different special color inks suited to that original image so as to reproduce delicate color appearance or the color gamut that cannot be reproduced by process print. Recently, a method of automatically and precisely making color separation into respective plates upon using special color inks has been developed. For example, Japanese Patent Laid-Open No. 2001-053976 discloses a special color color-separation method for separating an original image into Y, M, and C plates and a special color plate.

As described above, as for a selection method of inks themselves, i.e., a method that specifies combinations of inks which allow optimal color reproduction, no clear method is established yet. For this reason, a skillful engineer selects special color ink by trial and error in practice.

Upon reproducing a color which cannot be reproduced by conventional inks, it is difficult to estimate the characteristics of inks to be used.

DISCLOSURE OF INVENTION

The present invention has been proposed to solve the aforementioned problems, and has as its object to allow high-precision reproduction color prediction.

It is another object of the present invention to allow reproduction color prediction that takes the influence of a mechanical or optical dot gain into consideration.

It is still another object of the present invention to allow easy selection of appropriate color agents and their dot quantities so as to precisely reproduce a target color.

It is still another object of the present invention to allow high-precision color gamut prediction that can precisely predict a reproduction color to be reproduced using color agents.

It is still another object of the present invention to automatically set color agents required to reproduce a target color.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 25A to 25C are flow charts for explaining a color gamut prediction of the sixth embodiment;

BEST MODE OF CARRYING OUT THE INVENTION

Preferred embodiments of the present invention will now be described in detail in accordance with the accompanying drawings.

First Embodiment

<Arrangement of Reproduction Color Prediction Apparatus>

Figure 1:
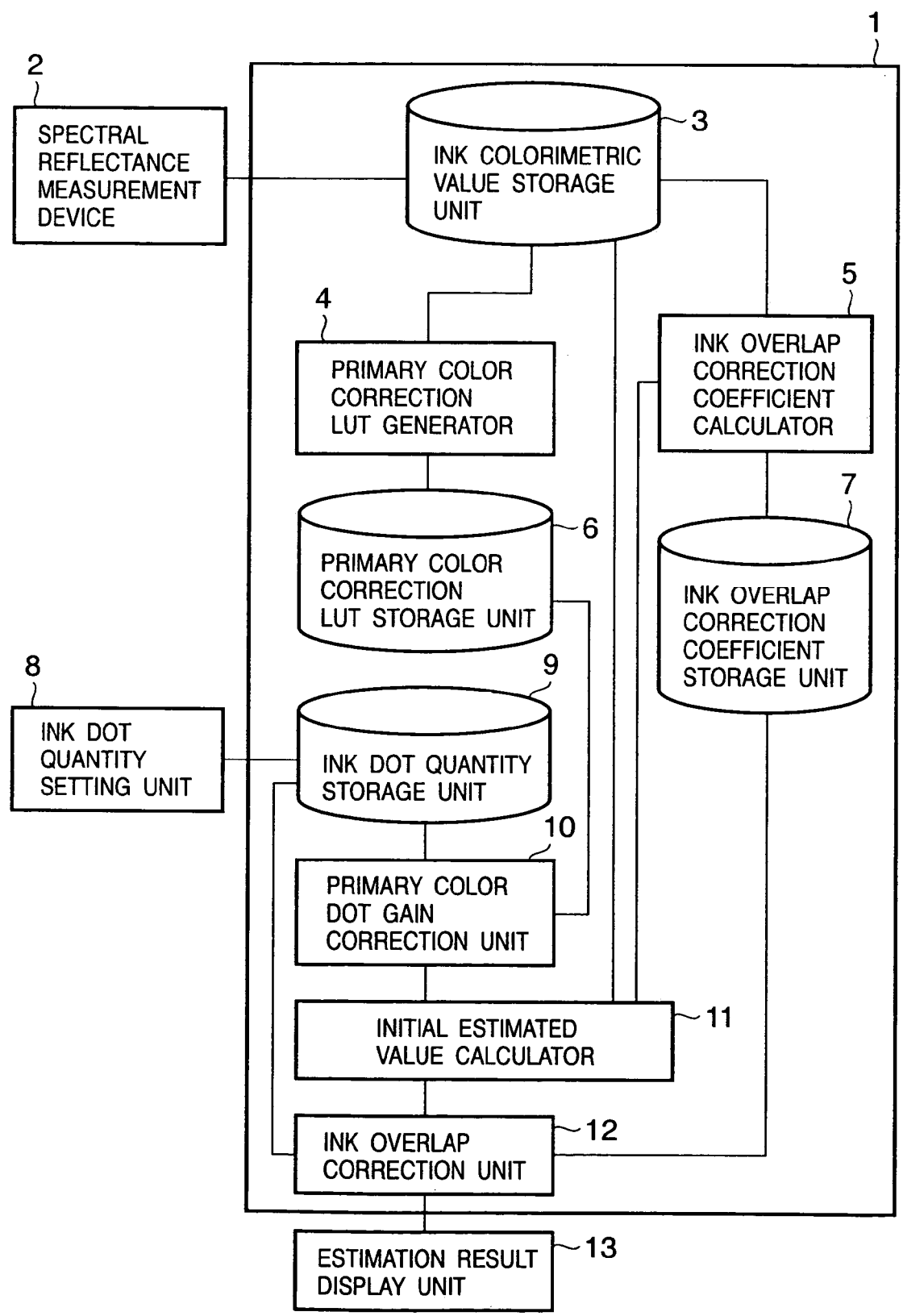
FIG. 1 is a block diagram showing the arrangement of a reproduction color prediction apparatus according to the first embodiment.

FIG. 1 is a block diagram showing the arrangement of a reproduction color prediction apparatus according to an embodiment of the present invention. Reference numeral 1 denotes a reproduction color prediction apparatus according to the first embodiment. Reference numeral 2 denotes a spectral reflectance measurement device for measuring printer characteristics. In this embodiment, the spectral reflectance measurement device 2 is used to measure the spectral reflectance characteristics of color patches (to be described later using FIGS. 3 and 5) output by a printer, used in the embodiment. Reference numeral 3 denotes an ink calorimetric value storage unit which stores the spectral reflectance data of inks measured by the spectral reflectance measurement device 2. The ink calorimetric value storage unit 3 stores primary color and ink overlap colorimetric values. Note that this embodiment uses a plurality of color inks as recording agents, but a plurality of color toners may be used.

Reference numeral 4 denotes a primary color correction LUT generator for generating a primary color correction LUT using the primary color calorimetric values stored in the ink colorimetric value storage unit 3. Reference numeral 6 denotes a primary color correction LUT storage unit which stores the primary color correction LUT generated by the primary color correction LUT generator 4. Reference numeral 5 denotes an ink overlap correction coefficient calculator which calculates ink overlap correction coefficients on the basis of the ink overlap colorimetric values stored in the ink colorimetric value storage unit 3. Reference numeral 7 denotes an ink overlap correction coefficient storage unit which stores the ink overlap correction coefficients calculated by the ink overlap correction coefficient calculator 5. Processes using the primary color LUT generator 4 and ink overlap correction coefficient calculator 5 will be described in detail later.

Reference numeral 8 denotes an ink dot quantity setting unit. The user sets ink dot quantities using this unit. Reference numeral 9 denotes an ink dot quantity storage unit which stores the ink dot quantities set by the ink dot quantity setting unit 8. Reference numeral 10 denotes a primary color dot gain correction unit which makes primary color correction in correspondence with the ink dot quantities stored in the ink dot quantity storage unit 9 (the reason why this embodiment uses a term "primary color-correction" is that the general KM theory uses a concept that a parameter (K/S) linearly changes with respect to the dot quantity, and does not consider any influences of nonlinearity of a dot gain, but this embodiment nonlinearly corrects this dot gain. That is, this nonlinear correction will be referred to as primary color dot gain correction). Reference numeral 11 denotes an initial estimated value calculator, which calculates an initial estimated value of spectral reflectance (initial estimated spectral reflectance value) of a mixed color using the above ink dot quantities.

Reference numeral 12 denotes an ink overlap correction unit which corrects the initial estimated spectral reflectance value calculated by the initial estimated value calculator 11 using the ink overlap correction coefficients stored in the ink overlap correction coefficient storage unit 7, and the ink dot quantities stored in the ink dot quantity storage unit 9 to obtain an estimation result (final estimation result) of spectral reflectance of the mixed color obtained by the above ink dot quantities. Reference numeral 13 denotes an estimation result display unit which displays the final estimation result of the spectral reflectance corrected by the ink overlap correction unit 12. The estimation result display unit 13 can use a display such as a CRT, LCD, or the like.

<Reproduction Color Prediction Process>

A reproduction color prediction process of the reproduction color prediction apparatus with the above arrangement will be described below.

Figure 2:
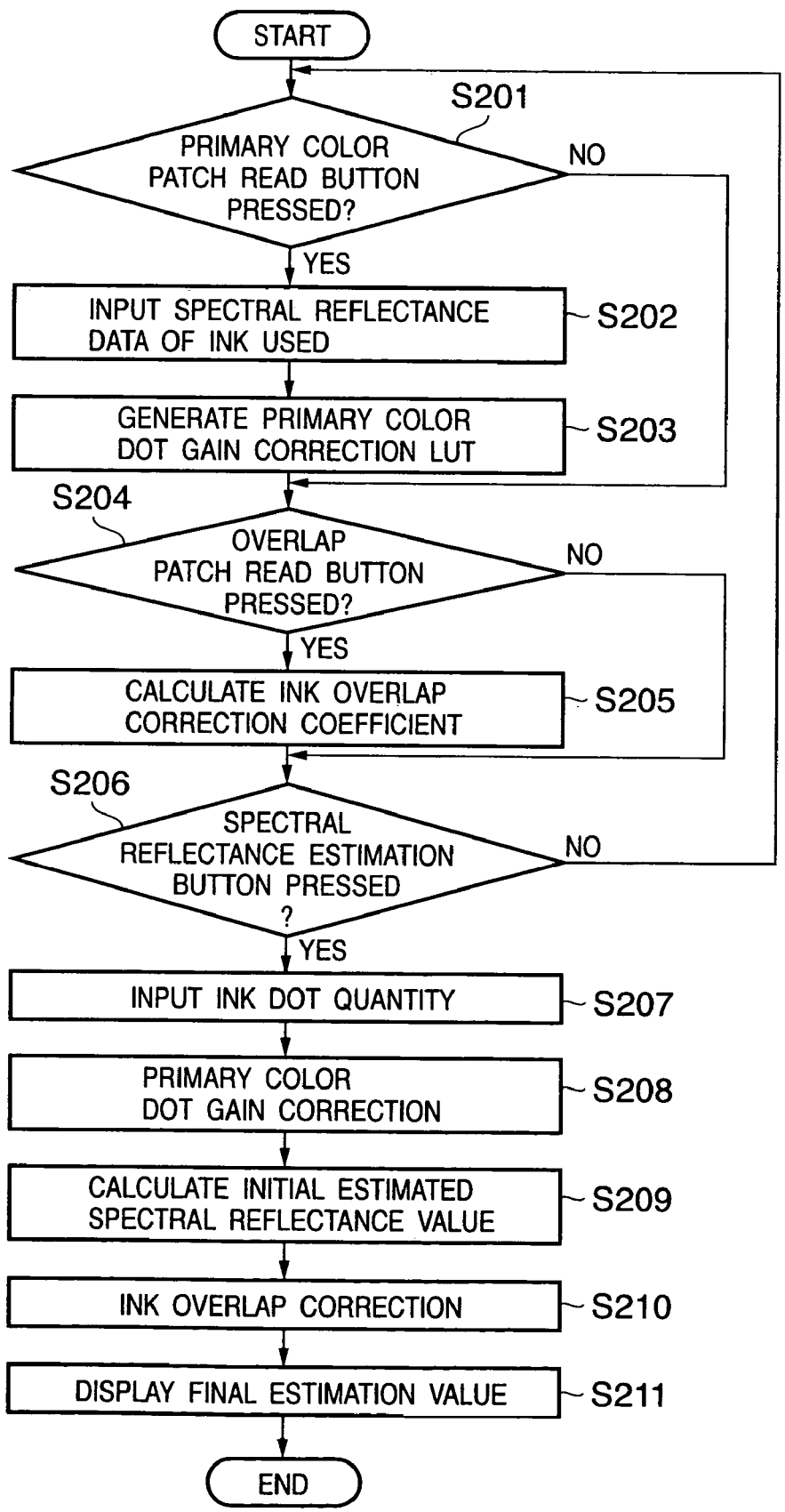
FIG. 2 is a flow chart for explaining a reproduction color prediction process in the reproduction color prediction apparatus of the first embodiment.
Figure 6:
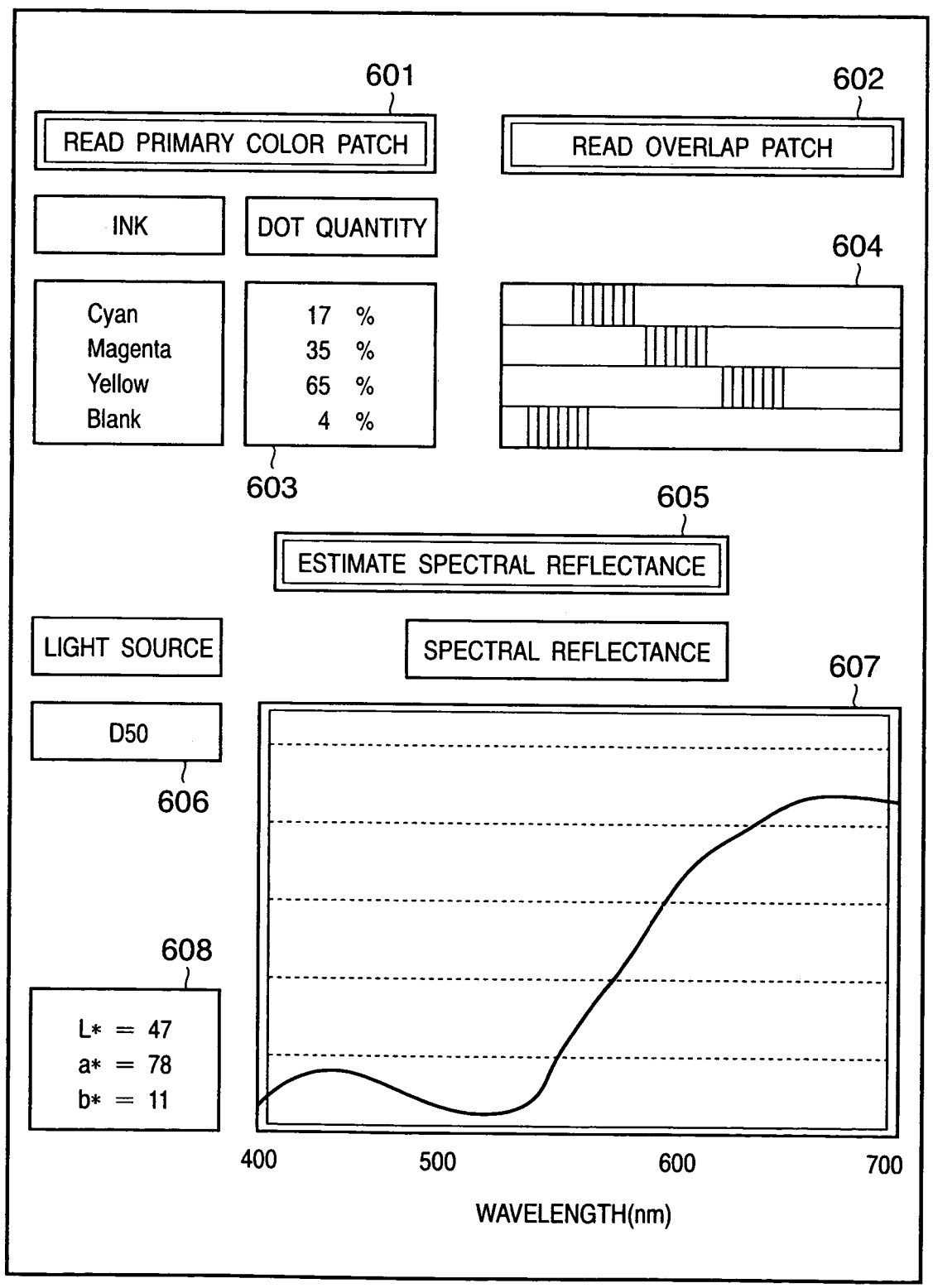
FIG. 6 shows an example of a user interface according to the first embodiment.

FIG. 2 is a flow chart showing a reproduction color prediction process executed by the reproduction color prediction apparatus 1. FIG. 6 shows an example of a user interface used to set ink dot quantities using the ink dot quantity setting unit 8 and to display the estimation result by the estimation result display unit 13. The reproduction color prediction process according to the first embodiment will be described in detail below using the accompanying drawings. Note that the user interface of this embodiment displays a window shown in FIG. 6 on the display, and instructions are made by operating the cursor using a pointing device. Alternatively, various other known input devices such as a touch panel and the like may be used.

It is checked in step S201 if the user has pressed (clicked) a primary color patch read button 601. If YES in step S201, the flow advances to step S202; otherwise, the flow jumps to step S204. In the process executed when the primary color patch read button 601 has been pressed, sample patches (details will be described later) generated using inks to be used are measured using the spectral reflectance measurement device 2, and the obtained colorimetric values are stored in the ink colorimetric value storage unit 3 in step S202. The flow advances to step S203, the primary color correction LUT generator 4 reads the primary color calorimetric values stored in the ink colorimetric value storage unit 3, calculates a primary color correction LUT (its details will be described later in <Generation of Primary Color Dot Gain Correction LUT>), and stores it in the primary color correction LUT storage unit 6.

It is checked in step S204 if the user has pressed an overlap patch read button 602. If YES in step S204, the flow advances to step S205; otherwise, the flow advances to step S206. If the overlap patch read button 602 has been pressed, the ink overlap correction coefficient calculator 5 calculates ink overlap correction coefficients, and stores them in the ink overlap correction coefficient storage unit 7 in step S205. Note that the ink overlap correction coefficients are used to correct the estimated values calculated by the initial estimated value calculator 11, and are calculated on the basis of errors between the estimated spectral reflectance values of overlap patches calculated by the initial estimated value calculator 11, and actually measured spectral reflectance values of that overlap patches. Details of this calculation process will be described later in <Calculation of Ink Overlap Correction Coefficient>.

It is checked in step S206 if the user has pressed a spectral reflectance estimation button 605. If YES in step S206, the flow advances to step S207; otherwise, the flow returns to step S201. If the spectral reflectance estimation button 605 has been pressed, processes in subsequent steps S207 to S211 are executed.

In step S207, the ink dot quantities set by the user are acquired via the ink dot quantity setting unit 8, and are stored in the ink dot quantity storage unit 9. The ink dot quantity setting unit 8 provides a user interface which includes a numerical value input area 603 and slide bars 604 shown in, e.g., FIG. 6, and prompts the user to set desired ink dot quantities. The user can designate dot quantities of respective colors (cyan, magenta, yellow, and black) by numerical values using the numerical value input area 603 or using the slide bars 604.

In step S208, the primary color dot gain correction unit 10 corrects primary color dot gains using the ink dot quantities stored in the ink dot quantity storage unit 9 and the primary color correction LUT (to be described in detail later in <Generation of Primary Color Dot Gain Correction LUT>) stored in the primary color correction LUT storage unit 6, and calculates spectral reflectance values corresponding to the respective ink dot quantities.

In step S209, the initial estimated value calculator 11 predicts a mixed color based on the spectral reflectance values of inks calculated by the primary color dot gain correction unit 10 using the KM theory given by:

$$\left(\frac{K}{S}\right)_{i,\lambda} = \frac{(R_{i,\lambda} - 1)^2}{(2 \cdot R_{i,\lambda})} \quad (4)$$

$$\left(\frac{K}{S}\right)_{MIX,\lambda} = \left(\frac{K}{S}\right)_{Paper,\lambda} + \sum_{i=1}^{n} \left(\frac{K}{S}\right)_{i,\lambda} \quad (5)$$

$$R_{MIX,\lambda} = 1 + \left(\frac{K}{S}\right)_{MIX,\lambda} - \sqrt{\left(\frac{K}{S}\right)^2_{MIX,\lambda} + 2 \cdot \left(\frac{K}{S}\right)_{MIX,\lambda}} \quad (6)$$

K: absorption coefficient
S: scattering coefficient
$(K/S)_{i,\lambda}$: (K/S) of ink i at wavelength $\lambda$
$(K/S)_{MIX,\lambda}$: (K/S) at wavelength $\lambda$ after inks are mixed
$(K/S)_{Paper,\lambda}$: (K/S) of paper at wavelength $\lambda$
$R_{i,\lambda}$: spectral reflectance of ink i at wavelength $\lambda$
$R_{MIX,\lambda}$: spectral reflectance at wavelength $\lambda$ after inks are mixed In this way, since the mixed color is predicted based on the KM theory using the output values from the primary color dot gain correction unit, the mixed color that reflects corrected dot gains can be predicted. More specifically, in this embodiment, the dot gain of primary color (printed using only one color ink) and that of secondary or higher color (printed when a plurality of inks overlap each other) are independently considered, and dot gain correction in this case indicates the primary color dot gain alone. The dot gain of secondary or higher color will be considered in ink overlap correction.

In step S210, the ink overlap correction unit 12 corrects the initial estimated spectral reflectance value estimated by the initial estimated value calculator 11 using the ink overlap correction coefficients (to be described in detail later) stored in the ink overlap correction coefficient storage unit 7, and calculates a final estimation result of the spectral reflectance (to be referred to as a spectral reflectance final estimation result).

In step S211, the estimation result display unit 13 displays the spectral reflectance final estimation result calculated by the ink overlap correction unit 12 using a display method indicated by a spectral reflectance final estimation result display area 607 shown in, e.g., FIG. 6. By setting a light source using a light source name display area 606, tristimulus values under that light source are displayed on a tristimulus value display area 608. For example, since light source D50 is set in the light source name display area 606 in FIG. 6, L*a*b* tristimulus values are calculated and displayed on the tristimulus value display area 608.

<Generation of Primary Color Dot Gain Correction LUT>

Details of generation of the primary color dot gain correction LUT by the primary color correction LUT generator 4 (step S203) and primary color dot gain correction by the primary color dot gain correction unit 10 (step S208) will be described below using FIGS. 2, 3, 4A, 4B, and 6.

Upon generation of the primary color dot gain correction LUT, primary color correction patches, which are output in advance using a printer that is to undergo reproduction color prediction, are measured by the spectral reflectance measurement device 2, and the results (spectral reflectance data) are stored in the ink colorimetric value storage unit 3. The primary color correction patches used in this process are prepared by changing the ink dot quantity of each color in 20%-increments from 0% to 100%, as shown in, e.g., FIG. 3.

Figure 4A:
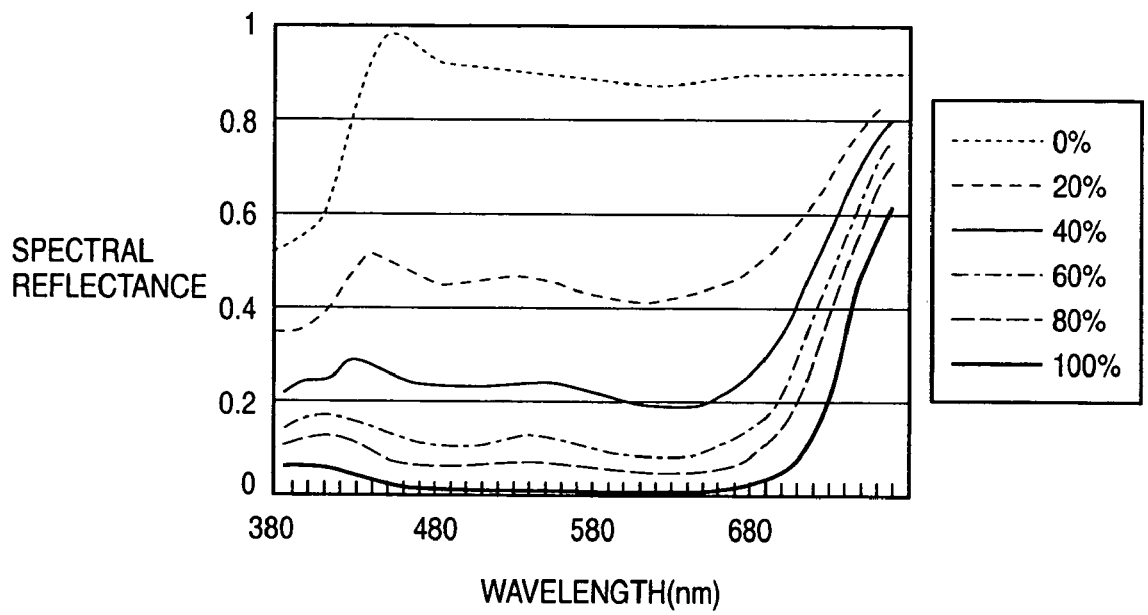
FIG. 4A is a graph showing the spectral reflectance measurement results in correspondence with the dot quantities of cyan ink.

The spectral reflectance data of the primary color correction patches, which are stored in the ink colorimetric value storage unit 3, are reflectance values at respective wavelengths corresponding to discrete ink dot quantities, as shown in FIG. 4A. FIG. 4A shows the spectral reflectance measurement results in correspondence with respective dot quantities (20%, 40%, 60%, 80%, 100%) of cyan ink. Also, the dot quantity=0% indicates an ink-less state, i.e., the spectral reflectance of paper.

Figure 4B:
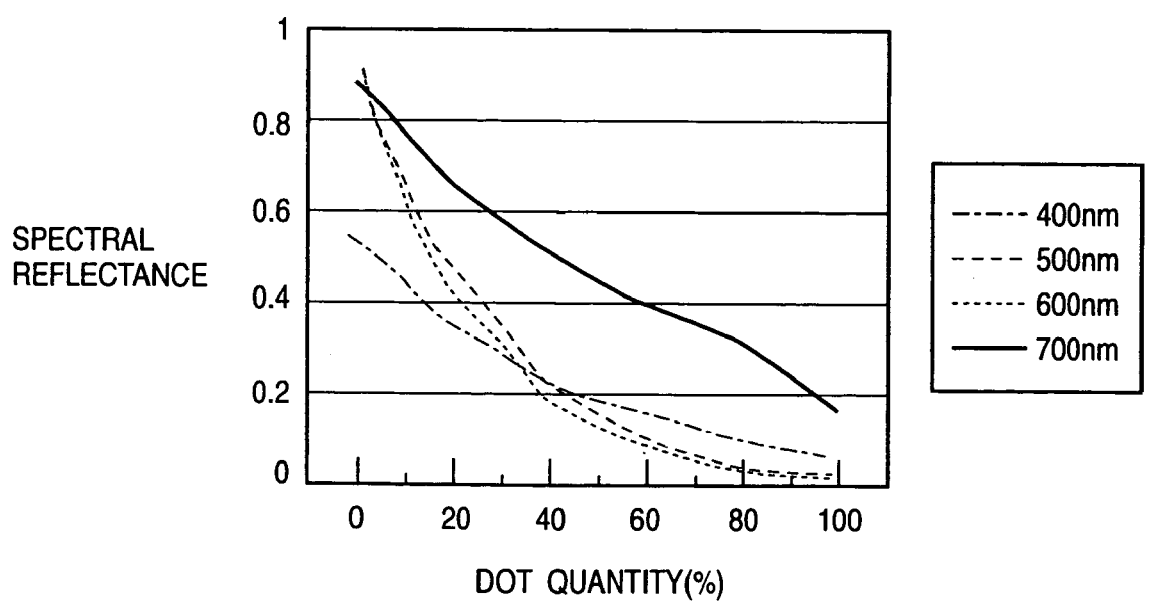
FIG. 4B is a graph showing a primary color correction LUT acquired from the measurement result shown in FIG. 4A.

These spectral reflectance data are input to the primary color correction LUT generator 4, and are converted into an LUT which indicates the relationship between the dot quantities and reflectance values at respective wavelengths, as shown in FIG. 4B. Since only discrete measurement results in 20%-increments of ink dot quantity are available, the primary color correction LUT is generated using a general interpolation method such as linear interpolation, spline interpolation, or the like.

The primary color dot gain correction unit 10 (step S208) makes primary color dot gain correction in correspondence with the input ink dot quantities using the LUT to estimate spectral reflectance characteristics of primary colors. Note that FIG. 4B illustrates only four graphs for the sake of simplicity. However, in practice, tables of all wavelengths (41 wavelengths in 10-nm increments from 380 to 780 nm) sampled in the visible wavelength range are generated.

<Calculation of Ink Overlap Correction Coefficient>

Details of the ink overlap correction coefficient calculation process by the ink overlap correction coefficient calculator 5. (step S205) will be described below using FIG. 5.

Figure 5:
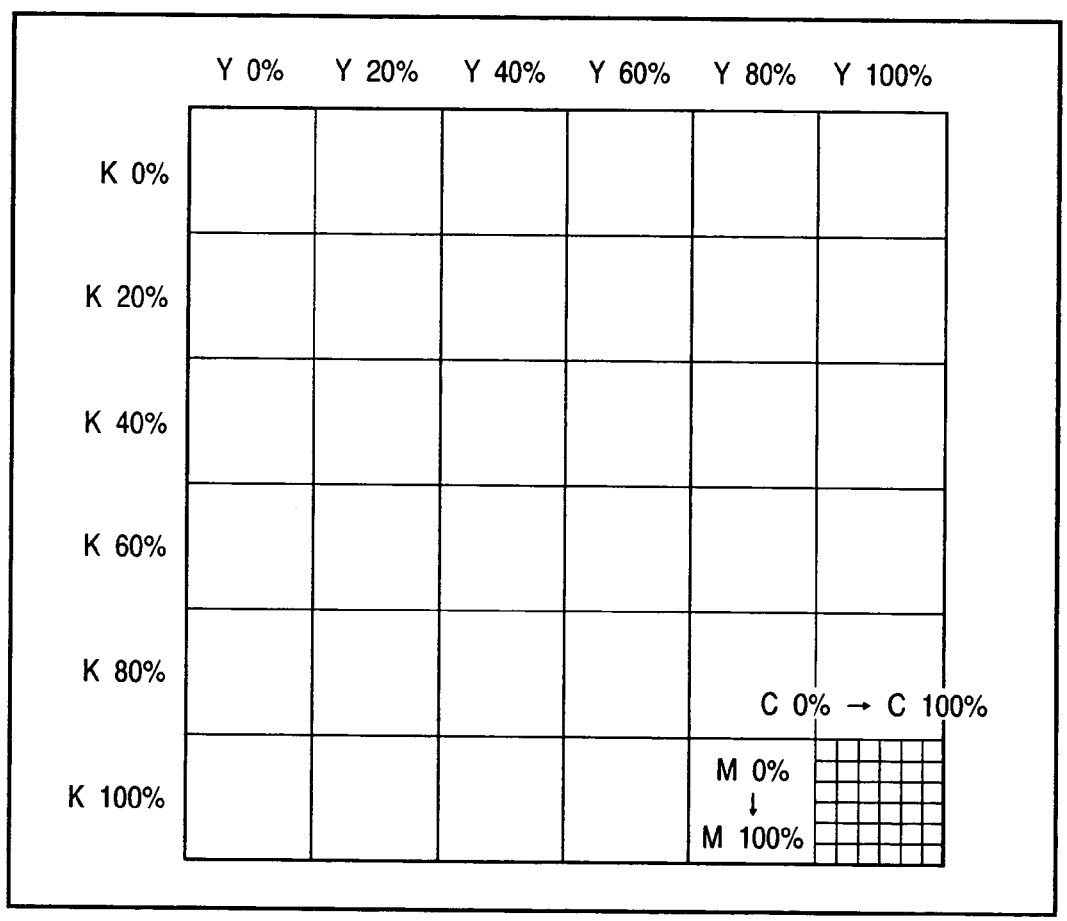
FIG. 5 shows an example of ink overlap correction patches used in the first embodiment.

In the ink overlap correction coefficient calculation process, ink overlap correction patches, which are output in advance using a printer that is to undergo reproduction color prediction, are measured by the spectral reflectance measurement device 2, and the results (spectral reflectance data) are stored in the ink colorimetric value storage unit 3. The ink overlap correction patches used in this process are prepared by changing the dot quantity of each ink in 20%-increments from 0% to 100%, and printing patches using two or more color inks to overlap each other, as shown in FIG. 5. The patches shown in FIG. 5 are printed using four inks (C, M, Y, and K).

The initial-estimated value calculator 11 calculates initial estimated spectral reflectance values of the respective overlap correction patches using the data (respective color dot quantities) of the overlap correction patches, and equations (4) to (6) above. The calculated initial estimated spectral reflectance values have errors from actually measured data, which are obtained by actually measuring the correction patches by the spectral reflectance measurement device 2 and storing them in the ink colorimetric value storage unit 3. In order to correct errors from the actually measured data, correction coefficients $a_{h,\lambda}$, $b_{i,j,\lambda}$, and $c_{k,l,m,\lambda}$ are determined using a method of least squares or the like to minimize the errors by:

$$R_{mod,\lambda} = \sum_{h=1}^{n} a_{h,\lambda} R_{p,\lambda}^{h} + \sum_{\substack{i=1 \\ j=1}}^{n} b_{i,j,\lambda} \left(\frac{K}{S}\right)_{i,j,\lambda} + \sum_{\substack{k=1 \\ l=1 \\ m=1}}^{n} c_{k,l,m,\lambda} \left(\frac{K}{S}\right)_{k,l,m,\lambda}$$ (7)

-continued $$\text{for } \left(\frac{K}{S}\right)_{i,j,\lambda} = c_i \left(\frac{K}{S}\right)_{i,\lambda} + c_j \left(\frac{K}{S}\right)_{j,\lambda}$$

$$\left(\frac{K}{S}\right)_{k,l,m,\lambda} = c_k \left(\frac{K}{S}\right)_{k,\lambda} + c_l \left(\frac{K}{S}\right)_{l,\lambda} + c_m \left(\frac{K}{S}\right)_{m,\lambda}$$

$R_{mod,\lambda}$: corrected spectral reflectance at wavelength $\lambda$ $R_{p,\lambda}$: spectral reflectance at wavelength $\lambda$, which is estimated by the KM theory $a_{h,\lambda}$, $b_{i,j,\lambda}$, $c_{k,l,m,\lambda}$: ink overlap correction coefficients $(K/S)_{i,j,\lambda}$: (K/S) when only inks i and j at wavelength $\lambda$ are considered $(K/S)_{k,l,m,\lambda}$: (K/S) when only ink k, l, and m at wavelength $\lambda$ are considered In equation (7), $R_{p,\lambda}$ is an estimated value of a secondary color using the spectral reflectance that has undergone primary color correction, and the KM theory given by equations (4) to (6), and $R_{mod,\lambda}$ is a corrected estimated value after ink overlap correction. Coefficients $a_{h,\lambda}$, $b_{i,j,\lambda}$, and $c_{k,l,m,\lambda}$ are determined to minimize errors between $R_{mod,\lambda}$ and the actually measured values of color patches. Also, i and j of the second term, and k, l, and m of the third term indicate arbitrary inks. For example, if four, C, M, Y, and K colors are used as n-color inks, i=C, M, Y, K, j=C, M, Y, K, . . . (for i≠j, k≠l≠m). Furthermore, (K/S) is as defined by equation (4). The ink overlap correction coefficients obtained by the above process are stored in the ink overlap correction coefficient storage unit 7.

<Ink Overlap Correction>

Details of the ink overlap correction process by the ink overlap correction unit 12 (step S210) will be described below. The ink overlap correction unit 12 (step S210) corrects the initial estimated spectral reflectance values, which are calculated by the initial estimated value calculator 11 (step S209) in association with the ink dot quantities set by the ink dot quantity setting unit 8, using the ink overlap correction coefficients stored in the ink overlap correction coefficient storage unit 7 and equation (7), thus removing estimation errors due to ink overlap.

As described above, according to this embodiment, reproduction color estimation is done with respect to the set ink dot quantities in the following procedures.

(1) The primary color dot gain correction unit 10 calculates spectral reflectance values corresponding to set dot quantities for respective inks. Since this calculation uses the LUT stored in the primary color correction LUT storage unit 6, dot gain correction is applied.

(2) The initial estimated value calculator 11 predicts a mixed color (initial estimation) using the KM theory on the basis of the spectral reflectance values of inks obtained by the primary color dot gain correction unit 10 and the set ink dot quantities (equations (4) to (6)).

(3) Furthermore, the ink overlap correction unit 12 makes ink overlap correction of secondary or higher color for the initial estimation result using the correction coefficients stored in the ink overlap correction coefficient storage unit 7 (equation (7)).

As described above, since spectral reflectance after inks are mixed is initially estimated by applying the spectral reflectance values of respective inks that have undergone dot gain correction to the mixed color predicted using the KM theory, and the obtained initial estimation result undergoes ink overlap correction, high-precision reproduction color estimation can be implemented.

Second Embodiment

Figure 7:
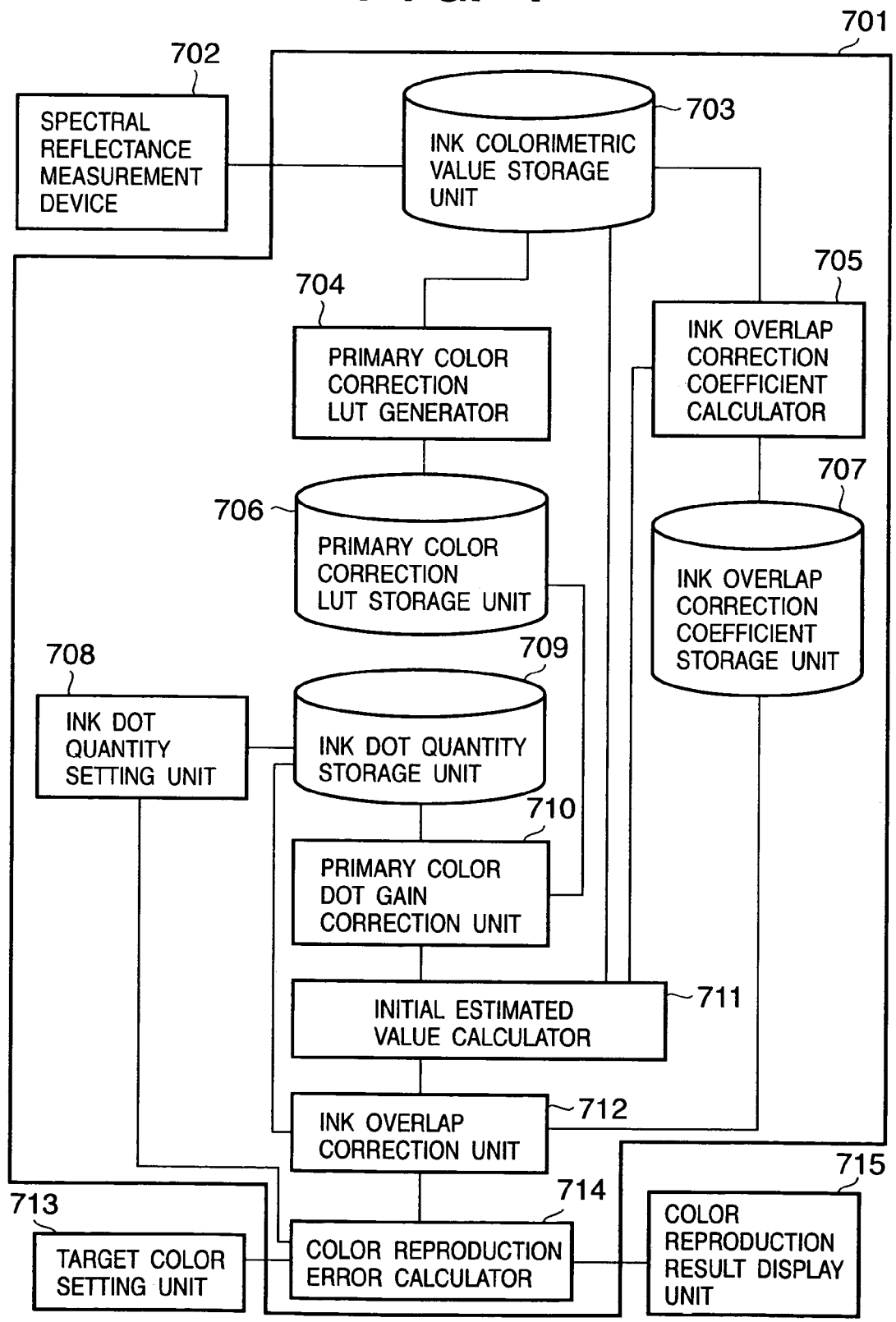
FIG. 7 is a block diagram showing the arrangement of a reproduction color prediction apparatus according to the second embodiment.

The second embodiment according to the present invention will be described in detail below with reference to the accompanying drawings. FIG. 7 is a block diagram showing the arrangement of a reproduction color prediction apparatus 701 according to the second embodiment.

Reference numeral 702 denotes a spectral reflectance measurement device for measuring printer characteristics. Reference numeral 703 denotes an ink calorimetric value storage unit which stores spectral reflectance data of inks measured by the spectral reflectance measurement device 702. Reference numeral 704 denotes a primary color correction LUT generator, which generates a primary color correction LUT on the basis of calorimetric values of primary color stored in the ink calorimetric value storage unit 703. Reference numeral 706 denotes a primary color correction LUT storage unit which stores the primary color correction LUT generated by the primary color correction LUT generator 704.

Reference numeral 705 denotes an ink overlap correction coefficient calculator, which calculates ink overlap correction coefficients on the basis of ink overlap calorimetric values stored in the ink calorimetric value storage unit 703. Reference numeral 707 denotes an ink overlap correction coefficient storage unit which stores the ink overlap correction coefficients calculated by the ink overlap correction coefficient calculator 705.

Reference numeral 708 denotes an ink dot quantity setting unit that provides an interface with which the user sets ink dot quantities. Reference numeral 709 denotes an ink dot quantity storage unit, which stores the ink dot quantities set using the ink dot quantity setting unit 708.

Reference numeral 710 denotes a primary color dot gain correction unit which makes primary color correction in correspondence with the ink dot quantities stored in the ink dot quantity storage unit 709. Reference numeral 711 denotes an initial estimated value calculator which estimates a color mixing result using the KM theory on the basis of respective primary color values corrected by the primary color dot gain correction unit 710. Reference numeral 712 denotes an ink overlap correction unit, which corrects an initial estimated spectral reflectance value calculated by the initial estimated value calculator 711 using the ink overlap correction coefficients stored in the ink overlap correction coefficient storage unit 707 and the ink dot quantities stored in the ink dot quantity storage unit 709, so as to obtain an estimated spectral reflectance value.

Figure 9:
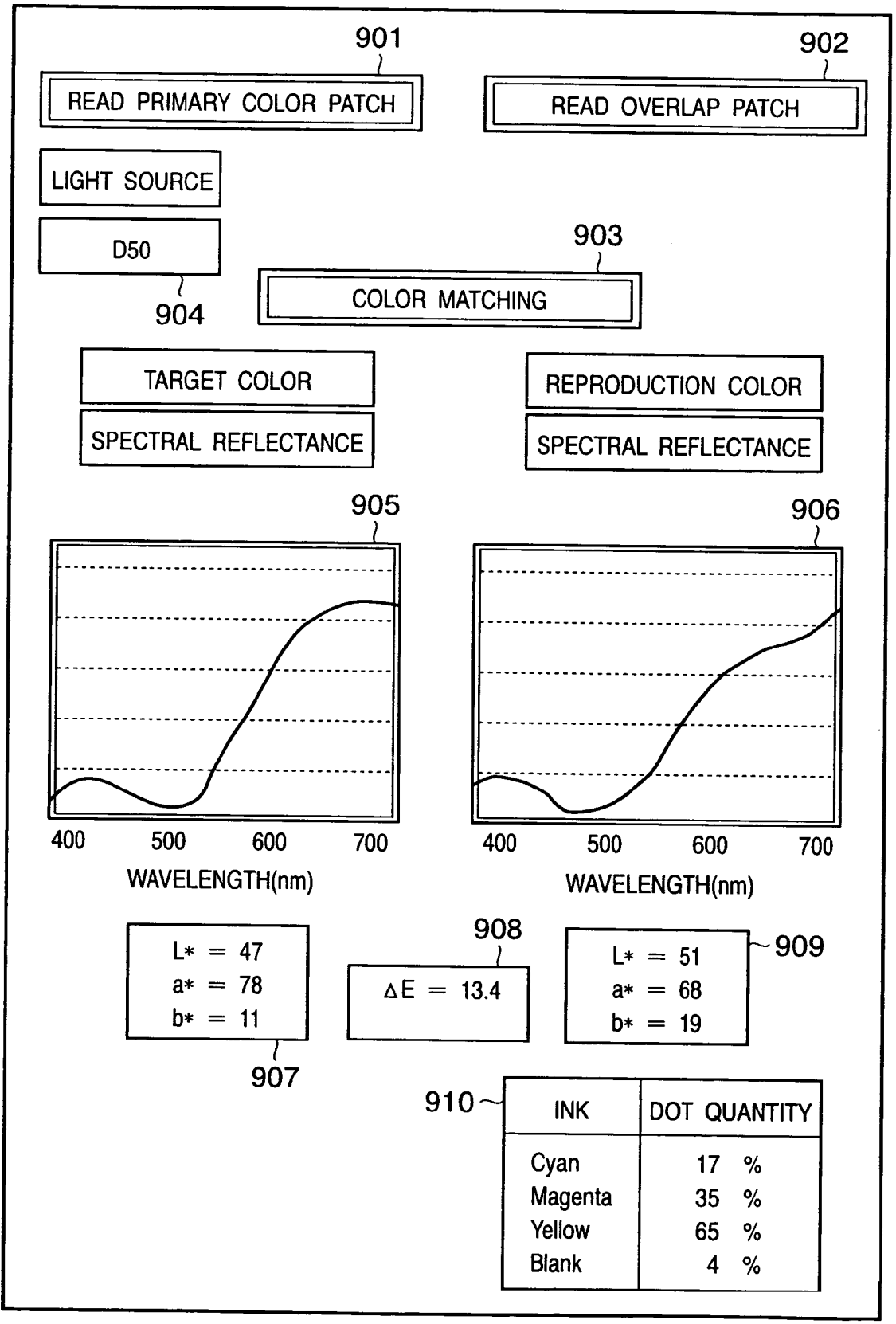
FIG. 9 shows an example of a user interface according to the second embodiment.
Figure 10:
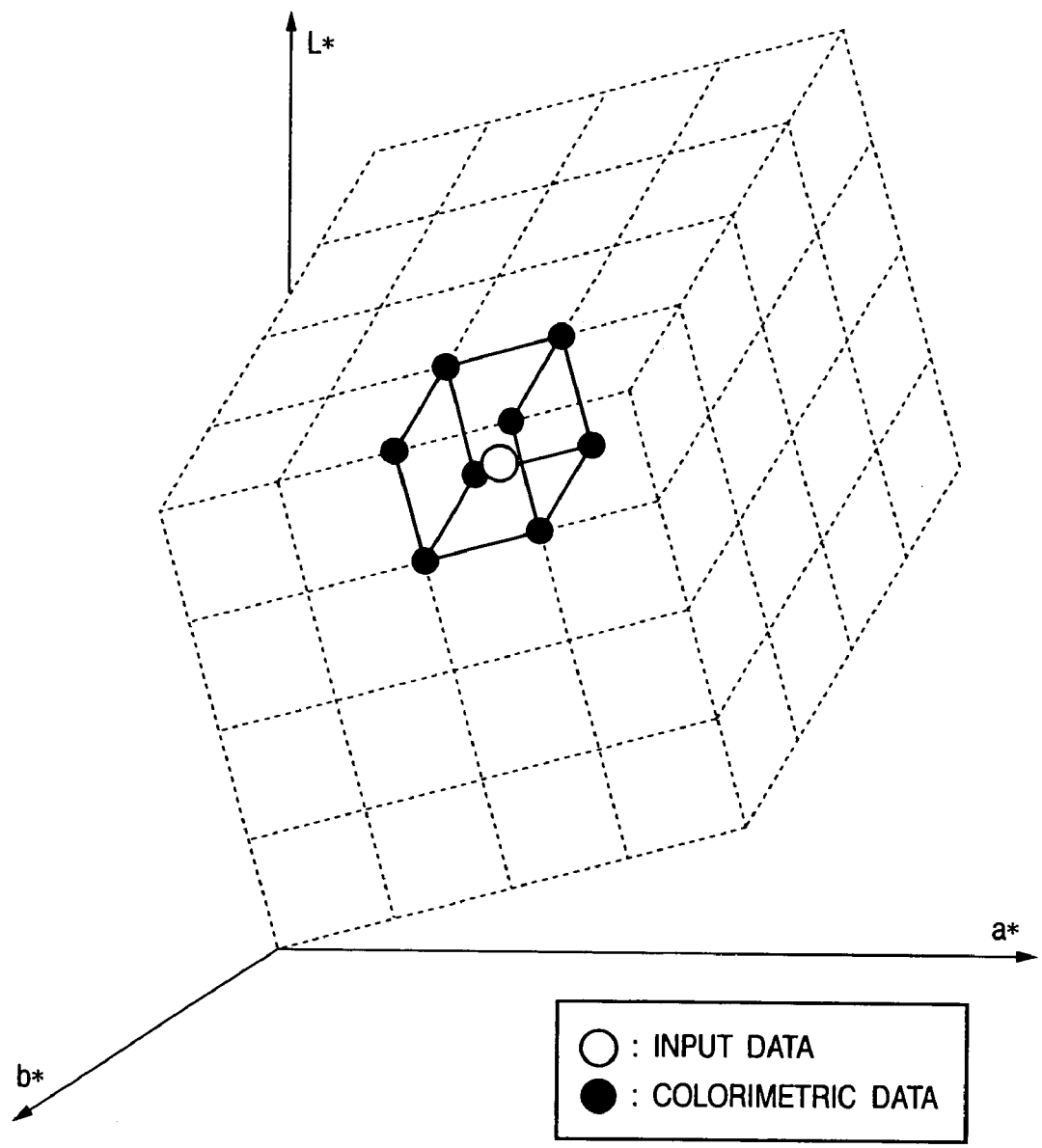
FIG. 10 is a view for explaining a reproduction color prediction method using an LUT.
Figure 11:
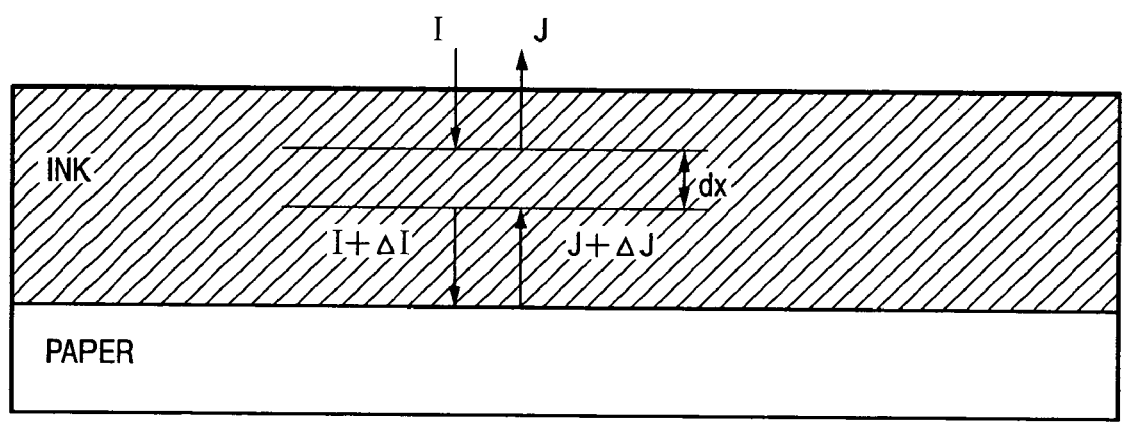
FIG. 11 is a view for explaining reproduction color prediction using the Kubelka-Munk theory.
Figure 12:
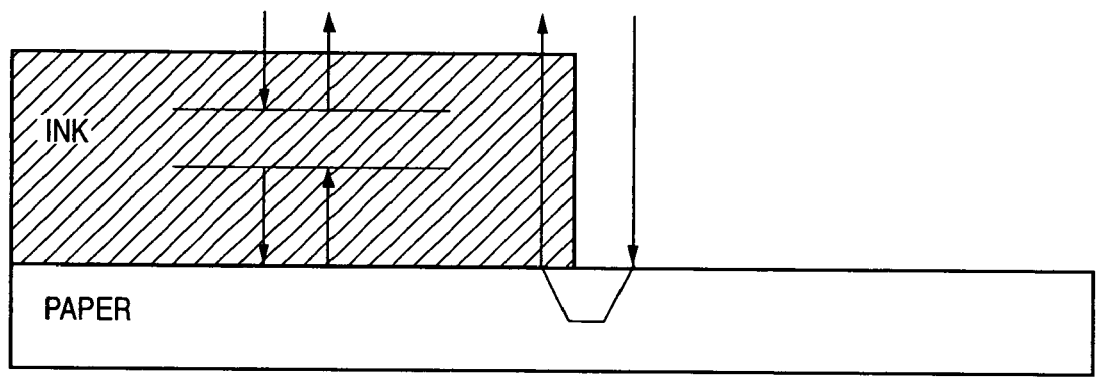
FIG. 12 is a view for explaining an optical dot gain.

Reference numeral 713 denotes a target color setting unit, which sets spectral reflectance data or tristimulus values of a target color. When the spectral reflectance data is set, a user interface shown in, e.g., FIG. 9 can be used. This interface allows the user to change a graph display using a pointing device such as a mouse or the like on a display area 905. Reference numeral 714 denotes a color reproduction error calculator, which calculates an error between the estimated spectral reflectance value calculated by the ink overlap correction unit 712 and the target color set by the target color setting unit 713. Reference numeral 715 denotes a color reproduction result display unit which displays the estimated spectral reflectance value corrected by the ink overlap correction unit 712. The color reproduction result display unit 715 comprises a CRT, LCD, or the like, and makes a display, as shown in FIG. 9.

<Reproduction Color Prediction Process>

Figure 8:
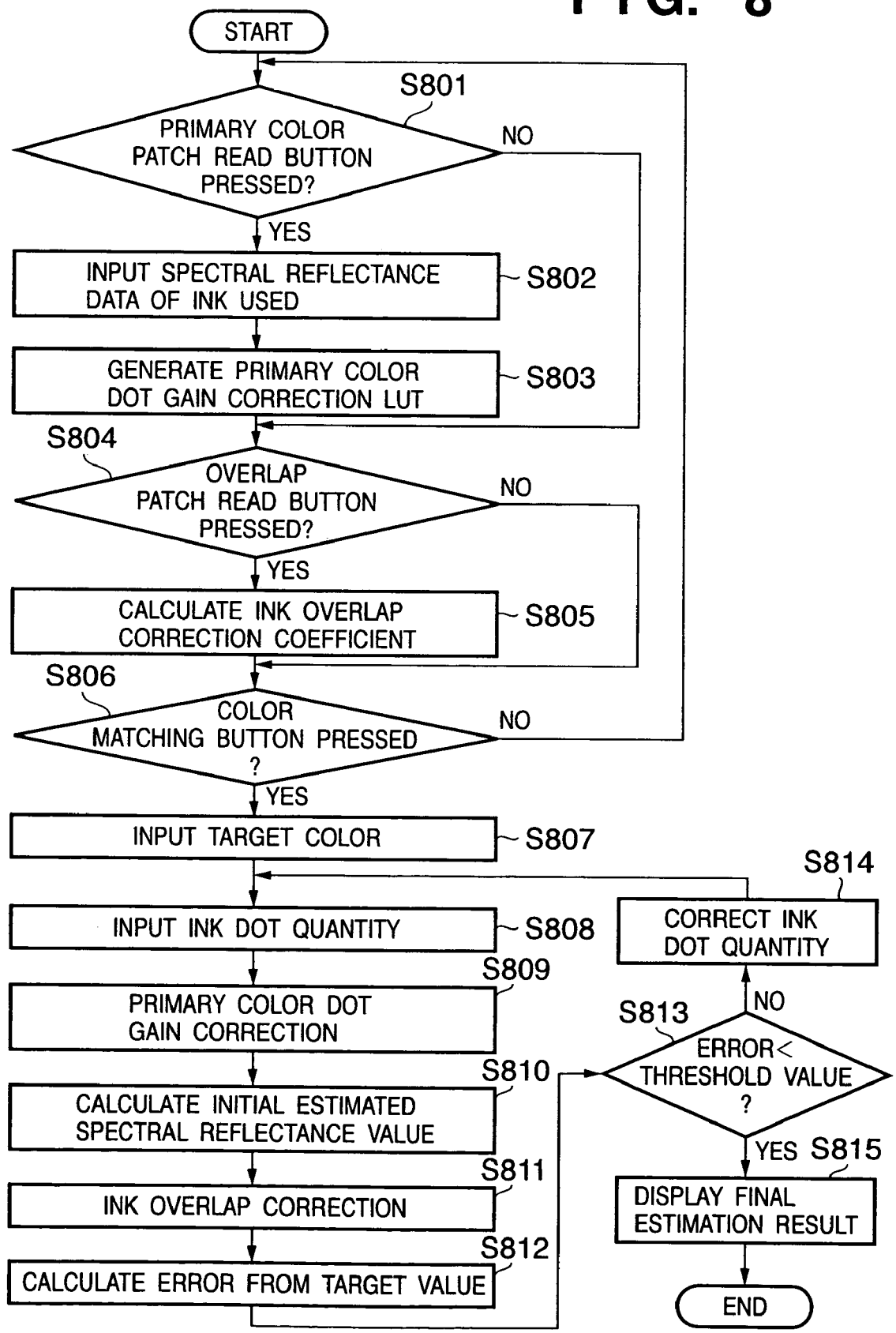
FIG. 8 is a flow chart for explaining a reproduction color prediction process in the reproduction color prediction apparatus of the second embodiment.

FIG. 8 is a flow chart of a reproduction color prediction process executed by the reproduction color prediction apparatus 701. FIG. 9 shows an example of a user interface used to set a target color using the target color setting unit 713 and to display the color reproduction estimation result by the color reproduction result display unit 715.

It is checked in step S801 if the user has pressed (clicked) a primary color dot gain read button 901. If YES in step S801, the flow advances to step S802; otherwise, the flow jumps to step S804. If the primary color dot gain read button 901 has been pressed, sample patches are measured using the spectral reflectance measurement device 702, and the obtained calorimetric values are stored in the ink colorimetric value storage unit 703 in step S802. In step S803, the primary color correction LUT generator 704 reads the primary color colorimetric values stored in the ink colorimetric value storage unit 703, calculates a primary color correction LUT, and stores it in the primary color correction LUT storage unit 706. The primary color correction LUT, its generation sequence, and sample patches used to generate the LUT are the same those in the first embodiment.

It is checked in step S804 if the user has pressed an overlap patch read button 902. If YES in step S804, the flow advances to step S805; otherwise, the flow advances to step S806. If the overlap patch read button 902 has been pressed, the ink overlap correction coefficient calculator 705 calculates ink overlap correction coefficients, and stores them in the ink overlap correction coefficient storage unit 707 in step S805. Details of the correction coefficient calculation process are as has already explained in the first embodiment.

It is checked in step S806 if the user has pressed a color matching button 903. If YES in step S806, the flow advances to step S807; otherwise, the flow returns to step S801. If the color matching button 903 has been pressed, processes in subsequent steps S807 to S815 are executed.

In step S807, the target color setting unit 713 inputs spectral reflectance data or tristimulus values of a target color which is set by the user. The target color setting unit 713 is implemented as a target color spectral reflectance input area 905 or target color tristimulus value input area 907 provided in the user interface shown in FIG. 9. By inputting a desired value to one of these areas, the spectral reflectance data or tristimulus values of the target color can be set.

In step S808, initial values of ink dot quantities of all inks or ink dot quantities updated in step S814 are set and stored in the ink dot quantity storage unit 709. In step S809, primary color dot gains are corrected using the ink dot quantities stored in the ink dot quantity storage unit 709 and the primary color correction LUT stored in the primary color correction LUT storage unit 706, thus calculating spectral reflectance values corresponding to the given ink dot quantities.

In step S810, the initial estimated value calculator 711 predicts a mixed color using the spectral reflectance values of inks calculated by the primary color dot gain correction unit 710 and the KM theory given by equations (4) to (6) above. In step S811, the ink overlap correction unit 712 corrects an initial estimated spectral reflectance value estimated by the initial estimated value calculator 711 (step S810) using the ink overlap correction coefficients stored in the ink overlap correction coefficient storage unit 707 and equation (7), and calculates a spectral reflectance final estimation result.

In step S812, the color reproduction error calculator 714 calculates an error between the spectral reflectance of the target color and the spectral reflectance final estimation result (for example, such error includes an RMS error, color difference $\Delta E$, and the like, but the present invention is not limited to them). It is checked in step S813 if the error calculated by the color reproduction error calculator 714 is larger than a pre-set threshold value. If the error is larger than the threshold value, the flow advances to step S814; if the error is equal to or smaller than the threshold value, the flow advances to step S815.

In step S814, the ink dot quantities are updated using a general optimization method such as a steepest descent method or the like to minimize the error between the spectral reflectance of the target color and the spectral reflectance final estimation result. The processes in steps S808 to S813 are then executed using the updated ink dot quantities. In this way, the processes in steps S809 to S814 are repeated until the error between the spectral reflectance of the target color and the spectral reflectance final estimation result becomes equal to or smaller than the threshold value.

In step S815, the color reproduction result display unit 715 displays the spectral reflectance final estimation result calculated by the ink overlap correction unit 712. On this display, as shown in, e.g., FIG. 9, the spectral reflectance final estimation result is displayed on a spectral reflectance final estimation result display area 906, and tristimulus values under a light source designated by a light source name display area 904 are displayed on a tristimulus value display area 907. Furthermore, color difference $\Delta E$ from the target color at that time and the ink dot quantities are respectively displayed on a color difference display area 908 and ink dot quantity display area 910.

<Number and Type of Inks Used>

In the first and second embodiments, four color inks, i.e., cyan (C), magenta (M), yellow (Y), and black (K) are used. However, the present invention is not limited to these inks. For example, the present invention can be applied to an arrangement including light inks (light cyan and light magenta) prevalently used in ink-jet printers, an arrangement including special color inks different from the above inks, and an arrangement using only three, C, M, and Y colors without using K ink.

As described above, according to the above embodiments, in reproduction color prediction of an image output device, since a reproduction color prediction model is combined with correction of a portion that cannot be predicted by a model, high-precision reproduction color estimation can be implemented. Especially, upon applying the KM theory to prediction of a mixed color, the spectral reflectance that has undergone primary color dot gain correction is used, and correction using correction coefficients, which are obtained based on the actually measured values and predicted values, is applied, thus implementing high-precision reproduction color prediction.

As described above, according to the above mentioned embodiment, high-precision reproduction color prediction can be implemented.

Third Embodiment

In the third and fourth embodiments to be described hereinafter, a process for optimizing (determining) ink dot quantities will be explained.

Figure 13:
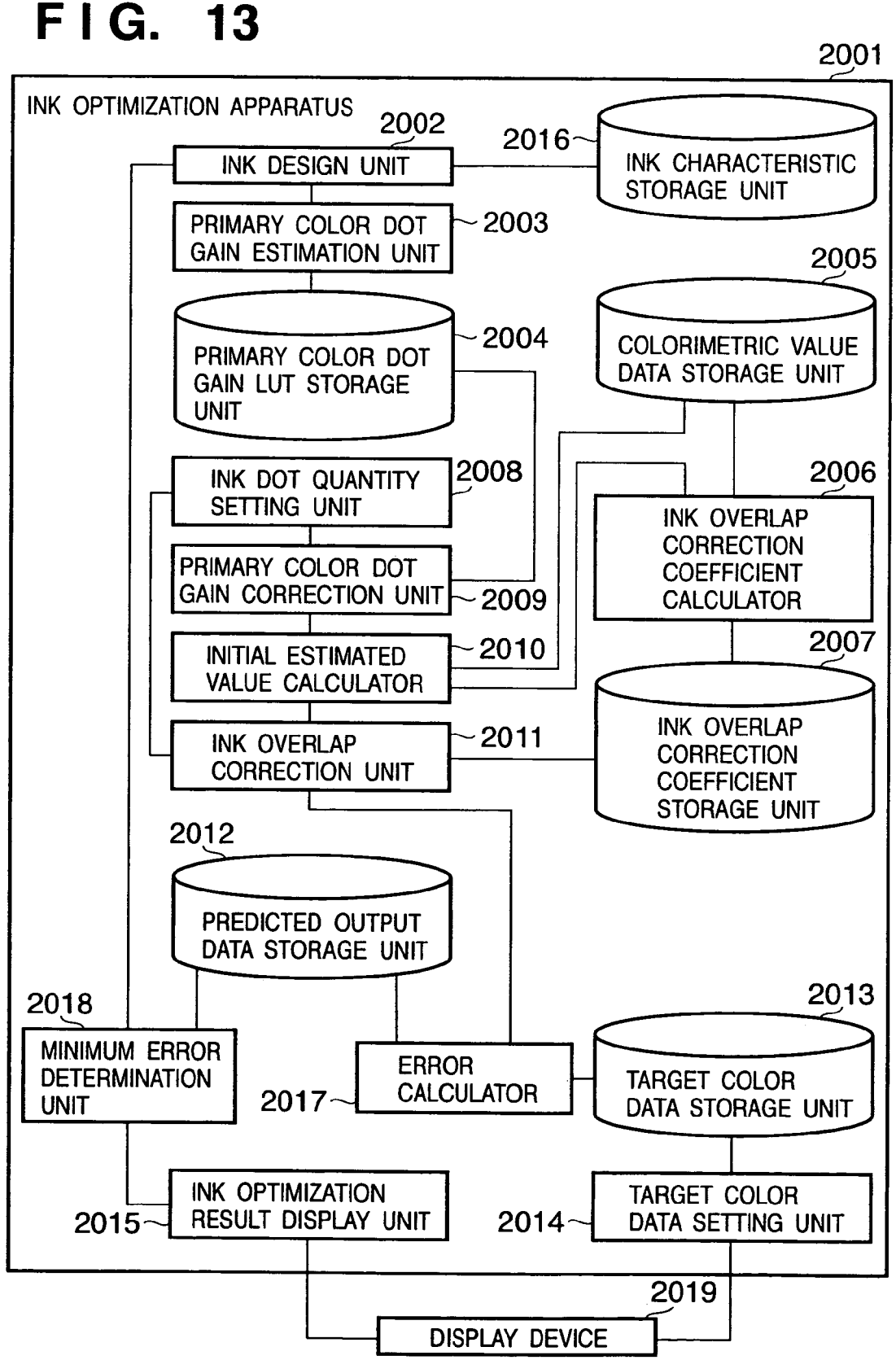
FIG. 13 is a block diagram showing the arrangement of an ink optimization apparatus according to the third embodiment.

FIG. 13 is a block diagram showing the arrangement of an ink optimization apparatus according to the third embodiment of the present invention.

Referring to FIG. 13, reference numeral 2001 denotes an ink optimization apparatus according to the third embodiment. Reference numeral 2002 denotes an ink design unit, which designs ink characteristics of a given target color. Reference numeral 2003 denotes a primary color dot gain estimation unit, which estimates a primary color dot gain of the ink designed by the ink design unit 2002. Reference numeral 2004 denotes a primary color dot gain LUT storage unit, which stores a primary color dot gain LUT estimated by the primary color dot gain estimation unit 2003. Note that this embodiment uses a plurality of inks as color agents. However, the optimization method of this embodiment can be applied when other color agents such as toners and the like are used.

Reference numeral 2005 denotes a calorimetric value data storage unit, which stores the colorimetric values of output patches of a printer used in an ink optimization process. Reference numeral 2006 denotes an ink overlap correction coefficient calculator, which calculates ink overlap correction coefficients on the basis of the colorimetric values stored in the colorimetric value data storage unit 2005. Reference numeral 2007 denotes an ink overlap correction coefficient storage unit, which stores the ink overlap correction coefficients calculated by the ink overlap correction coefficient calculator 2006.

Reference numeral 2008 denotes an ink dot quantity setting unit, which sets ink dot quantities of the designed ink. Reference numeral 2009 denotes a primary color dot gain correction unit, which makes primary color correction, which considers a dot gain to be described later, for the ink dot quantities set by the ink dot quantity setting unit 2008 (the reason why this embodiment uses a term "primary color correction" is that the general KM theory uses a concept that a parameter (K/S) linearly changes with respect to the dot quantity, and does not consider any influence of nonlinearity of the dot gain, but this embodiment nonlinearly corrects this dot gain). Reference numeral 2010 denotes an initial estimated value calculator, which calculates a color mixing result (initial estimated spectral reflectance value) on the basis of primary color values corrected by the primary color dot gain correction unit 2009. Reference numeral 2011 denotes an ink overlap correction unit, which corrects the initial estimated spectral reflectance value calculated by the initial estimated value calculator 2010 using the ink overlap correction coefficients stored in the ink overlap correction coefficient storage unit 2007, and the ink dot quantities stored in the ink dot quantity storage unit 2009, thus obtaining an estimated spectral reflectance value.

Reference numeral 2012 denotes a predicted output data storage unit which stores a predicted output value (the estimation result obtained by the ink overlap correction unit 2011; details will be described later using the flow chart of FIG. 14). Reference numeral 2013 denotes a target color data storage unit, which stores a target color set by the user. Reference numeral 2014 denotes a target color data setting unit which provides a user interface, with which the user sets a target color. Reference numeral 2015 denotes an ink optimization result display unit, which controls a display device 2019 to display optimized ink information. Reference numeral 2016 denotes an ink characteristic storage unit, which stores characteristics of paper used in a print process, and ink characteristics obtained by measuring those of some existing inks, in advance. Reference numeral 2017 denotes an error calculator, which calculates an error between predicted output data and target color data. Reference numeral 2018 denotes a minimum error determination unit, which compares a minimum value of the error (minimum error value) calculated by the error calculator 2017 with a threshold value. Reference numeral 2019 denotes a display device, which displays a target color designated by the user, and an ink optimization result under the control of the ink optimization result display unit 2015. The display device 2019 can use a CRT, LCD, or the like.

<Ink Optimization Process>

Figure 14:
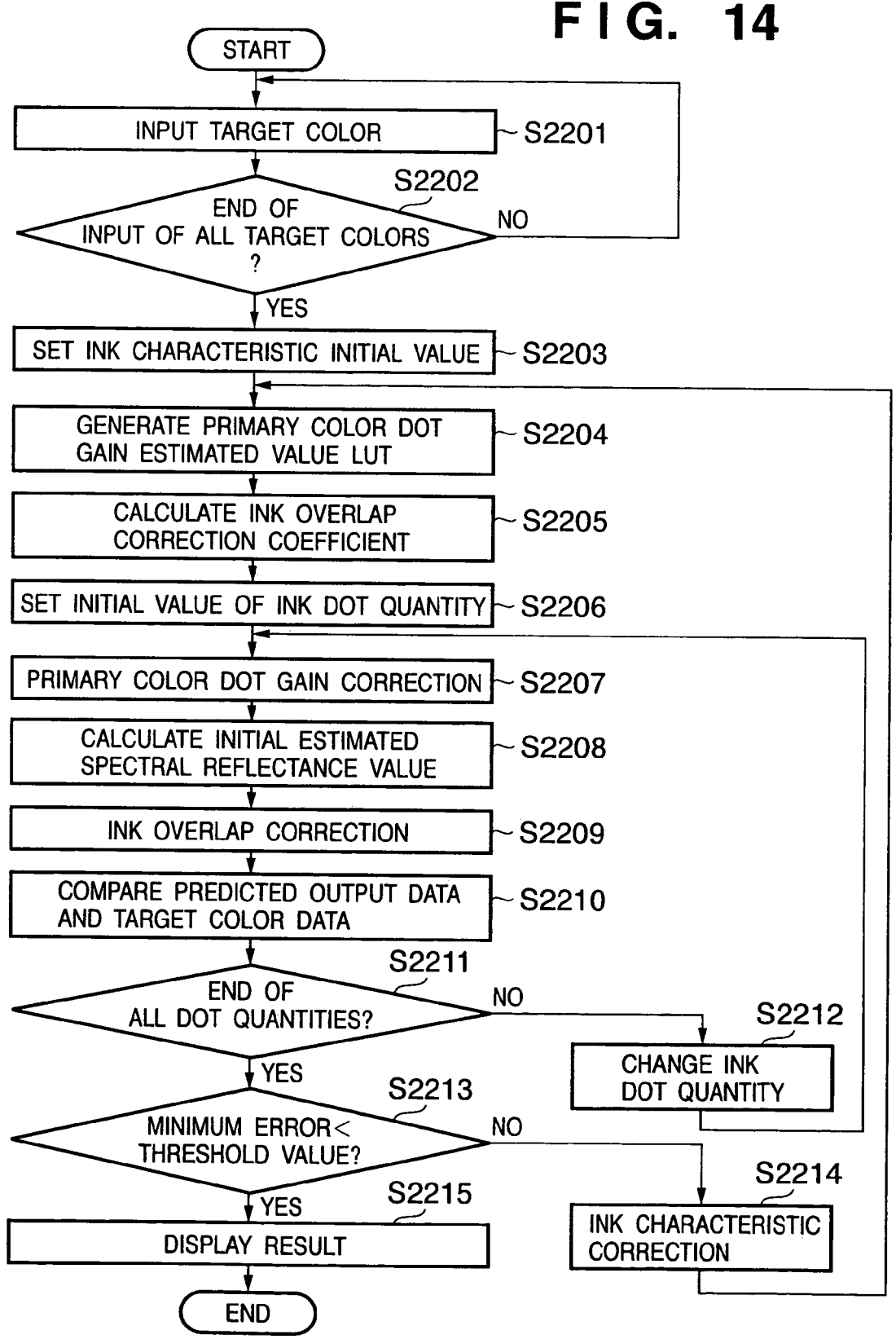
FIG. 14 is a flow chart for explaining an ink optimization process in the ink optimization apparatus of the third embodiment.
Figure 15:
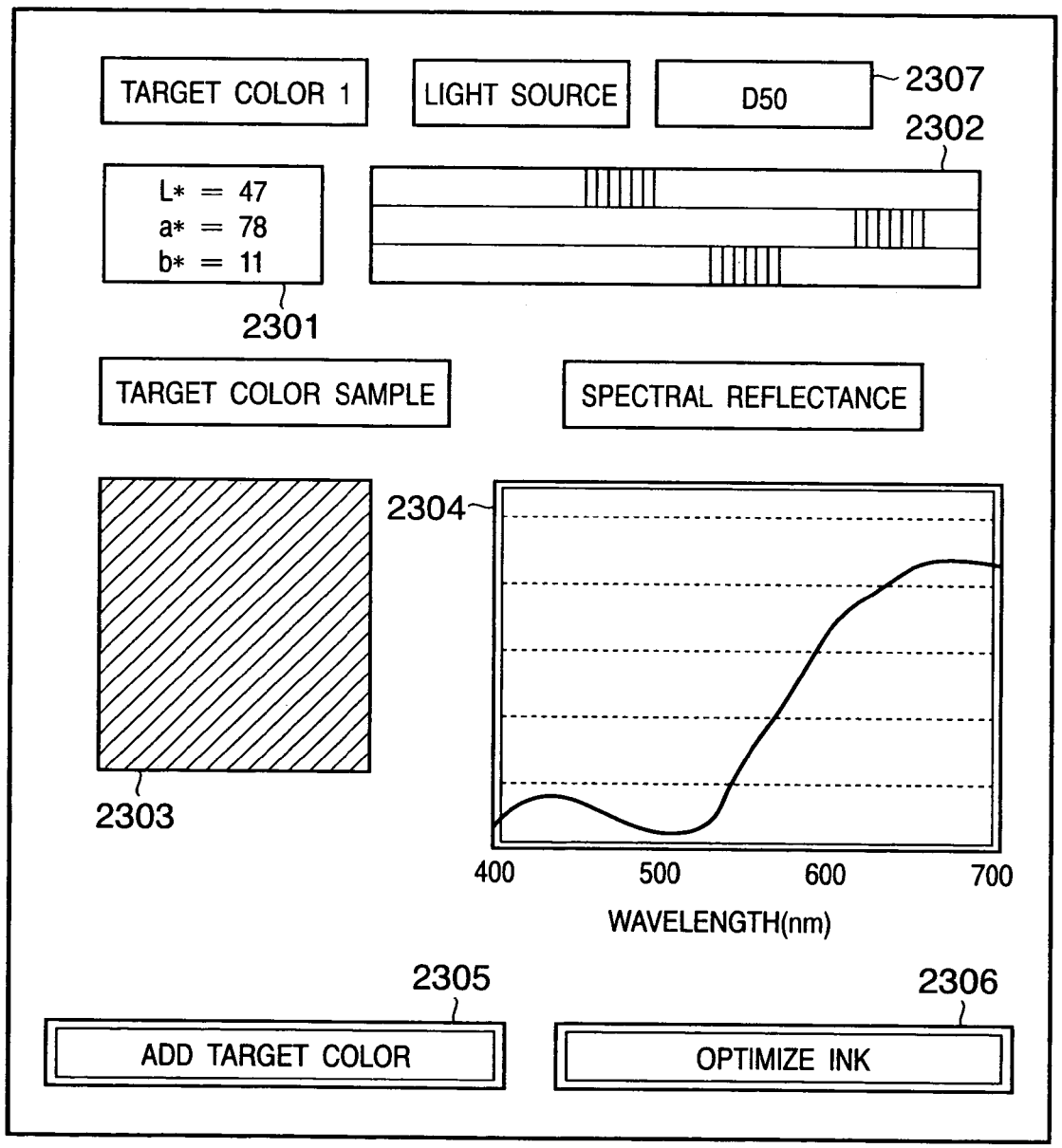
FIG. 15 shows an example of a user interface which is presented by the ink optimization apparatus of the third embodiment, and is used to set a target color.
Figure 16:
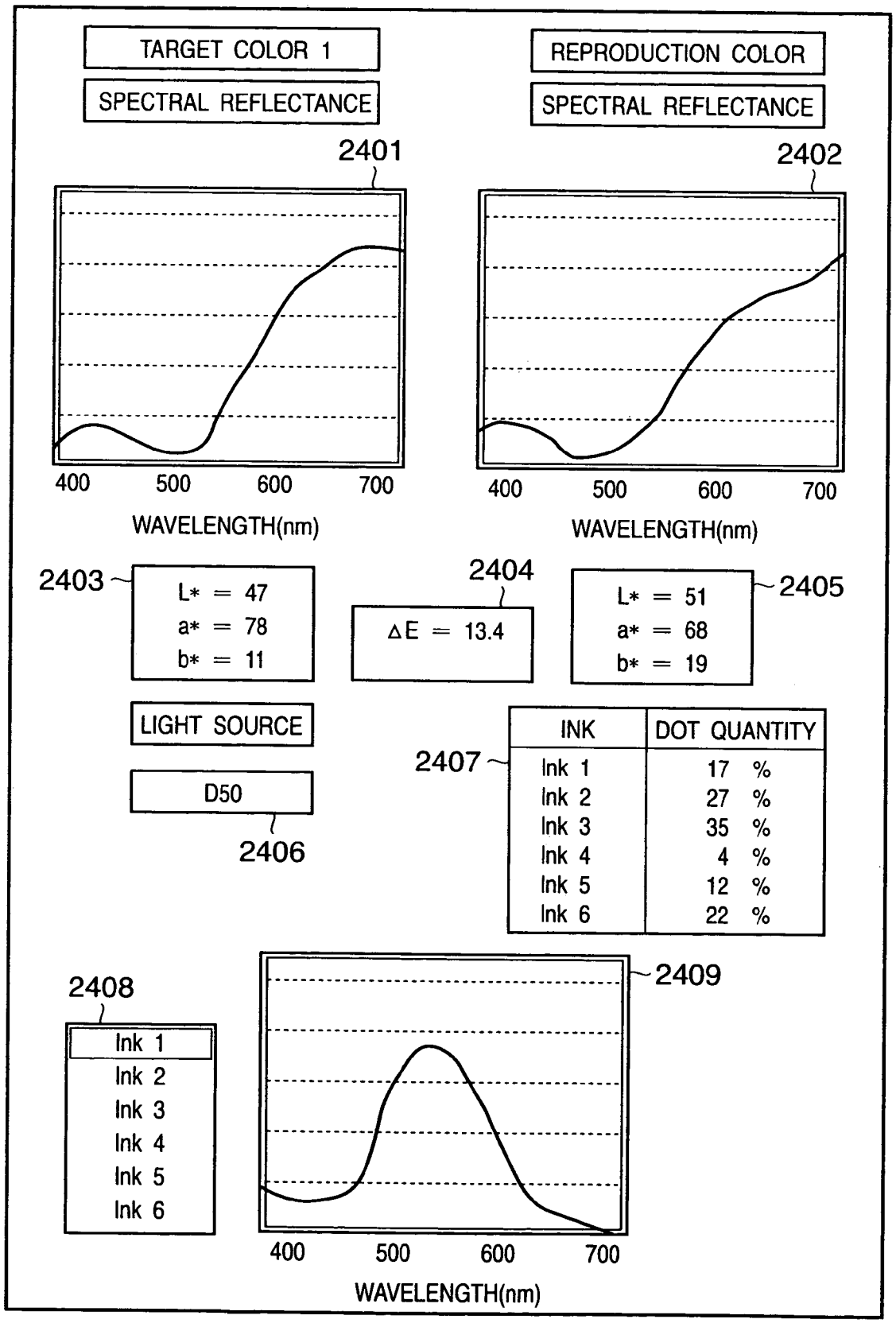
FIG. 16 shows an example of a user interface used to display an ink optimization result in the ink optimization apparatus of the third embodiment.

FIG. 14 is a flow chart showing an ink optimization process by the ink optimization apparatus 2001 of the third embodiment. FIG. 15 shows an example of a user interface which is provided by the target color setting unit 2014 to allow the user to set a target color. FIG. 16 shows an example of a user interface which is provided by the ink optimization result display unit 2015 to display an ink optimization result. The ink optimization process according to the third embodiment will be described below using these figures.

In step S2201, the user sets a desired target color using the target color setting unit 2014, and the set target color is stored in the target color data storage unit 2013. The target color setting unit 2014 provides a user interface shown in, e.g., FIG. 15, and the user sets the target color via this interface (details will be described later). It is checked in step S2202 if the user has input all target colors. This checking process is implemented by seeing if an ink optimization button 2306 has been pressed, on the interface shown in FIG. 15. Each target color set using an area 2301, slide bars 2302, and the like is stored in the target color data storage unit 2013 upon depression of a target color addition button 2305.

Upon depression of the ink optimization button 2306, the flow advances to step S2203. In step S2203, spectral reflectance data of C, M, Y, and K inks, which are normally used, and those of special color inks such as green, orange, and the like when the dot quantity=100%, of the ink characteristics stored in the ink characteristic storage unit 2016 are set as initial values in the ink design unit 2002. Assume that ink design using six color inks are to be made in this embodiment.

In step S2204, the primary color dot gain estimation unit 2003 estimates dot gains at arbitrary dot quantities on the basis of the spectral reflectance data when the ink dot quantity=100%, which are set by the ink design unit, and stores them as an LUT in the primary color correction LUT (details will be described later).

In step S2205, the ink overlap correction coefficient calculator 2006 reads the ink overlap colorimetric values stored in the calorimetric value data storage unit 2005, and calculates ink overlap correction coefficients. The calculated ink overlap correction coefficients are stored in the ink overlap correction coefficient storage unit 2007 (details will be described later). Since the ink overlap correction coefficients use identical values in all ink combinations, the process in step S2205 may be skipped after it is executed once. In step S2206, all ink dot quantities are set to initial values (e.g., 0%) to prepare for processes in step S2207 and subsequent steps.

In step S2207, the primary dot gain correction unit 2009 corrects primary color dot gains using the ink dot quantities set by the ink dot quantity setting unit 2008 and the primary color dot gain LUT stored in the primary color dot gain LUT storage unit 2004, thus calculating spectral reflectance values corresponding to the given ink dot quantities. In step S2208, the initial estimated value calculator 2010 predicts a mixed color based on the spectral reflectance values of inks calculated by the primary color dot gain correction unit 2009 using the KM theory given by equations (4) to (6) above. Note that (K/S) at wavelength λ of paper is held in the ink characteristic storage unit 2016.

In step S2209, the ink overlap correction unit 2011 corrects initial estimated spectral reflection values estimated by the initial estimated value calculator 2010 using the ink overlap correction coefficients stored in the ink overlap correction coefficient storage unit 2007, thereby calculating a spectral distribution final estimation result (details will be described later).

In step S2210, the error calculator 2017 calculates an error between the spectral distribution final estimation result calculated in step S2209, and each target color set in step S2201. If the error is smaller than a minimum value, a minimum error value in the predicted output data storage unit 2012 is updated by that error, and ink characteristics and dot quantities at that time are stored in the predicted output data storage unit 2012. It is checked in step S2211 if all combinations of dot quantities of the currently set inks have been checked. If all combinations have been checked, the flow advances to step S2213; if combinations to be checked still remain, the flow advances to step S2212. In step S2212, the dot quantities are changed by a given change amount, and the flow returns to step S2207. Note that combinations of dot quantities in the above process basically undergo full search. For example, when six color inks are used, all combinations of all ink dot quantities are checked within the range from 0% to 100%. Note that an increment value used to change the dot quantity from 0% to 100% may be determined as a default, or an arbitrary value may be set by user's operation.

The minimum error determination unit 2018 checks in step S2213 if the minimum error value stored in the predicted output data storage unit 2012 is larger than a set threshold value. If the minimum error value is larger than the threshold value, the flow advances to step S2214; otherwise, the flow advances to step S2215. In step S2214, at least one of the currently set inks is replaced by ink having other characteristics. Note that ink having other characteristics is read out from the characteristic storage unit 2016.

If the minimum error value stored in the predicted output data storage unit 2012 becomes smaller than the set threshold value, the minimum error value stored in the predicted output data storage unit 2012, and the ink characteristics and dot quantities at that time, are displayed in a format shown in, e.g., FIG. 16 (details will be described later) in step S2215. If a plurality of target colors are set in step S2201, the process in FIG. 14 is repeated for all the set target colors. More specifically, the processes in steps S2206 to S2214 in FIG. 14 are repeated for each target color. Upon replacing by ink with other characteristics in step S2214, all combinations of a predetermined number of colors (e.g., six colors) chosen from ink candidates stored in the ink characteristic storage unit 2016 may be used as inks to be replaced.

<Target Color Setting User Interface>

The user interface to be provided by the target color setting unit 2014 will be described below. FIG. 15 shows an example of the user interface with which the user sets a target color using the target color data setting unit 2014. A target color setting method will be described in detail below using FIG. 15.

The user can set a target color to be output by a printer using tristimulus values or spectral reflectance data. When the user sets a target color using tristimulus values, he or she sets a desired light source in a light source setting area 2307, and can set desired tristimulus values under that light source using a numerical value input area 2301 or slider bars 2302. Upon setting a target color using spectral reflectance data, a user interface that allows the user to change a graph displayed on a target color spectral reflectance input area 2304 using a pointing device such as a mouse or the like is provided. With this interface, the user makes setups to obtain desired spectral reflectance characteristics. The set target color is displayed on a target color confirmation area 2303. If the user wants to add another target color, he or she can add a target color by pressing the target color addition button 2305 after the desired target color is set. When the user has input all target colors and wants to start ink optimization using each input target color, he or she can press the ink optimization button 2306.

<Primary Color Dot Gain Estimation>

Normally, the ink dot quantities and spectral reflectance characteristics do not have a linear relationship in a print process, and a phenomenon that the area of ink on a sheet surface becomes larger than a theoretical area ratio occurs. This phenomenon is well known as a dot gain. In this embodiment, the primary dot gain estimation unit 2003 estimates the dot gain of ink designated by the ink design unit 2002.

FIGS. 4A and 4B show the relationship between the ink dot quantities and spectral reflectance characteristics of arbitrary cyan ink. As can be seen from FIGS. 4A and 4B, the spectral reflectance characteristics change nonlinearly with respect to each dot quantity. In order to estimate this dot gain, the following estimation formulas are used:

$$\left(\frac{K}{S}\right)_{100\%,\lambda} = \frac{(R_{100\%,\lambda} - 1)^2}{2 \cdot R_{100\%,\lambda}} \quad (8)$$

$$\left(\frac{K}{S}\right)_{Est,\lambda} = \left(\frac{K}{S}\right)_{100\%,\lambda} \cdot \left(\frac{x}{100}\right)^\gamma$$

$$R_{Est,\lambda} = 1 + \left(\frac{K}{S}\right)_{Est,\lambda} - \sqrt{\left(\frac{K}{S}\right)_{Est,\lambda}^2 + 2 \cdot \left(\frac{K}{S}\right)_{Est,\lambda}}$$

$$\text{for } \gamma = a \cdot \log\left(\frac{K}{S}\right)_{100\%,\lambda} + b$$

$R_{100\%,\lambda}$: spectral reflectance when dot quantity=100%
K: absorption coefficient
S: scattering coefficient
x: dot quantity (%)
$R_{Est,\lambda}$: estimated spectral reflectance value when dot quantity x
a, b: constants In the above estimation formulas, constants a and b can use identical values for all inks. These constants can be determined by, e.g., a method of least squares using calorimetric data of arbitrary inks. In this embodiment, spectral reflectance values corresponding to respective dot quantities are estimated with reference to those when the dot quantity=100%, but other dot quantities may be used as a reference. However, estimation using spectral reflectance when the dot quantity=100% can assure higher estimation precision. Using the above estimation formulas, estimated values obtained upon changing the dot quantities of respective inks are calculated for respective wavelengths, and are stored as an LUT in the primary color dot gain LUT storage unit 2004. Note that estimated values are calculated using equations (8) for all wavelengths (41 wavelengths in 10-nm increments from 380 to 780 nm) sampled in the visible wavelength range.

Figure 3:
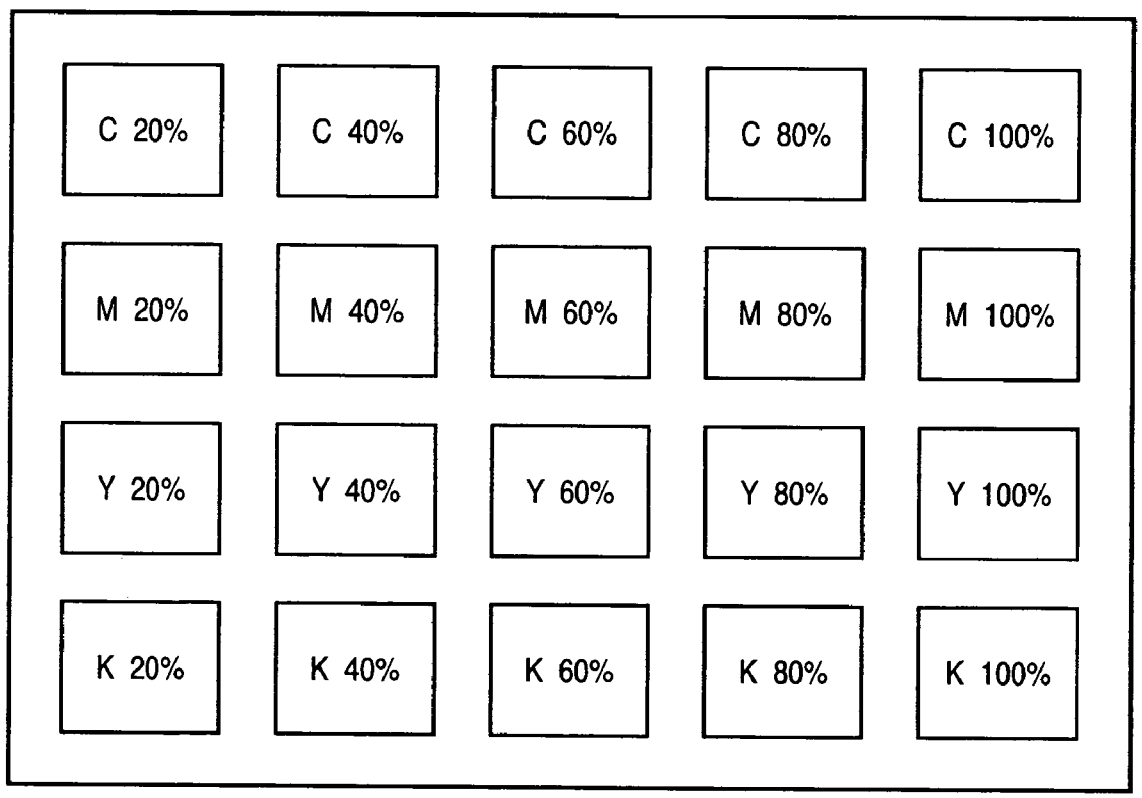
FIG. 3 shows an example of primary color correction patches used in the first embodiment.

Note that the method of actually measuring patches shown in FIG. 3 (the method explained in the first embodiment) may be used as a method of generating the primary color dot gain LUT.

<Calculation of Ink Overlap Correction Coefficient>

The calculation process of the ink overlap correction coefficients in step S2205 will be described below. The process in step S2205 is the same as that in the first embodiment (step S205), and colorimetric data of ink overlap correction patches (FIG. 5) which are output and measured in advance using a printer which is to undergo color reproduction prediction, are stored in the colorimetric value data storage unit 2005.

On the other hand, the initial estimated value calculator 2010 estimates initial estimated spectral reflectance values of the overlap correction patches by equations (4) to (6) using data of the overlap correction patches shown in FIG. 5. The calculated initial estimated spectral reflectance values have errors from actually measured data, which are obtained by measuring overlap correction patches in practice and are stored in the colorimetric value data storage unit 2005. Hence, in order to correct these errors from the actually measured data, correction coefficients $a_{h,\lambda}$, $b_{i,j,\lambda}$, and $c_{k,l,m,\lambda}$ are determined using equation (7) above and a method of least squares or the like to minimize the errors.

The ink overlap correction coefficients obtained in this way are stored in the ink overlap correction coefficient storage unit 2007.

<Ink Overlap Correction>

Details of the ink overlap correction process in step S2209 will be described below. In step S2209, estimation errors due to ink overlap are corrected by equation (7) above from the initial estimated spectral reflectance value calculated in step S2208 using the ink overlap correction coefficients (calculated in step S2205) stored in the ink overlap correction coefficient storage unit 2007.

<Estimation Result Display User Interface>

FIG. 16 shows an example of the user interface used to display the ink optimization result by the ink optimization result display unit 2015. A display method of the ink optimization result will be described in detail below using FIG. 16.

Upon displaying the ink optimization result, the spectral reflectance of each target color set by the user is displayed on a target color spectral reflectance display area 2401, and its tristimulus values are displayed on a target color tristimulus value display area 2403. The output spectral reflectance, which is estimated using inks optimized to reproduce this target color, is displayed on a reproduction color spectral reflectance display area 2402, and tristimulus values at that time are displayed on a reproduction color tristimulus value display area 2405.

Also, the types and dot quantities of inks required to output this reproduction color are displayed on an ink dot quantity display area 2407. An error (e.g., color difference ΔE) between the target color and reproduction color is displayed on an error display area 2404. Note that light source information is required to calculate tristimulus values. Hence, the user can select a desired light source from a light source selection area 2406. When the user selects an ink number of the optimized inks from an ink number selection area 2408, the spectral reflectance of the selected ink is displayed on an optimized ink spectral reflectance display area 2409.

As described above, according to the third embodiment, color agents as candidates and their characteristics are set, a reproduction color is estimated using the set color agents, and an error between a target color and the reproduction color is checked, thereby determining color agents to be used.

Fourth Embodiment

The fourth embodiment of the present invention will be described in detail below with reference to the accompanying drawings.

Figure 17:
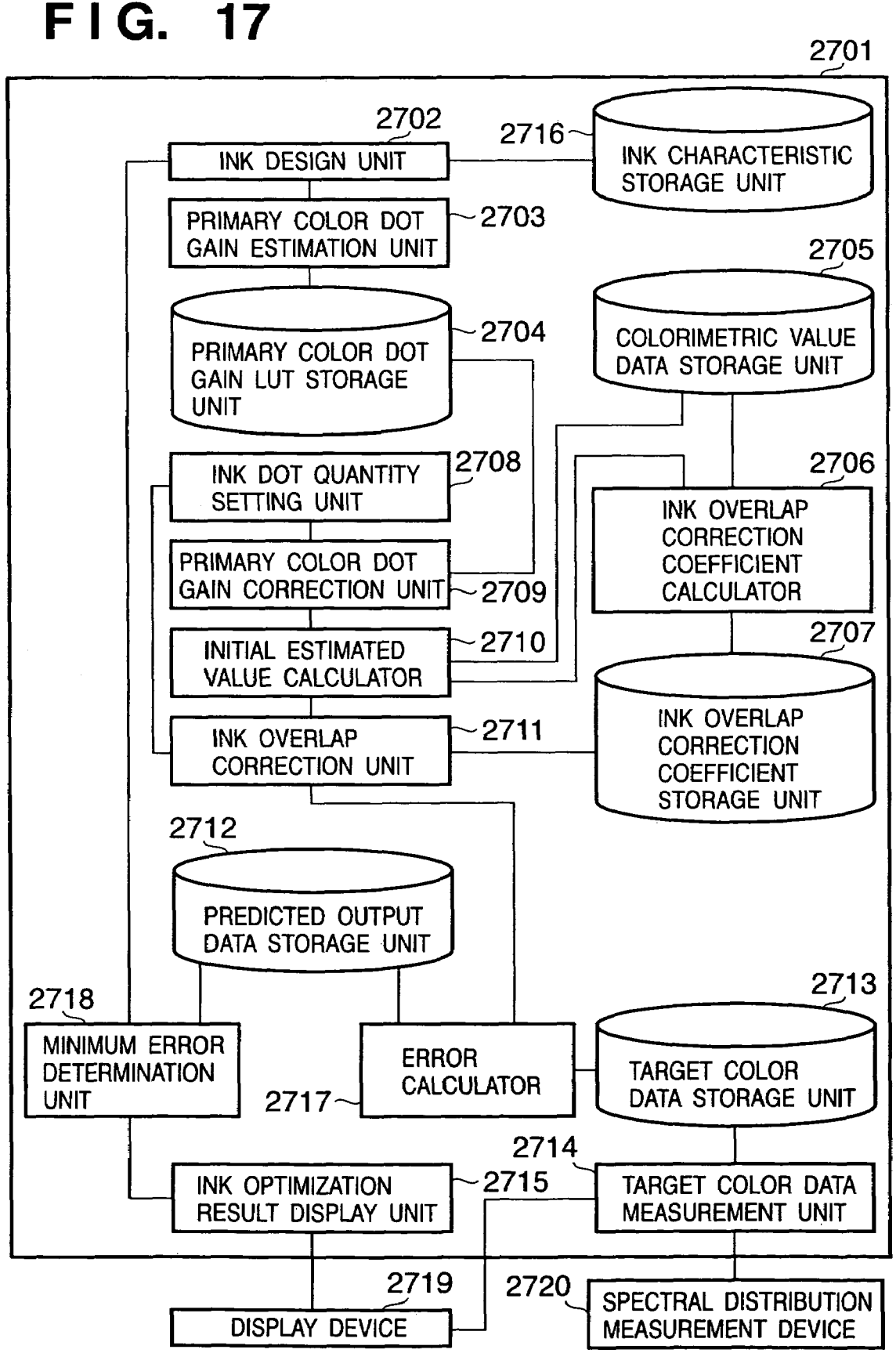
FIG. 17 is a block diagram showing the arrangement of an ink optimization apparatus according to the fourth embodiment.

FIG. 17 is a block diagram showing the arrangement of a color reproduction prediction apparatus according to the fourth embodiment. Referring to FIG. 17, reference numeral 2701 denotes an ink optimization apparatus according to the fourth embodiment.

Reference numeral 2702 denotes an ink design unit, which designs the ink characteristics of a given target color. Reference numeral 2703 denotes a primary color dot gain estimation unit, which estimates a primary color dot gain LUT of the ink designed by the ink design unit 2702. Reference numeral 2704 denotes a primary color dot gain LUT storage unit, which stores the primary color dot gain LUT estimated by the primary color dot gain estimation unit 2703.

Reference numeral 2705 denotes a calorimetric value data storage unit, which stores the colorimetric values of output patches of a printer used in an ink optimization process. Reference numeral 2706 denotes an ink overlap correction coefficient calculator, which calculates ink overlap correction coefficients on the basis of the calorimetric values stored in the calorimetric value data storage unit 2705. Reference numeral 2707 denotes an ink overlap correction coefficient storage unit, which stores the ink overlap correction coefficients calculated by the ink overlap correction coefficient calculator 2706.

Reference numeral 2708 denotes an ink dot quantity setting unit, which sets ink dot quantities of the designed ink. Reference numeral 2709 denotes a primary color dot gain correction unit, which makes primary color correction in correspondence with the ink dot quantities set by the ink dot quantity setting unit 2708. Reference numeral 2710 denotes an initial estimated value calculator, which calculates, as a color mixing result, an initial estimated spectral reflectance value on the basis of primary color values corrected by the primary color dot gain correction unit 2709. Reference numeral 2711 denotes an ink overlap correction unit, which corrects the initial estimated spectral reflectance value calculated by the initial estimated value calculator 2710 using the ink overlap correction coefficients stored in the ink overlap correction coefficient storage unit 2707, and the ink dot quantities stored in the ink dot quantity storage unit 2709, thus calculating an estimated spectral reflectance value.

Reference numeral 2712 denotes a predicted output data storage unit which stores a predicted output value. Reference numeral 2713 denotes a target color data storage unit, which stores a target color set by the user. Reference numeral 2714 denotes a target color data measurement unit which provides a user interface, with which the user measures a target color. Reference numeral 2715 denotes an ink optimization result display unit, which displays optimized ink information on a display device 2719. Reference numeral 2716 denotes an ink characteristic storage unit, which stores characteristics of paper used in a print process, and ink characteristics obtained by measuring those of some existing inks, in advance. Reference numeral 2717 denotes an error calculator, which calculates an error between predicted output data and a target color. Reference numeral 2718 denotes a minimum error determination unit, which compares a minimum error value with a threshold value. Reference numeral 2719 denotes a display device, which comprises a CRT, LCD, or the like. Reference numeral 2720 denotes a spectral distribution measurement device which comprises, e.g., a spectrophotometer or the like and measures a target color.

<Ink Optimization Process>

Figure 18:
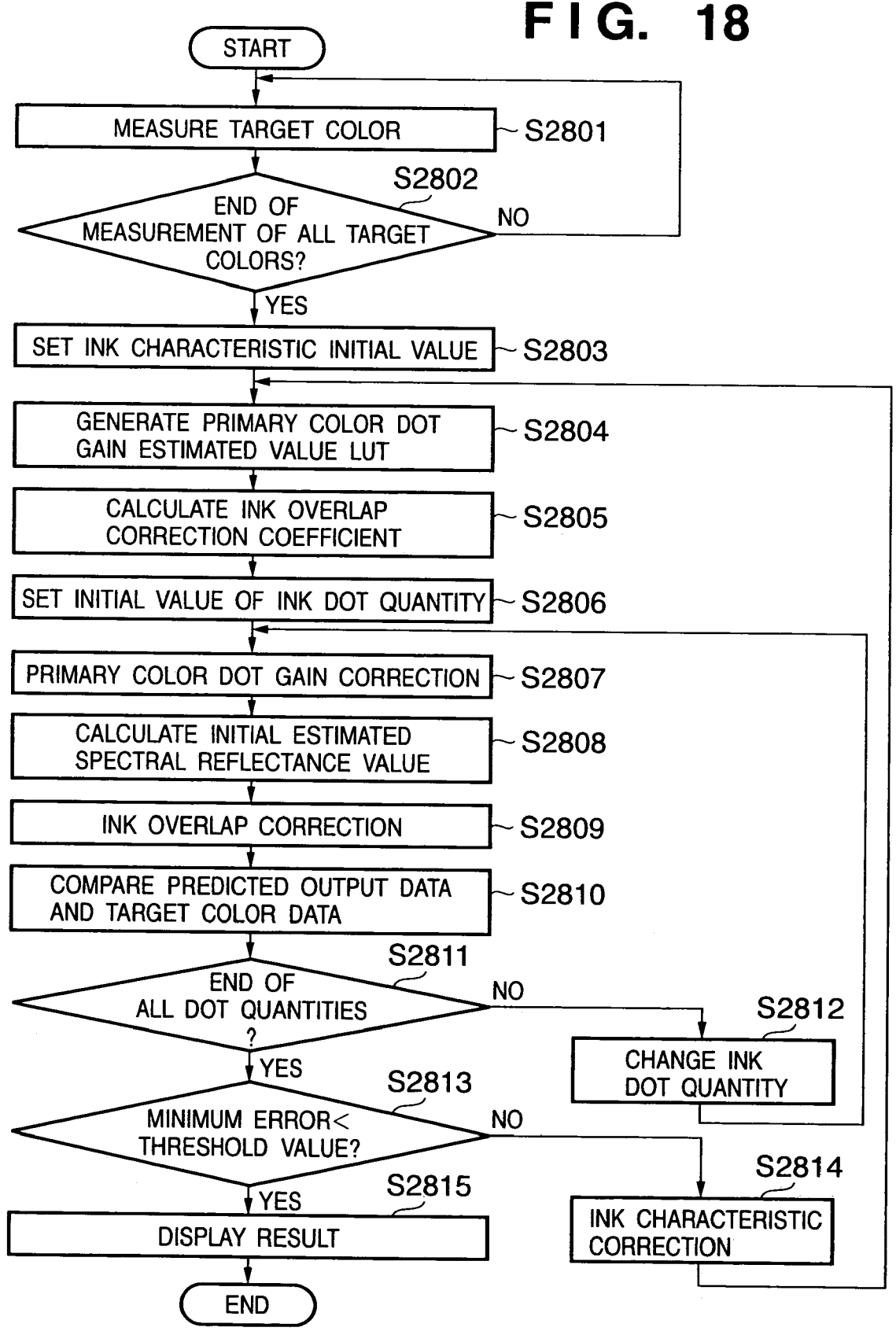
FIG. 18 is a flow chart for explaining an ink optimization process in the ink optimization apparatus of the fourth embodiment.
Figure 19:
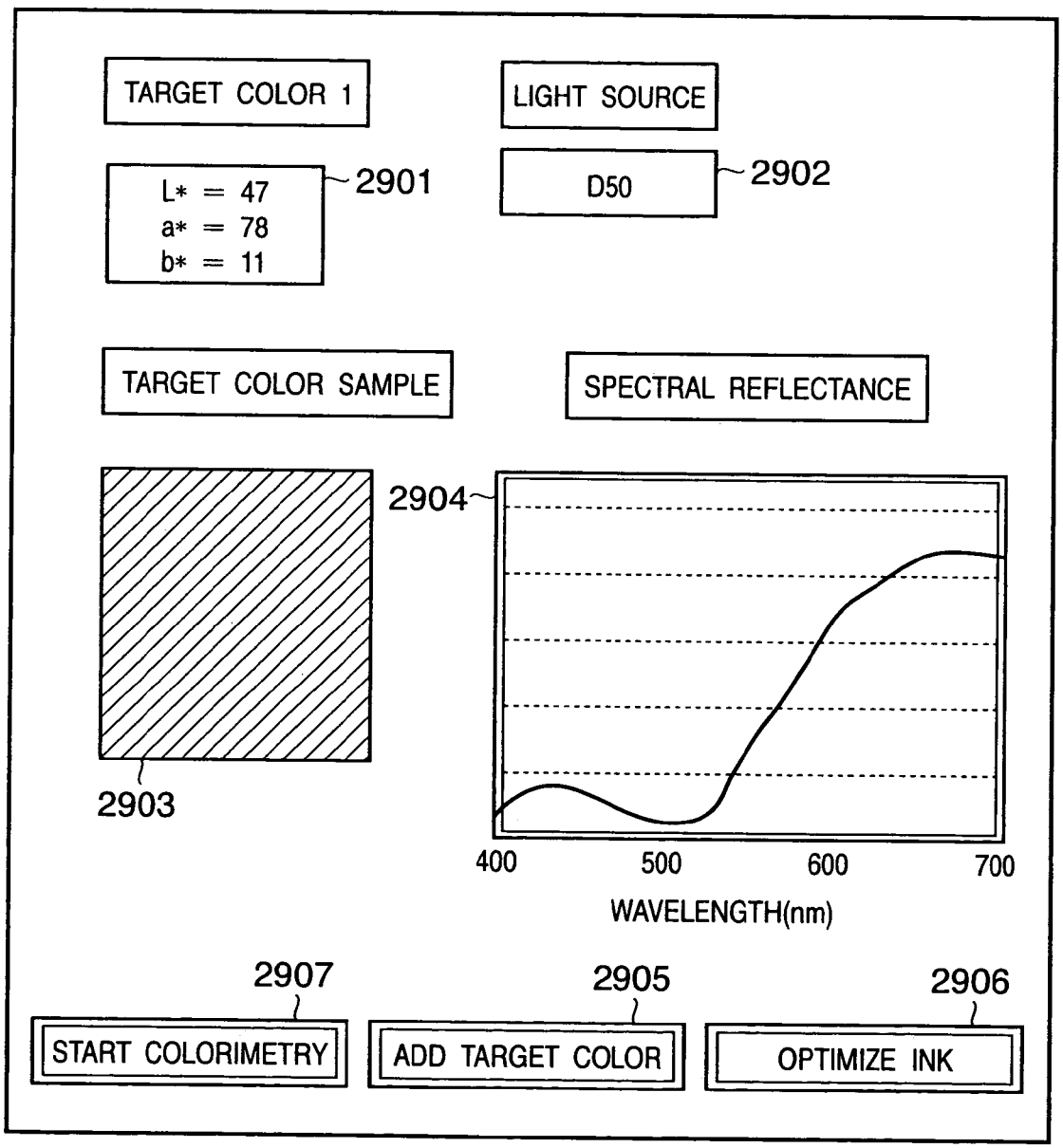
FIG. 19 shows an example of a user interface used to set a target color in the fourth embodiment.

FIG. 18 is a flow chart showing an ink optimization process executed by the ink optimization apparatus 2701 of the fourth embodiment. FIG. 19 shows an example of a user interface which is provided by the target color measurement unit 2714 to allow the user to measure a target color. Note that the user interface for displaying the ink optimization result is displayed on the display device 2719 under the control of the ink optimization result display unit 2715, and its contents are the same as those of the third embodiment (FIG. 16). The ink optimization process according to the fourth embodiment will be described below.

In step S2801, the user measures a desired target color using the target color measurement unit 2714, and stores it in the target color data storage unit 2713. It is checked in step S2802 if the user has measured all target colors. If YES in step S2802, the flow advances to step S2803. Whether or not the user has measured all target colors is determined by examining if an ink optimization start instruction is issued upon depression of an ink optimization button 2906 (FIG. 19). Note that the target color measurement operation and the like using the user interface provided by the target color measurement unit 2714 will be described later.

If the ink optimization start instruction is issued, the ink design unit 2702 reads out and sets, as initial values, spectral reflectance data of C, M, Y, and K inks, which are normally used, and those of special color inks such as green, orange, and the like when the dot quantity=100%, of the ink characteristics stored in the ink characteristic storage unit 2716 in step S2803.

In step S2804, the primary color dot gain estimation unit 2703 estimates dot gains at arbitrary dot quantities on the basis of the spectral reflectance data when the ink dot quantity=100%, which are set by the ink design unit 2702, and generates an LUT. This LUT is stored in the primary color correction LUT storage unit 2704.

In step S2805, the ink overlap correction coefficient calculator 2706 reads the ink overlap calorimetric values stored in the colorimetric value data storage unit 2705, and calculates ink overlap correction coefficients. The calculated ink overlap correction coefficients are stored in the ink overlap correction coefficient storage unit 2707. Since the ink overlap correction coefficients use identical values in all ink combinations, the process in step S2805 may be skipped after it is executed once. In step S2806, all ink dot quantities are set to initial values (e.g., 0%) to prepare for processes in step S2807 and subsequent steps.

In step S2807, the primary dot gain correction unit 2709 corrects primary color dot gains using the ink dot quantities set by the ink dot quantity setting unit 2708 and the primary color dot gain LUT stored in the primary color dot gain LUT storage unit 2704, thus calculating spectral reflectance values corresponding to the given ink dot quantities. In step S2808, the initial estimated value calculator 2710 predicts a mixed color based on the spectral reflectance values of inks calculated by the primary color dot gain correction unit 2709 using the KM theory given by equations (4) to (6) above, thus calculating an initial estimated spectral reflectance value. Furthermore, in step S2809 the ink overlap correction unit 2711 corrects the initial estimated spectral reflectance value estimated by the initial estimated value calculator 2710 using the ink overlap correction coefficients stored in the ink overlap correction coefficient storage unit 2707, thereby calculating a spectral distribution final estimation result.

In step S2810, the error calculator 2717 calculates an error between the calculated spectral distribution final estimation result, and each target color. If the error is smaller than a minimum value stored in the predicted output data storage unit 2712 at that time, the minimum error value is updated by that calculated error, and ink characteristics and dot quantities at that time are stored in the predicted output data storage unit 2712.

It is checked in step S2811 if all combinations of dot quantities of the currently set inks have been checked. If all combinations have been checked, the flow advances to step S2813; otherwise, the flow advances to step S2812. In step S2812, the dot quantities are changed by a given change amount.

The minimum error determination unit 2718 checks in step S2813 if the minimum error value stored in the predicted output data storage unit 2712 is larger than a set threshold value. If the minimum error value is larger than the threshold value, the flow advances to step S2814; otherwise, the flow advances to step S2815. In step S2814, at least one of the currently set inks is replaced by an ink having other characteristics, which is read out from the ink characteristic storage unit 2716. After replacement, the flow returns to step S2805 to repeat the above processes. In step S2815, the minimum error value stored in the predicted output data storage unit 2712 and the ink characteristics and dot quantities that that time are displayed by a display method shown in, e.g., FIG. 16.

<Target Color Measurement User Interface>

FIG. 19 shows an example of the user interface that allows the user to measure a target color using the target color data measurement unit 2714. The method of measuring a target color will be described in detail below using FIG. 19.

After the user selects a desired light source from a light source selection area 2902, he or she sets a target color patch to be output by a printer, and presses a colorimetry start button 3907. Then, the tristimulus values of the measured target color under the selected light source are displayed on a target color tristimulus value display area 2901, and spectral reflectance is displayed on a target color spectral reflectance display area 2904. The tristimulus values are converted into R, G, and B values of a monitor via an ICC profile or the like, and a color specified by the converted R, G, and B values is displayed on a target color confirmation area 903. Note that the ICC profile is a file that describes a method (i.e., a specific color space) for reproducing a color by a specific device (monitor, scanner, printer, or the like), i.e., describes R, G, and B values required to reproduce the same color as device-independent color information (in this case, L*a*b*) using a given device. When the user wants to add another target color, he or she can add a target color by pressing a target color addition button 2905. When the user has input all target colors and wants to start ink optimization, he or she can press the ink optimization button 2906.

As described above, according to the third and fourth embodiments, upon setting color agents required to reproduce a target color, color agent characteristics as candidates are set, a reproduction color is estimated using the set color agents, and color agents to be used are determined on the basis of the checking result of an error between the target color and reproduction color. Therefore, color agents which can best reproduce the target color can be automatically selected.

<Number and Type of Inks Used>

In the third and fourth embodiments, a combination of six color inks are to be optimized. However, the number of colors is not limited to six. For example, a combination of five or less or seven or more color inks may be optimized. Alternatively, when conventional C, M, Y, and K inks are used as default inks, and one or a plurality of color inks are to be added, only ink or inks to be added can be optimized.

<Ink Characteristics Used in Ink Optimization>

In the third and fourth embodiments, as ink characteristics used as optimization candidates, the measurement results of existing ink characteristics pre-stored in the ink characteristic storage unit 2016 or 2716 are used. Alternatively, after ink optimization, ink having other characteristics may be additionally stored to make re-calculation. Also, by changing the characteristics (e.g., peak wavelength or reflectance) of existing ink in a computer as needed, ink having virtual characteristics may be set. Furthermore, the user may freely designate desired ink characteristics, and may add them as an ink candidate. That is, the characteristics of inks to be used in these embodiments may be those of either existing or virtual inks, and the present invention is not-limited to them.

<Change in Ink Dot Quantity>

In the third and fourth embodiments, the ink dot quantity is changed by a given amount to search for a dot quantity that can minimize an error from the target color. The change amount of the dot quantity is not limited to a specific value, and the same value need not always be used in the whole processes. For example, a large change amount may be used within a large error range to make searches at coarse intervals. As an error becomes smaller, the change amount is decreased to make fine searches. That is, since such process is a combination optimization problem that determines optimal ink dot quantities when an error between a target color and estimated output value is considered as an evaluation function, general methods of solving the combination optimization problem such as the steepest descent method, simulated annealing, genetic algorithm, and the like may be used. (Note that variations associated with the change amount of the dot quantity can be applied to the process in step S814 of the second embodiment.)

As described above, according to the third and fourth embodiments, appropriate color agents required to precisely reproduce a target color can be easily selected.

Fifth Embodiment

In the fifth and sixth embodiments to be described below, a color gamut prediction process will be explained.

Figure 20:
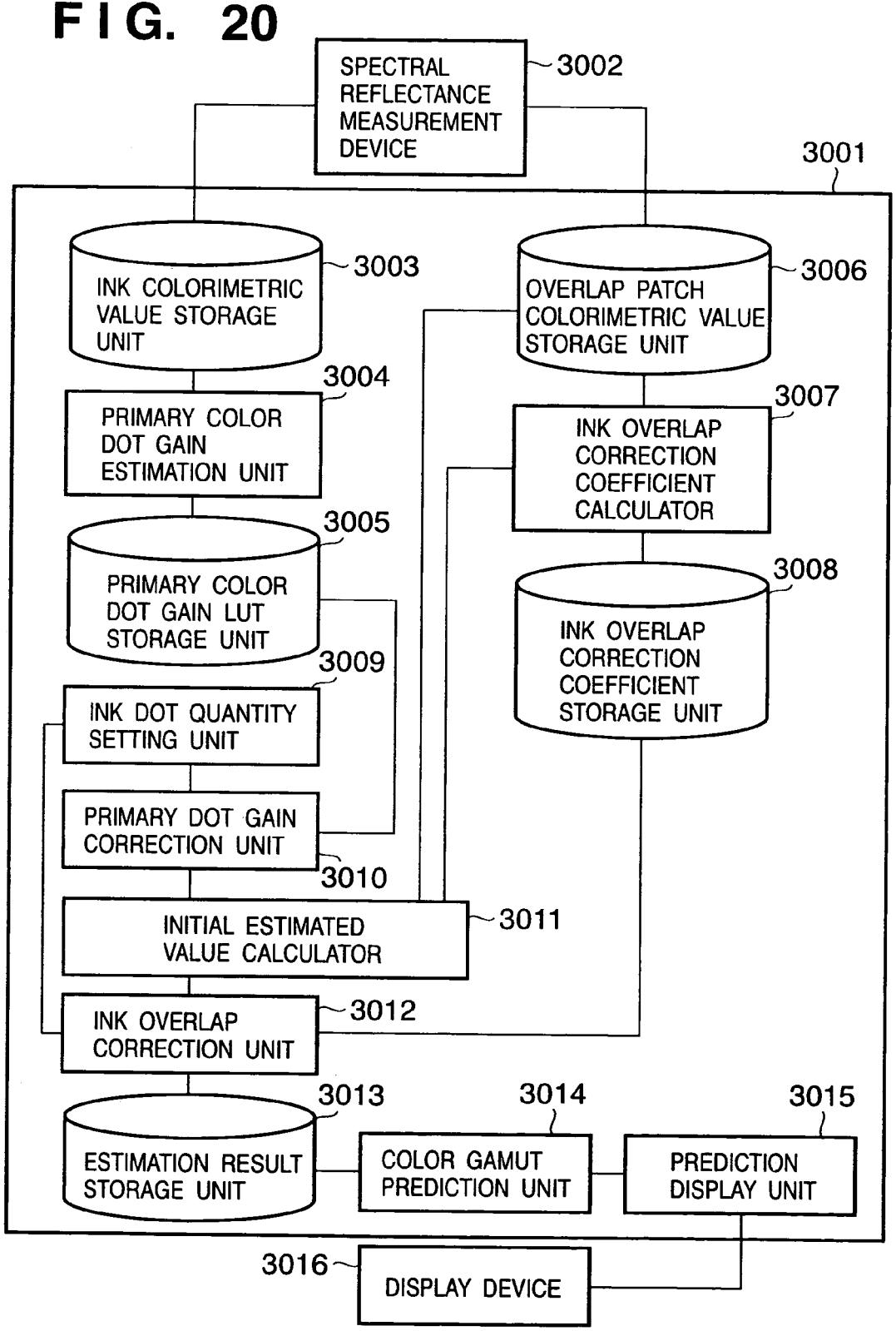
FIG. 20 is a block diagram showing the arrangement of a color gamut prediction apparatus according to the fifth embodiment.

FIG. 20 is a block diagram showing the arrangement of a color gamut prediction apparatus according to the fifth embodiment. Reference numeral 3001 denotes a color gamut prediction apparatus according to the fifth embodiment. Respective units will be briefly explained below. Detailed operations and the like of these units will become more apparent from a description of a color gamut prediction process that will be explained later with reference to the flow charts of FIGS. 21A and 21B.

Reference numeral 3002 denotes a spectral reflectance measurement device which measures ink and printer characteristics by measuring spectral reflectance data of color patches output by a printer, the color gamut of which is to be predicted. Reference numeral 3003 denotes an ink calorimetric value storage unit, which stores ink spectral reflectance data measured by the spectral reflectance measurement device 3002. Reference numeral 3004 denotes a primary color dot gain estimation unit, which estimates primary color dot gains from the ink colorimetric values stored in the ink calorimetric value storage unit 3003. Reference numeral 3005 denotes a primary color dot gain LUT storage unit, which stores the primary color dot gains estimated by the primary color dot gain estimation unit 3004 as an LUT. Note that the printer characteristics indicate correction coefficients obtained based on the difference between an estimated value estimated using the KM theory and an actual output value when different inks overlap each other in a printer output. In other words, the printer characteristics are parameters for an ink overlap correction unit 3012 to be described later. By contrast, the ink characteristics are parameters for a primary dot gain correction unit 3010 to be described later.

Reference numeral 3006 denotes an overlap patch calorimetric value storage unit, which stores the calorimetric values of overlap patches measured by the spectral reflectance measurement device 3002. Reference numeral 3007 denotes an ink overlap correction coefficient calculator, which calculates ink overlap correction coefficients on the basis of the calorimetric values of ink overlap patches stored in the overlap patch calorimetric value storage unit 3006. Reference numeral 3008 denotes an ink overlap correction coefficient storage unit, which stores the ink overlap correction coefficients calculated by the ink overlap correction coefficient calculator 3007.

Reference numeral 3009 denotes an ink dot quantity setting unit, which sets the dot quantities of inks used in color gamut estimation. Reference numeral 3010 denotes a primary color dot gain correction unit, which makes primary color correction in correspondence with the ink dot quantities set by the ink dot quantity setting unit 3009. Reference numeral 3011 denotes an initial estimated value calculator, which estimates a color mixing result from the primary color values corrected by the primary color dot gain correction unit 3010. Reference numeral 3012 denotes an ink overlap correction unit, which corrects an initial estimated spectral reflectance value calculated by the initial estimated value calculator 3011 using the ink overlap correction coefficients stored in the ink overlap correction coefficient storage unit 3008 and the ink dot quantities stored in the ink dot quantity storage unit 3009.

Reference numeral 3013 denotes an estimation result storage unit, which stores an estimated output result corrected by the ink overlap correction unit 3012. Reference numeral 3014 denotes a color gamut prediction unit, which predicts a color gamut on the basis of the spectral distribution (spectral reflectance) stored in the estimation result storage unit 3013. Reference numeral 3015 denotes a prediction result display unit, which displays a color gamut prediction result and the like on a display device 3016. Reference numeral 3016 denotes a display device, which comprises a CRT, LCD, or the like, and displays the color gamut prediction result under the control of the prediction result display unit 3015.

<Color Gamut Prediction Process>

Figure 21A:
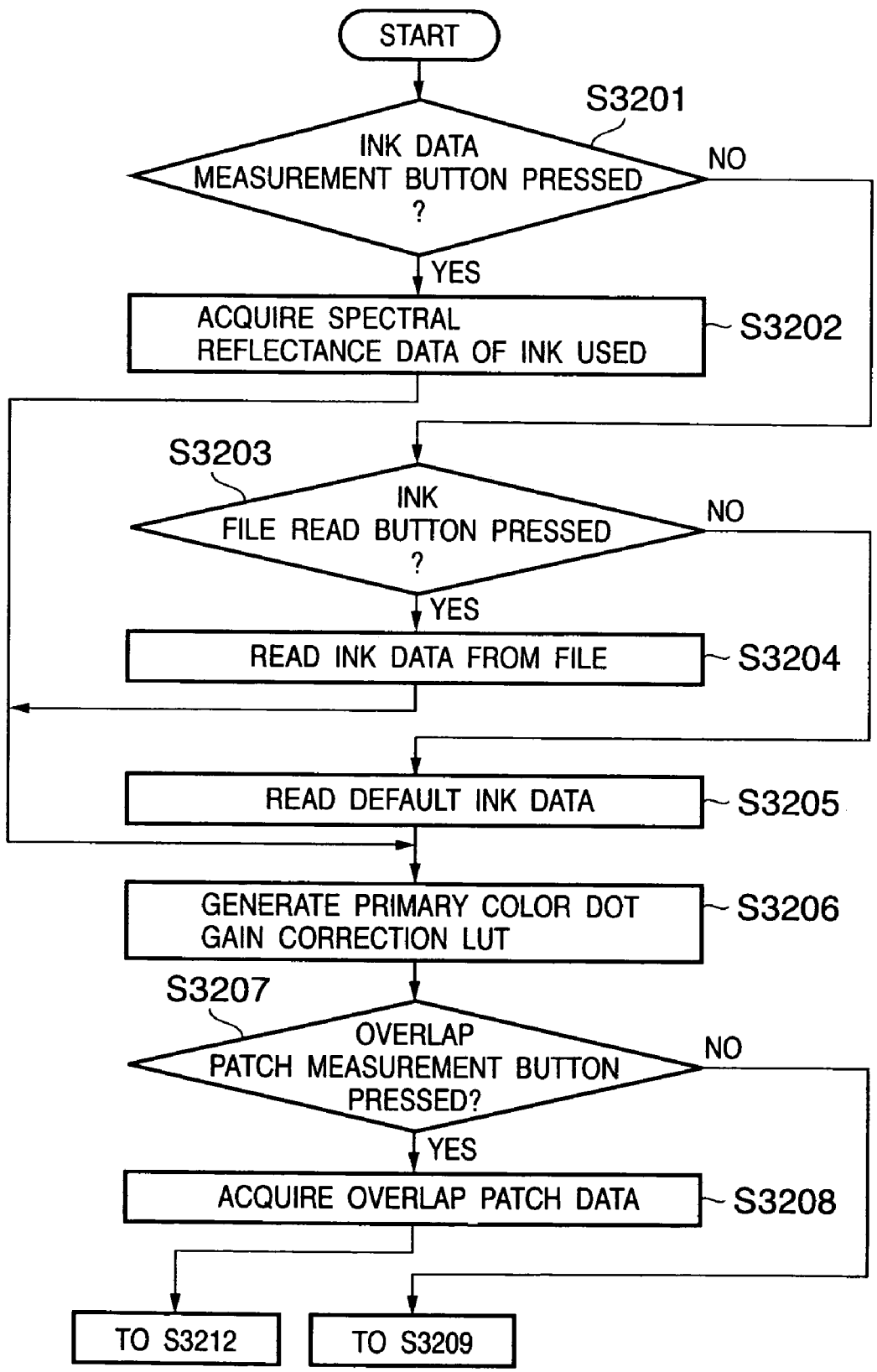
FIGS. 21A and 21B are flow charts for explaining a color gamut prediction process according to the fifth embodiment.
Figure 21B:
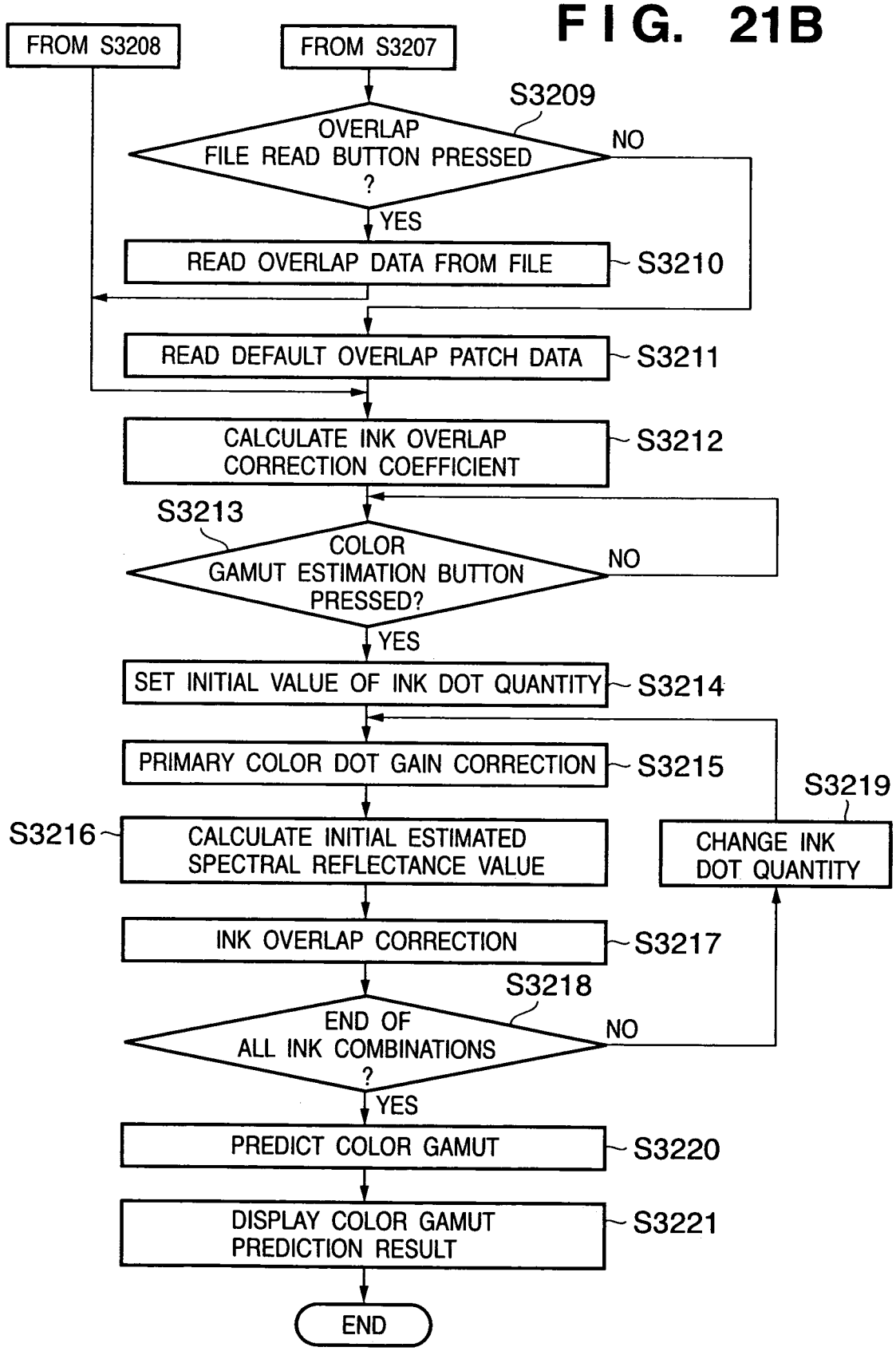
Figure 22:
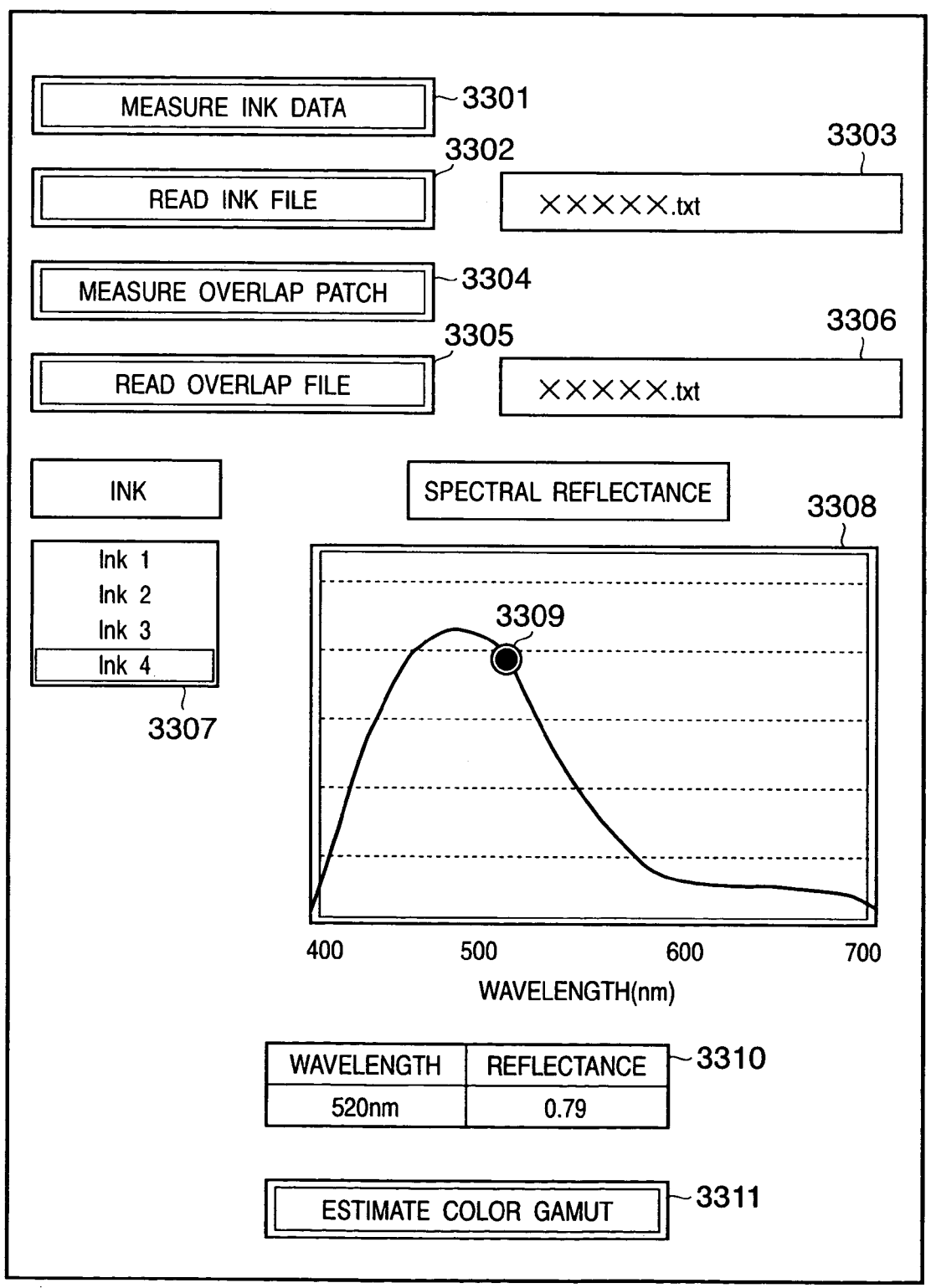
FIG. 22 shows an example of a user interface used to input ink information according to the fifth embodiment.
Figure 23:
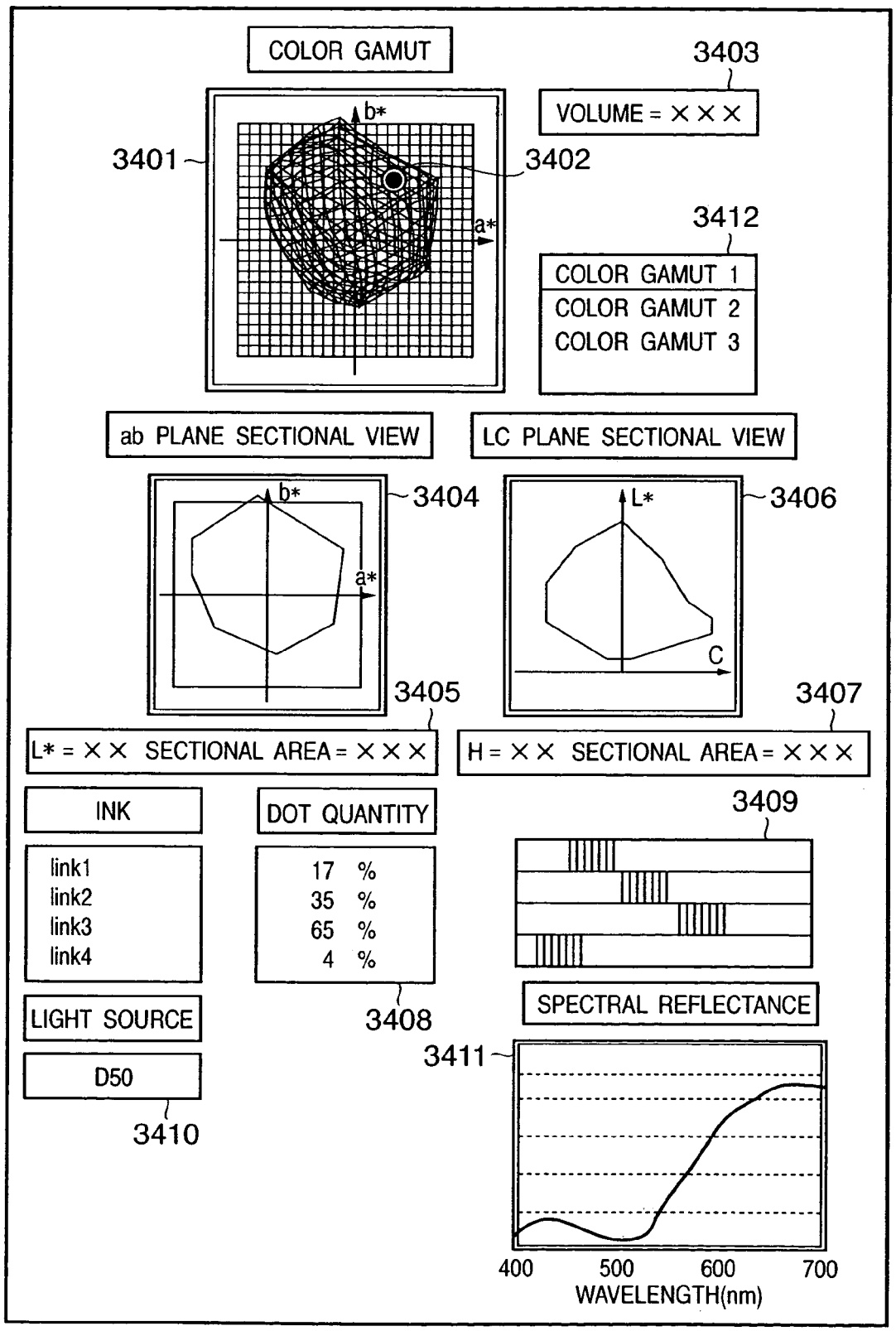
FIG. 23 shows an example of a user interface used to display a color gamut prediction result according to the fifth embodiment.

The color gamut prediction process by the color gamut prediction apparatus 3001 with the above arrangement will be explained below. FIGS. 21A and 21B are flow charts showing the color gamut prediction process executed by the color gamut prediction apparatus 3001. FIG. 22 shows an example of a user interface which can be used upon inputting ink characteristics. FIG. 23 shows an example of a user interface which can be used to display the color gamut prediction result.

It is checked in step S3201 if the user has pressed an ink data measurement button 3301. If YES in step S3201, the flow advances to step S3202. In step S3202, the spectral reflectance data of a patch when the dot quantity of the ink used is 100% is measured using the spectral reflectance measurement device 3002, and the calorimetric value is stored in the ink calorimetric value storage unit 3003. At this time, an ink number is displayed on an ink number display area 3307, and the measured spectral reflectance is displayed on an ink spectral reflectance display area 3308. Note that a default number "user set No. ΔΔ" may be assigned as the ink number of ink data measured by the user, and that default number may be used after user makes measurement, or the name of a dye used in the ink may be newly assigned. The flow then advances to step S3206.

If the user has not pressed the ink data measurement button 3301, the flow jumps to step S3203. It is checked in step S3203 if the user has pressed an ink file read button 3302. If YES in step S3203, the flow advances to step S3204. In step S3204, ink data is read from a file designated by the user in an ink data file designation area 3303, and is stored in the ink calorimetric value storage unit 3003. At this time, an ink number is displayed on the ink number display area 3307, and spectral reflectance obtained from the ink data is displayed on the ink spectral reflectance display area 3308.

If neither the ink data read button 3301 nor the ink file read button 3303 have been pressed, the flow jumps to step S3205. In step S3205, ink data, which is measured in advance by the user or is delivered from, e.g., a manufacturer or the like, is stored as default ink data in the ink calorimetric value storage unit 3003. Then, an ink number is displayed on the ink number display area 3307, and spectral reflectance obtained from the ink data is displayed on the ink spectral reflectance display area 3308. Note that the user can modify ink information stored in the ink calorimetric value storage unit 3003 in step S3202, S3204, or S3205 to desired characteristics using a user interface (ink spectral reflectance display area 3308) (details will be described later).

In step S3206, the primary color dot gain estimation unit 3004 estimates dot gains at arbitrary dot quantities on the basis of the spectral reflectance data (that at 100%) of the ink stored in the ink calorimetric value storage unit 3003, and stores the estimation results as an LUT in the primary color dot gain LUT storage unit 3005 (details will be described later).

It is checked in step S3207 if the user has pressed an overlap patch measurement button 3304. If YES in step S3207, the flow advances to step S3208. In step S3208, spectral reflectance data of overlap patches are measured using the spectral reflectance measurement device 3002, and the measurement results are stored in the overlap patch calorimetric value storage unit 3006. The overlap patches will be described later.

If the user has not pressed the overlap patch measurement button 3304, the flow jumps to step S3209. It is checked in step S3209 if the user has pressed an overlap file read button 3305. If YES in step S3209, the flow advances to step S3210. In step S3210, overlap patch data are read from a file designated by the user in an overlap file designation area 3306, and are stored in the overlap patch calorimetric value storage unit 3006. If neither the overlap patch measurement button 3304 nor the overlap file read button 3305 have been pressed, the flow jumps to step S3211. In step S3211, overlap patch data, which are measured in advance by the user or are delivered from, e.g., a manufacturer or the like, is stored as default data in the overlap patch calorimetric value storage unit 3006.

In step S3212, the ink overlap correction coefficient calculator 3007 calculates ink overlap correction coefficients, and stores them in the ink overlap correction coefficient storage unit 3008. More specifically, the initial estimated value calculator 3011 reads the calorimetric values of the ink overlap patches stored in the overlap patch calorimetric value storage unit 3006, and calculates initial estimated spectral distribution values of the ink overlap patches. The ink overlap correction coefficient calculator 3007 calculates ink overlap correction coefficient (to be described in detail later) on the basis of the differences between the initial estimated spectral distribution values estimated by the initial estimated value calculator 3011 and actual calorimetric values stored in the overlap patch calorimetric value storage unit 3006, and stores them in the ink overlap correction coefficient storage unit 3008.

It is checked in step S3213 if the user has pressed a color gamut estimation button 3311. If YES in step S3213, the flow advances to step S3214; otherwise, the control waits until that button is pressed. In step S3214, the ink dot quantity setting unit 3009 sets initial values of the ink dot quantities (e.g., all ink dot quantities=0%). In step S3215, the primary color dot gain correction unit 3010 corrects primary color dot gains using the ink dot quantities set by the ink dot quantity setting unit 3009 and the primary color dot gain LUT stored in the primary color dot gain LUT storage unit 3005, thus calculating spectral reflectance values corresponding to the given ink dot quantities. In step S3216, the initial estimated value calculator 3011 predicts a mixed color based on the spectral reflectance values of the inks calculated by the primary color dot gain correction unit 3010 using the KM theory given by equations (4) to (6) above.

In step S3217, the ink overlap correction unit 3012 corrects an initial estimated spectral reflectance value estimated by the initial estimated value calculator 3011 (estimated in step S3216) using the ink overlap correction coefficients stored in the ink overlap correction coefficient storage unit 3008, thus calculating a final spectral reflectance estimation result.

It is checked in step S3218 if the ink dot quantity setting unit 3009 has formed all combinations of ink dot quantities. If YES in step S3218, the flow advances to step S3220; otherwise, the flow advances to step S3219. In step S3219, the ink dot quantity setting unit 3009 changes the ink dot quantities by a predetermined amount, and the flow returns to step S3215. On the other hand, the color gamut prediction unit 3014 calculates a color gamut on the basis of the estimated spectral reflectance value stored in the estimation result storage unit 3013 in step S3220 (details will be described later). In step S3221, the estimation result display unit 3015 displays the estimated color gamut on the display device 3016 using a user interface shown in, e.g., FIG. 23 (details will be described later).

<Ink Information Input User Interface>

Details of the ink information input user interface shown in FIG. 22 will be described below. The ink number of ink information stored in the ink calorimetric value storage unit 3003 is displayed on the ink number display area 3307, and its spectral reflectance is displayed on the ink spectral reflectance display area 3308. Note that the user can modify the ink information stored in the ink colorimetric value storage unit 3003 to desired characteristics by moving an ink spectral reflectance display point 3309 using a mouse or the like, or by directly inputting the wavelength and reflectance in an ink spectral reflectance numerical value input area 3310. The reflectance values of wavelengths near the wavelength at which the reflectance has been changed by the user may be left unchanged, or may be smoothly changed by interpolation or the like.

<Generation of Primary Color Dot Gain LUT>

The primary color dot gain LUT generation process in step S3206 will be described below. In this embodiment, the primary color dot gain estimation unit 3004 estimates the dot gain of ink stored in the ink calorimetric value storage unit 3003.

In order to estimate the dot gain, estimation formulas (8) above are used.

Estimation values obtained upon changing the dot quantity of each ink are calculated for respective wavelengths, and are stored as an LUT in the primary color dot gain LUT storage unit 3005.

Note that the primary color dot gain LUT may be acquired by actually measuring patches shown in FIG. 3 as in the first embodiment.

<Calculation of Ink Overlap Correction Coefficient>

The ink overlap correction coefficient calculation process in step S3212 is the same as that in step S2205 of the third embodiment.

That is, the initial estimated spectral reflectance values of overlap correction patches are estimated by equations (4) to (6) above using correction patch data used to output overlap correction patches shown in FIG. 5. The calculated initial estimated spectral reflectance values have errors from actually measured data, which are stored in the overlap patch calorimetric value storage unit 3006. Hence, in order to correct errors from the actually measured data, correction coefficients $a_{h,\lambda}$, $b_{i,j,\lambda}$, and $c_{k,l,m,\lambda}$ are determined using equation (7) above and a method of least squares or the like to minimize the errors.

The ink overlap correction coefficients are stored in the ink overlap correction coefficient storage unit 3008.

<Ink Overlap Correction>

In step S3217, estimation errors due to ink overlap are corrected from the initial estimated spectral reflectance values calculated in step S3216 using the ink overlap correction coefficients stored in the ink overlap correction coefficient storage unit 3008 and equation (7).

<Color Gamut Prediction>

A method of calculating a color gamut from the spectral reflectance estimation result stored in the estimation result storage unit 3013 in step S3220 will be described in detail below.

The estimation result storage unit 3013 stores the estimated spectral reflectance estimation result, and the ink dot quantities corresponding to that spectral reflectance. The tristimulus values of spectral reflectance obtained upon changing the ink dot quantities in given increments (e.g., in 10%-increments from 0% to 100%) are calculated, are three-dimensionally laid out on an Lab space, and respective points are interpolated by polyhedrons, thus expressing a color gamut of the ink used in color gamut estimation as the polyhedrons on the Lab space.

<Color Gamut Prediction Result Display User Interface>

The color gamut prediction result display user interface shown in FIG. 23 will be described below.

The color gamut prediction result stored in the color gamut prediction unit 3014 is displayed on a color gamut prediction result display area 3401. At this time, the user can rotate, enlarge, or reduce the displayed color gamut, and can observe it at an arbitrary angle and scale. The volume of the predicted color gamut is displayed on a color gamut volume display area 3403. Also, a sectional view taken along an a*b* plane of arbitrary lightness (L*) designated by the user in an ab plane sectional area display area 3405 is displayed on an ab plane sectional view display area 3404. Likewise, a sectional view taken along an LC plane of arbitrary hue (H) designated by the user in an LC plane sectional area display area 3407 is displayed on an LC plane sectional view display area 3406. Furthermore, the sectional areas of the sections, and L* (lightness) and H (hue) are respectively displayed on the ab plane sectional area display area 3405 and LC plane sectional area display area 3407.

Moreover, when the user inputs the dot quantities of respective inks (from Ink1 to Ink4 in FIG. 23) in an ink dot quantity input area 3408 as numerical values or designates them using dot quantity designation slider bars 3409, the spectral reflectance prediction result corresponding to the designated dot quantities is displayed on a spectral reflectance prediction result display area 3411, and tristimulus values at that time are displayed as a tristimulus value prediction point 3402 on the color gamut prediction result display area 3401. At this time the user can freely select light source information required to calculate the tristimulus values from a light source information selection area 3410. The calculated color gamut is stored in the estimation result storage unit 3013 every time the user has changed ink combinations. When a color gamut selected by the user from a color gamut number selection area 3412 is displayed on the color gamut prediction result display area 3401 in turn, the relationship between the types of inks used by the user and the color gamut can be visually recognized.

As described above, according to the fifth embodiment, color reproduction is estimated using the color agent characteristics of an image output device, and a color gamut can be precisely predicted based on the estimation result of color reproduction.

Sixth Embodiment

The sixth embodiment will be described in detail below with reference to the accompanying drawings. In the fifth embodiment, various kinds of information of the estimated color gamut are displayed, as shown in FIG. 23. In the sixth embodiment, whether the colors of respective pixels of an image to be output (to be printed) fall inside or outside the color gamut is determined based on the color gamut prediction result, and that determination result is presented to the user.

Figure 24:
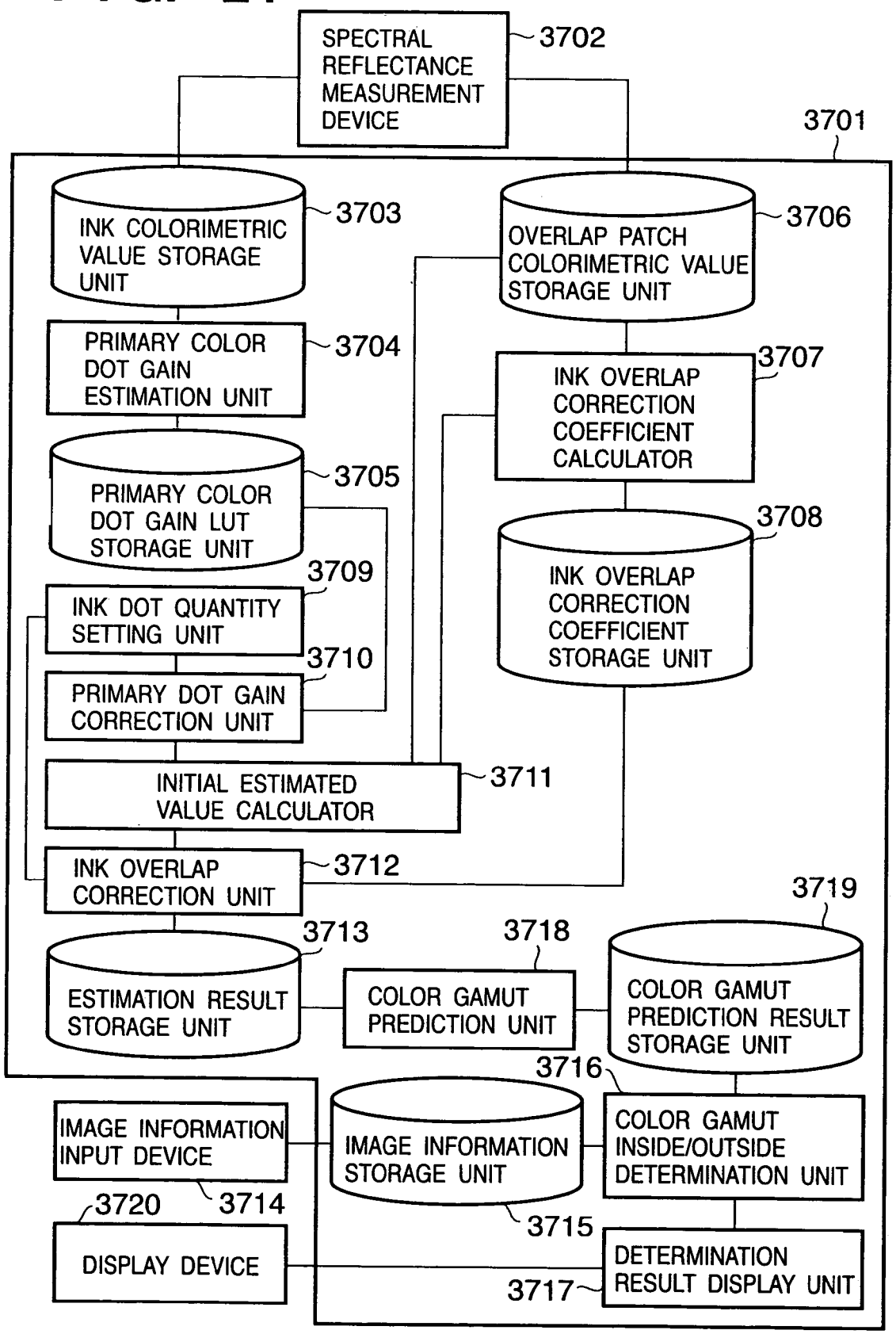
FIG. 24 is a block diagram showing the arrangement of a color gamut prediction apparatus of the sixth embodiment.

FIG. 24 is a block diagram showing the arrangement of a color gamut inside/outside determination apparatus according to the sixth embodiment. Reference numeral 3701 denotes a color gamut inside/outside determination apparatus according to the sixth embodiment.

Components denoted by reference numerals 3702 to 3713 and 3718 are similar to those denoted by reference numerals 3002 to 3013 in the fifth embodiment. Reference numeral 3702 denotes a spectral reflectance measurement device which measures ink and printer characteristics. Reference numeral 3703 denotes an ink calorimetric value storage unit, which stores ink spectral reflectance data measured by the spectral reflectance measurement device 3702. Reference numeral 3704 denotes a primary color dot gain estimation unit, which estimates primary color dot gains from the ink colorimetric values stored in the ink calorimetric value storage unit 3703. Reference numeral 3705 denotes a primary color dot gain LUT storage unit, which stores the primary color dot gains estimated by the primary color dot gain estimation unit 3704 as an LUT.

Reference numeral 3706 denotes an overlap patch calorimetric value storage unit, which stores the calorimetric values of overlap patches measured by the spectral reflectance measurement device 3702. Reference numeral 3707 denotes an ink overlap correction coefficient calculator, which calculates ink overlap correction coefficients on the basis of the colorimetric values of ink overlap patches stored in the overlap patch calorimetric value storage unit 3706. Reference numeral 3708 denotes an ink overlap correction coefficient storage unit, which stores the ink overlap correction coefficients calculated by the ink overlap correction coefficient calculator 3707.

Reference numeral 3709 denotes an ink dot quantity setting unit, which sets the dot quantities of inks used in color gamut estimation. Reference numeral 3710 denotes a primary color dot gain correction unit, which makes primary color correction in correspondence with the ink dot quantities set by the ink dot quantity setting unit 3709. Reference numeral 3711 denotes an initial estimated value calculator, which estimates initial estimated values of a color mixing result from the primary color values corrected by the primary color dot gain correction unit 3710. Reference numeral 3712 denotes an ink overlap correction unit, which corrects an initial estimated spectral reflectance value calculated by the initial estimated value calculator 3711 using the ink overlap correction coefficients stored in the ink overlap correction coefficient storage unit 3708 and the ink dot quantities stored in the ink dot quantity storage unit 3709. Reference numeral 3713 denotes an estimation result storage unit, which stores an estimated output result corrected by the ink overlap correction unit 3712. Reference numeral 3718 denotes a color gamut prediction unit, which predicts a color gamut from the spectral distribution stored in the estimation result storage unit 3713.

Reference numeral 3719 denotes a color gamut prediction result storage unit, which stores the color gamut prediction result predicted by the color gamut prediction unit 3718. Reference numeral 3714 denotes an image information input device, which comprises, e.g., a scanner, and acquires image information. Reference numeral 3715 denotes an image information storage unit, which stores image information acquired by the image information input device 3714. Reference numeral 3716 denotes a color gamut inside/outside determination unit, which determines whether the colors of respective pixels in an image stored in the image information storage unit 3715 fall inside/outside the predicted color gamut stored in the color gamut prediction result storage unit 3719. Reference numeral 3717 denotes a determination result display unit, which displays the color gamut inside/outside determination result of the color gamut inside/outside determination unit 3716 on a display device 3720. Reference numeral 3720 denotes a display device which comprises a CRT, LCD, or the like, and displays the color gamut inside/outside determination result of the color gamut inside/outside determination unit 3716 and the like.

<Color Gamut Inside/Outside Determination Process>

Figure 25A:
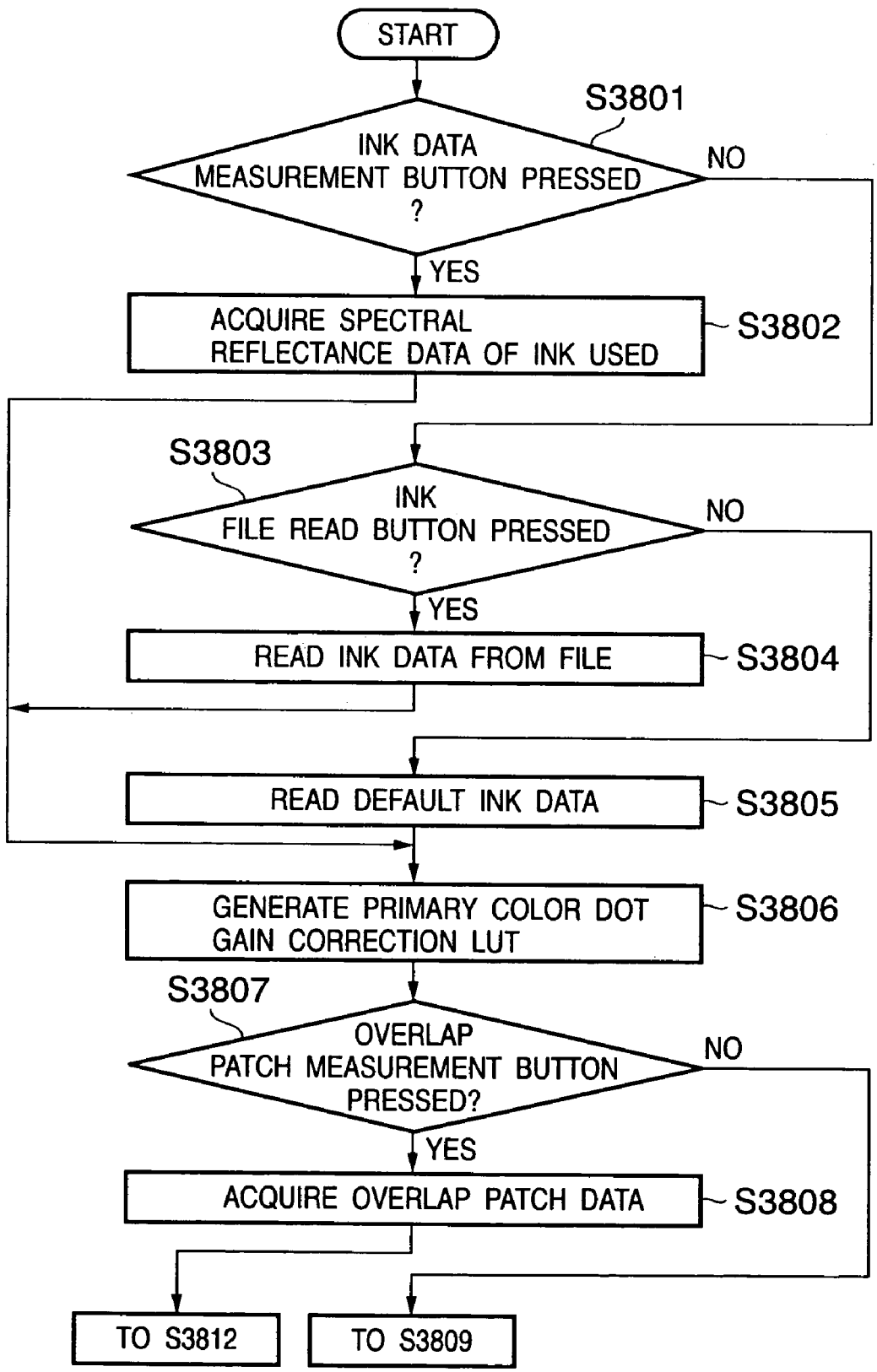
Figure 25C:
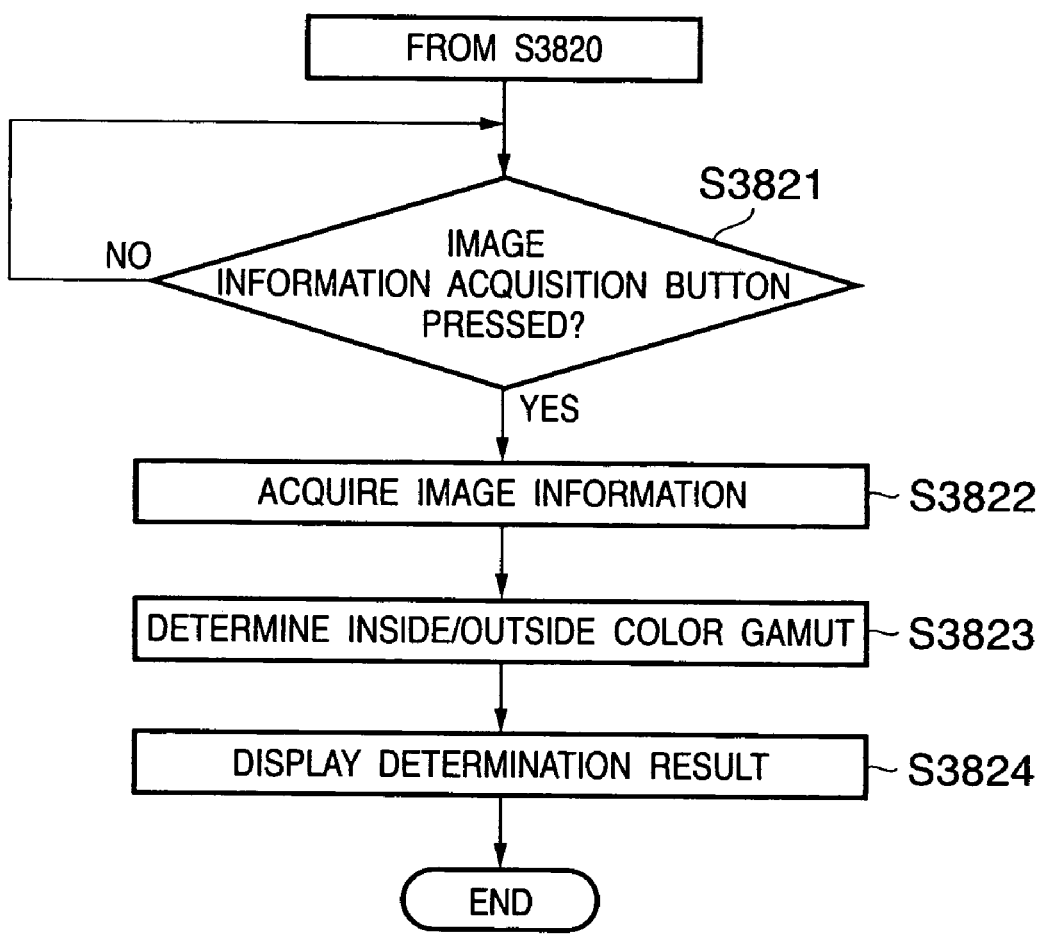
Figure 26:
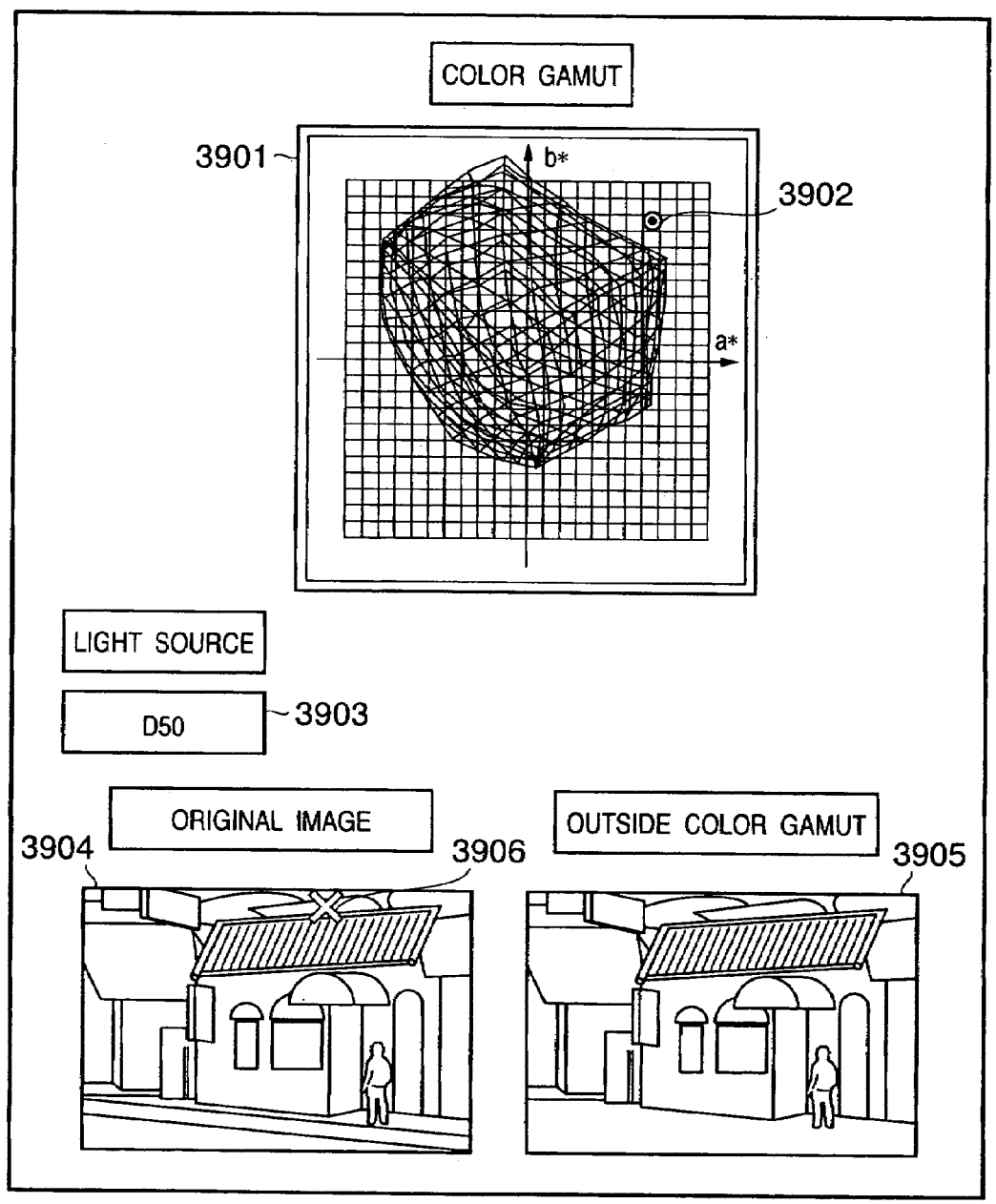
FIG. 26 shows an example of a user interface used to display a color gamut prediction result according to the sixth embodiment.

The color gamut inside/outside determination process according to the sixth embodiment will be described below. FIGS. 25A to 25C are flow charts for explaining the color gamut inside/outside determination process by the color gamut inside/outside determination apparatus 701. Upon inputting ink characteristics, the user interface shown in FIG. 22 is used as in the fifth embodiment. FIG. 26 shows an example of a user interface used upon displaying the color gamut inside/outside determination result.

The color gamut prediction process in steps S3801 to S3820 is the same as that in steps S3201 to S3220 in the fifth embodiment. It is checked in step S3801 if the user has pressed the ink data measurement button 3301. If YES in step S3801, the flow advances to step S3802; otherwise, the flow jumps to step S3083. In step S3802, the spectral reflectance of a patch when the dot quantity of the ink used is 100% is measured using the spectral reflectance measurement device 3702, and that calorimetric value is stored in the ink colorimetric value storage unit 3703. At this time, an ink number is displayed on the ink number display area 3307, and the measured spectral reflectance is displayed on the ink spectral reflectance display area 3308, as shown in FIG. 22.

It is checked in step S3803 if the user has pressed the ink file read button 3302. If YES in step S3803, the flow advances to step S3804; otherwise, the flow jumps to step S3805. In step S3804, ink data is read from a file designated by the user in the ink data file designation area 3303, and is stored in the ink colorimetric value storage unit 3703. Then, an ink number is displayed on the ink number display area 3307, and spectral reflectance obtained from the ink data is displayed on the ink spectral reflectance display area 3308.

In step S3805, ink data, which is measured in advance by the user or is delivered from, e.g., a manufacturer or the like, is stored as default ink data in the ink calorimetric value storage unit 3703. Then, an ink number is displayed on the ink number display area 3307, and spectral reflectance obtained from the ink data is displayed on the ink spectral reflectance display area 3308.

The user can modify ink information stored in the ink colorimetric value storage unit 3703 in step S3802, S3804, or S3805 to desired characteristics using the user interface as in the fifth embodiment.

In step S3806, the primary color dot gain estimation unit 3704 estimates dot gains at arbitrary dot quantities on the basis of the spectral reflectance of the ink stored in the ink calorimetric value storage unit 3703 by the same process as in the fifth embodiment, and stores the estimation results as an LUT in the primary color dot gain LUT storage unit 3705.

It is checked in step S3807 if the user has pressed the overlap patch measurement button 3304. If YES in step S3807, the flow advances to step S3808; otherwise, the flow jumps to step S3809. In step S3808, the spectral reflectance data of overlap patches as shown in FIG. 5 are measured using the spectral reflectance measurement device 3702, and the measurement results are stored in the overlap patch calorimetric value storage unit 3706. It is checked in step S3809 if the user has pressed the overlap file read button 3305. If YES in step S3809, the flow advances to step S3810; otherwise, the flow jumps to step S3811. In step S3810, overlap patch data are read from a file designated by the user in the overlap file designation area 3306, and are stored in the overlap patch calorimetric value storage unit 3706. In step S3811, overlap patch data, which are measured in advance by the user or are delivered from, e.g., a manufacturer or the like, is stored as default data in the overlap patch colorimetric value storage unit 3706.

In step S3812, the initial estimated value calculator 3711 reads the calorimetric values of the ink overlap patches stored in the overlap patch calorimetric value storage unit 3706, and calculates initial estimated spectral distribution values of the ink overlap patches. Then, the ink overlap correction coefficient calculator 3707 calculates ink overlap correction coefficients by the method explained in the first embodiment, and stores them in the ink overlap correction coefficient storage unit 3708.

It is checked in step S3813 if the user has pressed the color gamut estimation button 3311. If YES in step S3813, the flow advances to step S3814; otherwise, the control waits until that button is pressed. In step S3814, the ink dot quantity setting unit 3709 sets initial values of the ink dot quantities (e.g., all ink dot quantities=0%). In step S3815, the primary color dot gain correction unit 3710 corrects primary color dot gains using the ink dot quantities set by the ink dot quantity setting unit 3709 and, the primary color dot gain LUT stored, in the primary color dot gain LUT storage unit 3705, thus calculating spectral reflectance values corresponding to the given ink dot quantities. In step S3816, the initial estimated value calculator 3711 predicts a mixed color based on the spectral reflectance values of the inks calculated by the primary color dot gain correction unit 3710 using the KM theory given by equations (4) to (6) above, as in the fifth embodiment.

In step S3817, the ink overlap correction unit 3712 corrects an initial estimated spectral reflectance value estimated by the initial estimated value calculator 3711 (step S3816) using the ink overlap correction coefficients stored in the ink overlap correction coefficient storage unit 3708 as in the first embodiment, thus calculating a final spectral reflectance estimation result. It is checked in step S3818 if the ink dot quantity setting unit 3709 has formed all combinations of ink dot quantities. If YES in step S3818, the flow advances to step S3820; otherwise, the flow advances to step S3819. In step S3819, the ink dot quantity setting unit 3709 changes the ink dot quantities by a predetermined amount, and the flow returns to step S3815. In step S3820, the color gamut prediction unit 3714 calculates a color gamut on the basis of the estimated spectral reflectance value stored in the estimation result storage unit 3713 as in the fifth embodiment.

It is checked in step S3821 if the user has pressed an image information acquisition button (not shown in FIG. 22). If YES in step S3821, the flow advances to step S3822; otherwise, the control waits until that button is pressed.

In step S3822, the image information acquisition unit 3714 acquires information of an image designated by the user, and stores it in the image information storage unit 3715. In step S3823, the tristimulus values of all pixels or some pixels within a range designated by the user of the image information stored in the image information storage unit 3715 are calculated using, e.g., an ICC profile, and it is checked if they fall within the predicted color gamut stored in the color gamut prediction result storage unit 3719. That is, an image is stored as RGB data. Since the ICC profile describes a conversion formula or lookup table used to implement RGB→Lab conversion, RGB data of the entire image if the user does not designate any range in the image or within the designated range if he or she designates the range are converted into tristimulus values (Lab) using the ICC profile and it is then checked if they fall within the color gamut.

In step S3824, the determination result of the color gamut inside/outside determination unit 3716 and the like are displayed, as shown in FIG. 26. For example, the color gamut prediction result held in the color gamut prediction result storage unit 3719 is displayed like that on a color gamut prediction result display area 3901. Also, image information (original image) stored in the image information storage unit is displayed on an original image display area 3904. Furthermore, the color gamut inside/outside determination results for respective pixels, which are determined by the color gamut inside/outside determination unit 3716, are displayed on a color gamut outside alert area 3905 using white pixels as those which fall outside the color gamut, and black pixels as those which fall inside the color gamut. At this time, since the tristimulus values depend on an illumination light source, the user can select a desired light source from a light source information selection area 3903. Furthermore, when the user designates a point in the original image display area 3904 or color gamut outside alert area 3905 using a mouse or the like, a user designated point 3906 is displayed, and tristimulus value point 3902 corresponding to the user designated point is displayed on a color gamut display area 3901.

As described above, according to the fifth and sixth embodiments, a color gamut using given color agents can be precisely predicted by setting only color agent characteristics of an image output device in color gamut prediction of that image output device. Also, whether or not a desired color falls within the reproduction range can be precisely estimated.

<Number and Type of Inks Used>

In the fifth and sixth embodiments, combinations of four color inks are used. However, the present invention is not limited to four colors. For example, three or less or five or more color inks may be combined.

<User Interface>

In the fifth and sixth embodiments, FIGS. 22, 23, and 26 show the examples of the user interfaces. However, the present invention is not limited to such specific examples. For example, in FIGS. 23 and 26, the color gamut shape is displayed as a wire frame model on the Lab space, but may be displayed in a display format on another color space such as an XYZ space or the like, and a three-dimensional polygon model may be used in place of the wire frame model. Also, the user designates desired ink dot quantities as numerical values in the ink dot quantity input area 3408 or using the dot quantity designation slider bars 3409. However, other input methods may be used as long as the user can input desired values. Furthermore, as for the light source information selection area 3410, the user selects a desired light source. Alternatively, a file that describes light source data in advance may be read. That is, the user interface configuration is not particularly limited as long as user can desirably set required setting items.

Seventh Embodiment

Figure 27:
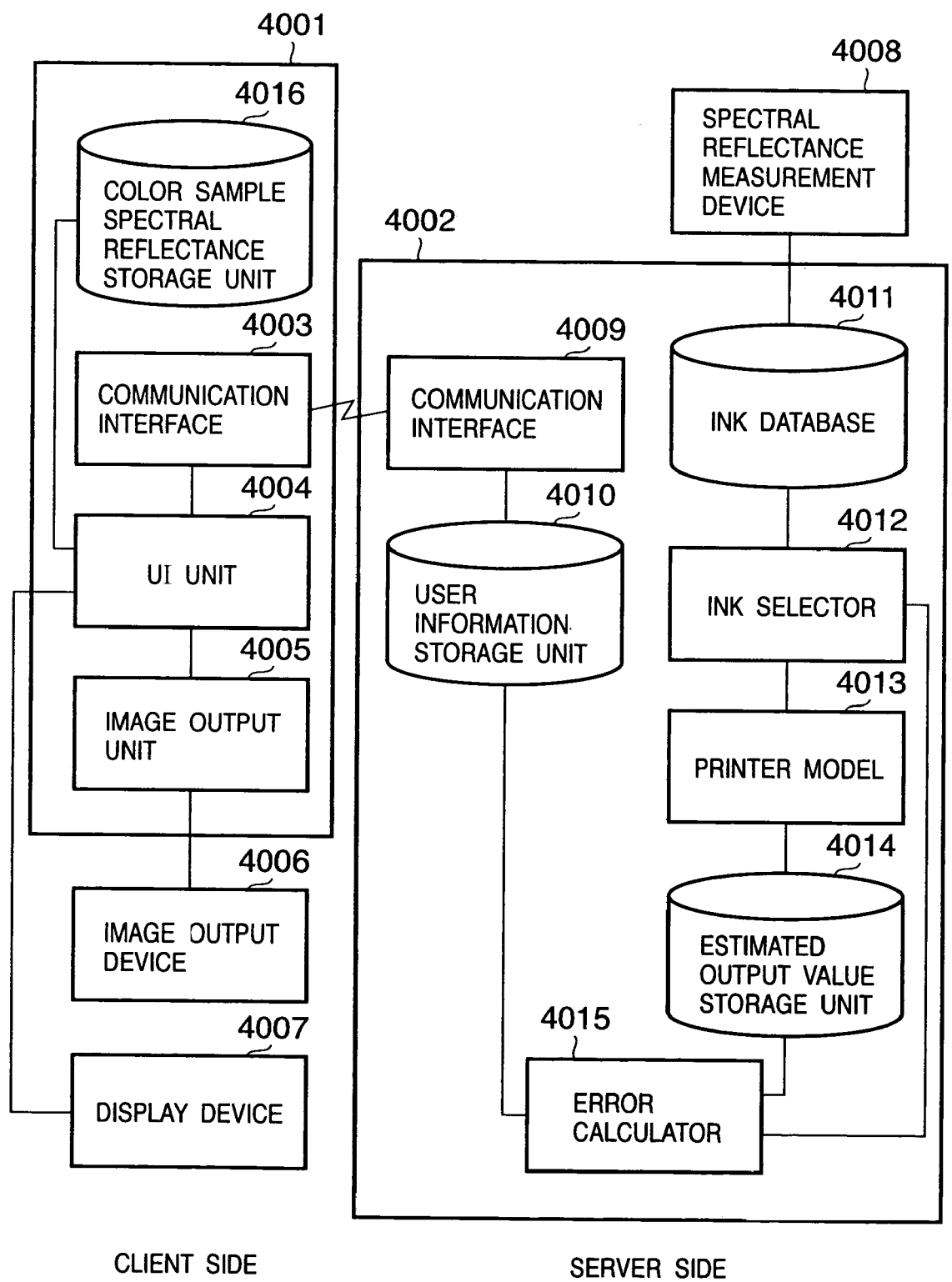
FIG. 27 is a block diagram showing the arrangement of an ink customize system according to the seventh embodiment.

FIG. 27 is a block diagram showing the arrangement of an ink customize system according to the seventh embodiment. Reference numeral 4001 denotes an image processing apparatus (to be referred to as a client apparatus hereinafter) on the client side in the ink customize system; and 4002, an image processing apparatus (to be referred to as a server apparatus hereinafter) on the server side in the ink customize system. The client and server apparatuses are connected via a network such as a LAN, Internet, or the like, or other communication means. In this embodiment, the ink customize system which comprises the independent client and server apparatuses will be explained. However, the client and server apparatuses 4001 and 4002 may be integrated to implement an ink customize apparatus.

In the client apparatus 4001, reference numeral 4003 denotes a communication interface, which makes communications with the server apparatus 4002 on the network. Reference numeral 4004 denotes a user interface unit (to be referred to as a UI unit hereinafter), which provides, using a display device 4007, a user interface with which the user makes operations using the image processing apparatus 4001, and which will be described later using FIG. 29. Reference numeral 4005 denotes an image output unit, which outputs an image to an image output device 4006. Reference numeral 4006 denotes an image output device, which includes a printer that forms images by a laser beam method or ink-jet method. Reference numeral 4007 denotes a display device, which comprises a CRT, LCD, or the like. Especially, the display device 4007 is used to input a target color and to display an ink customize result and the like under the control of the UI unit 4004. Reference numeral 4016 denotes a color sample spectral reflectance storage unit, which stores spectral reflectance data of color samples.

On the other hand, in the server apparatus 4002, reference numeral 4008 denotes a spectral reflectance measurement device, which comprises spectrophotometer or the like, and measures spectral reflectance data of inks. Reference numeral 4009 denotes a communication interface, which communicates with a device on the client side (e.g., the client apparatus 4001 or the like) on the network. Reference numeral 4010 denotes a user information storage unit, which stores user information received via the communication interface 4009. As will be described later, the user information storage unit 4010 stores a target color and the like sent from the client apparatus 4001. Reference numeral 4011 denotes an ink database, which stores the spectral reflectance data of inks measured by the spectral reflectance measurement device 4008. Reference numeral 4012 denotes an ink selector, which selects the spectral reflectance data of arbitrary inks from those stored in the ink database 4011. The ink selector 4012 sets a combination of inks, output of which is to be estimated in a process (S4209) shown in the flow chart to be described later. Reference numeral 4013 denotes a printer model, which estimates a printer output using the spectral reflectance data of inks selected by the ink selector 4012. Reference numeral 4014 denotes an estimated output value storage unit, which stores a predicted output value predicted by the printer model 4013. Reference numeral 4015 denotes an error calculator, which calculates an error between the spectral reflectance of a target color stored in the user information storage unit 4010, and the estimated output value stored in the estimated output value storage unit 4014.

<Overall Process>

The operation of the seventh embodiment using the aforementioned ink customize system will be described in detail below.

Figure 28A:
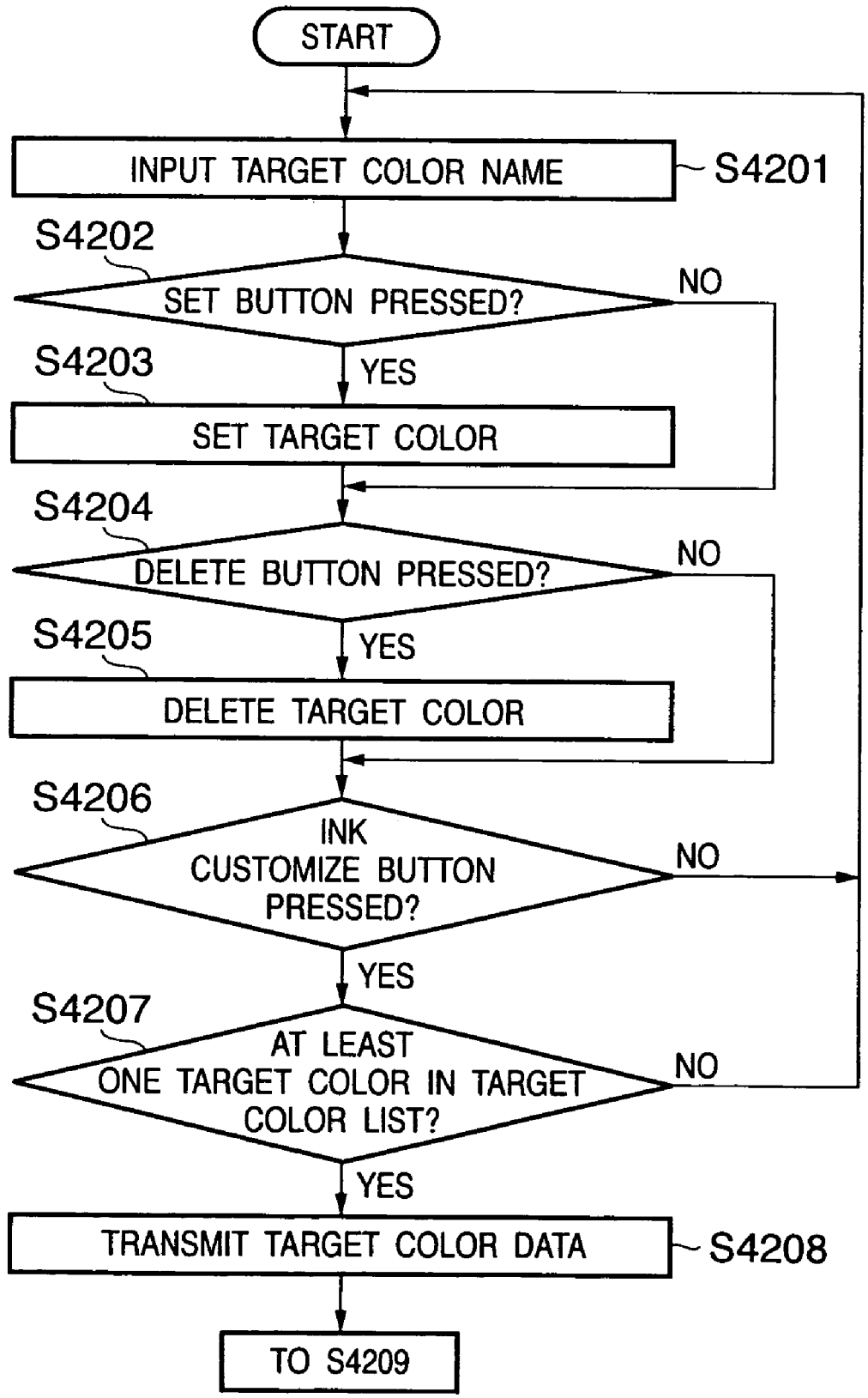
FIGS. 28A and 28B are flow charts for explaining an ink customize process according to the seventh embodiment.
Figure 28B:
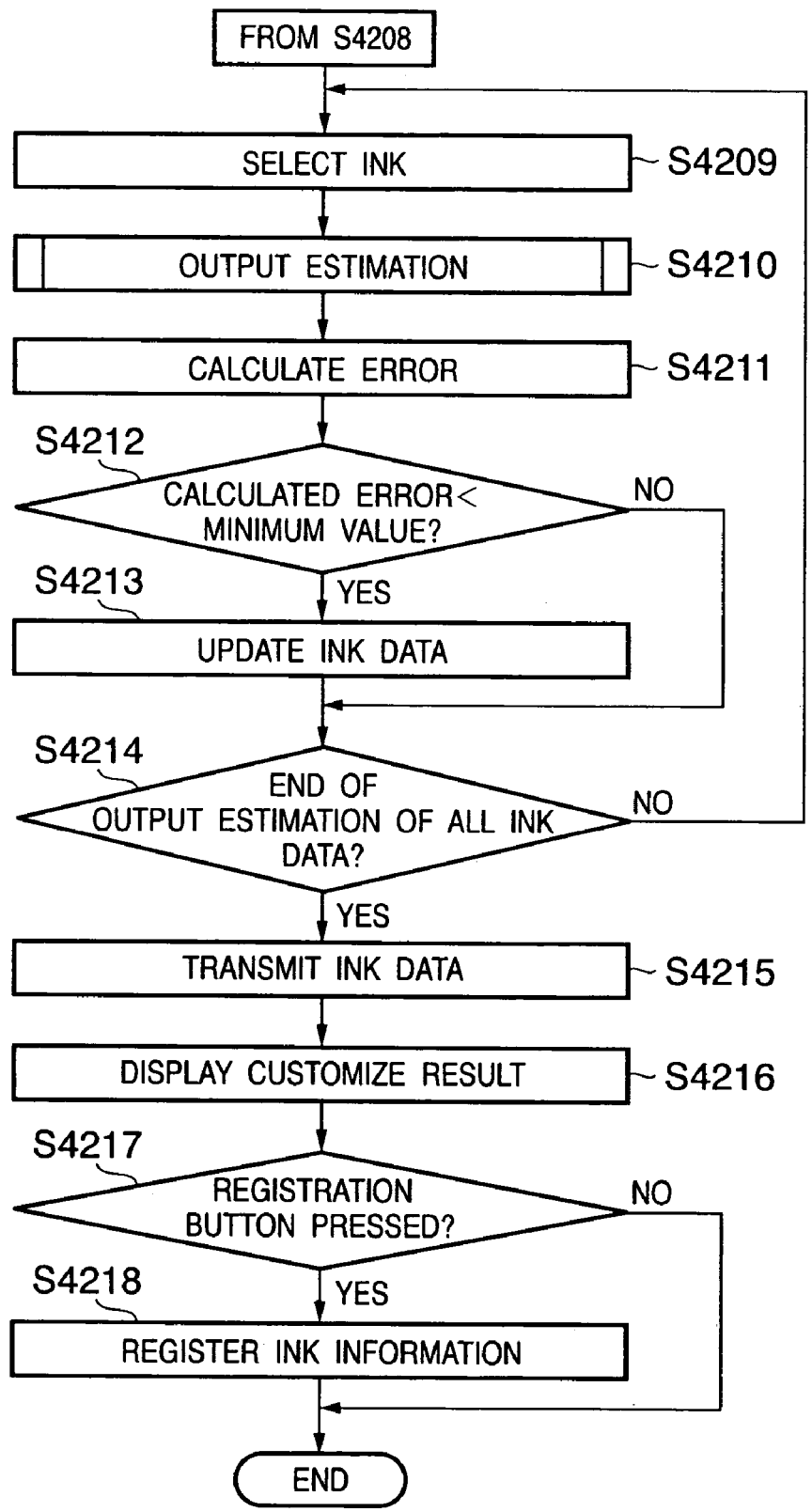
Figure 29:
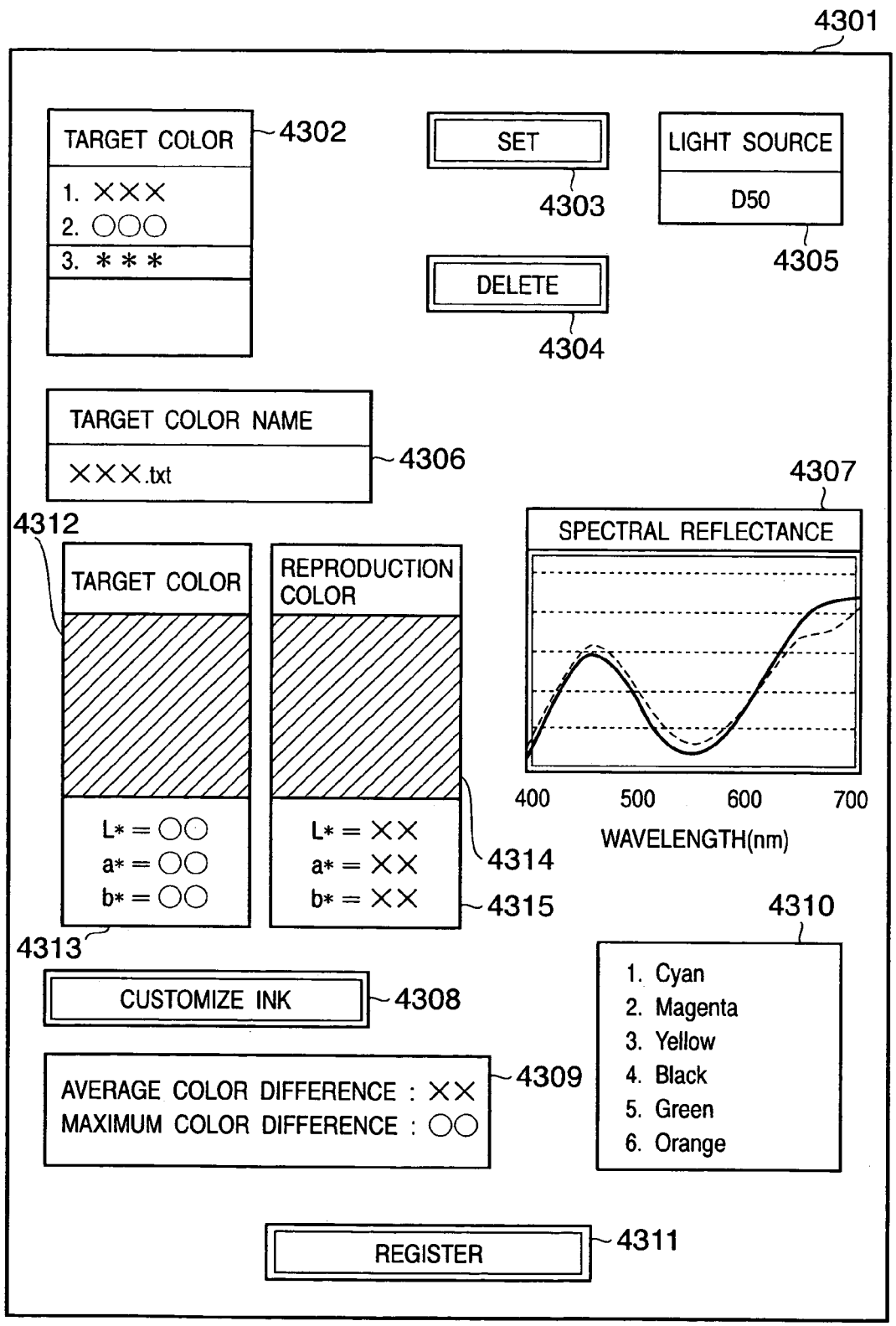
FIG. 29 shows an example of a user interface according to the seventh embodiment.

FIGS. 28A and 28B are flow charts showing the ink customize process by the ink customize system of the seventh embodiment. Note that in the flow charts shown in FIGS. 28A and 28B, steps S4201 to S4208 and steps S4216 to S4218 indicate processes of the client apparatus 4001, and steps S4209 to S4215 indicate processes of the server apparatus 4002. FIG. 29 shows an example of a user interface provided in the ink customize process.

In step S4201, the user selects a print color sample No. (to be referred to as a color sample name hereinafter) such as DIC, Pantone, or the like corresponding to a target color that he or she wants to actually output in a target color name selection area 4306. At this time, the UI unit 4004 reads the spectral reflectance data of the selected color sample from the color sample spectral reflectance storage unit 4016, and displays it on a spectral reflectance display area 4307. At this time, the UI unit calculates tristimulus values Lab using light source information selected by the user from a light source selection area 4305, and displays them on a tristimulus value display area 4313. Furthermore, the UI unit converts the calculated tristimulus values into device RGB values of the display device 4007, and displays a color specified by these values on a target color display area 4312.

It is checked in step S4202 if the user has pressed a set button 4303. If YES in step S4202, the flow advances to step S4203; otherwise, the flow jumps to step S4204. In step S4203, the color sample name of the target color is set in a target color list display area 4302. It is checked in step S4204 if the user has pressed a delete button 4304. If YES in step S4204, the flow advances to step S4205; otherwise, the flow jumps to step S4206. In step S4205, the color sample name selected in the target color list display area 4302 is deleted from a target color list. In this way, target colors to be sent to the server apparatus 4002 are set in the target color list.

It is checked in step S4206 if the user has pressed an ink customize button 4308. If YES in step S4206, the flow advances to step S4207; otherwise, the flow returns to step S4201. It is checked in step S4207 if the target color list (4302) includes at least one target color. If YES in step S4207, the flow advances to step S4208; otherwise, the flow returns to step S4201. In step S4208, the target color names and their spectral reflectance data are sent to the server apparatus 4002 via the communication interfaces 4003 and 4009. The server apparatus 4002 stores the target color names and their spectral reflectance data sent from the client apparatus 4001 in association with the user as the transmission source. At this time, light source information selected by the user from the light source selection area 4305 is sent at the same time.

Upon receiving the target colors (target color names, spectral reflectance data, and light source information), the ink selector 4012 of the server apparatus 4002 selects spectral reflectance data of six arbitrary color inks from the ink database 4011 in step S4209. The ink database 4011 pre-stores spectral reflectance data for a plurality of different inks measured by the spectral reflectance measurement device 4008. In this embodiment, six colors are selected. However, the number of color inks to be used may be arbitrarily selected, and may be determined in accordance with a client's request or the like.

In step S4210, the printer model 4013 estimates printer outputs using the spectral reflectance data of inks selected by the ink selector 4012 (details will be described later), and stores the estimation results in the estimated output value storage unit 4014. In step S4211, the error calculator 4015 calculates errors between the spectral reflectance data of the target color stored in the user information storage unit 4010, and the spectral reflectance data (of all combinations of ink dot quantities) as the output estimation results stored in the estimated output value storage unit 4014. (In the present invention, the error calculation method is not particularly limited. For example, when a light source used upon observing a print is limited, a color difference formula such as ΔE or the like can be used; when a light source is not limited, an RMS error as the square mean of errors of reflectance values at respective wavelengths may be used.) It is checked in step S4212 if the minimum value of all the errors calculated in step S4211 is smaller than the minimum error value stored so far. If YES in step S4212, the flow advances to step S4213; otherwise, the flow jumps to step S4214. In step S4213, the error calculated by the error calculator 4015 is stored as a minimum error in the user information storage unit 4010, and the ink name (and the combination of ink dot quantities) used at that time is stored in the user information storage unit 4010.

It is checked in step S4214 if all combinations of inks stored in the ink database 4011 have undergone output estimation. If YES in step S4214, the flow advances to step S4215. On the other hand, if combinations of inks which are to undergo output estimation still remain, the flow returns to step S4209 to repeat the aforementioned process for the next combination of inks. In this way, when the flow has reached step S4215, the combination of inks which can minimize an error from the spectral reflectance of the target color, the combination of their dot quantities, and the error value at that time are stored in the user information storage unit 4010. In step S4215, the minimum error and spectral reflectance data of inks, the estimated output spectral reflectance data, and the ink dot quantities, which are stored in the user information storage unit 4010, are sent to the client apparatus 4001 via the communication interfaces 4003 and 4009. That is, the output estimation result (an optimal combination of colors) is sent to the client apparatus 4001 as a transmission source of the target color. At this time, if there are a plurality of ink combinations that can reproduce the target color, information of all the combinations may be sent, or only the ink combination that can assure the broadest color gamut may be sent.

Upon receiving the sent information, the UI unit 4004 of the client apparatus 4001 displays the received minimum error on an error display area 4309, and its ink name on a customize ink name display area 4310 in step S4216. At this time, the estimated output spectral reflectance is displayed on the spectral reflectance display area 4307, and tristimulus values Lab are calculated based on the light source information selected from light source selection area 4305 and are displayed on a reproduction color tristimulus value display area 4315. Furthermore, the tristimulus values are converted into device RGB data of the display device 4007 using an ICC profile or the like, and a color defined by these RGB data is displayed on a reproduction color display area 4314.

It is checked in step S4217 if the user has pressed a registration button 4311. If YES in step S4217, the flow advances to step S4218; otherwise, this process ends. In step S4218, a signal that requests a registration procedure is stored in the user information storage unit 4010 via the communication interfaces 4003 and 4009, thus proceeding to the registration procedure. In the registration procedure of this embodiment, the target color and customize ink may be stored in a database on the client or server side, and may be referred to later, or a purchase procedure for actually purchasing the customize ink may be done.

<Printer Output Estimation>

Figure 30:
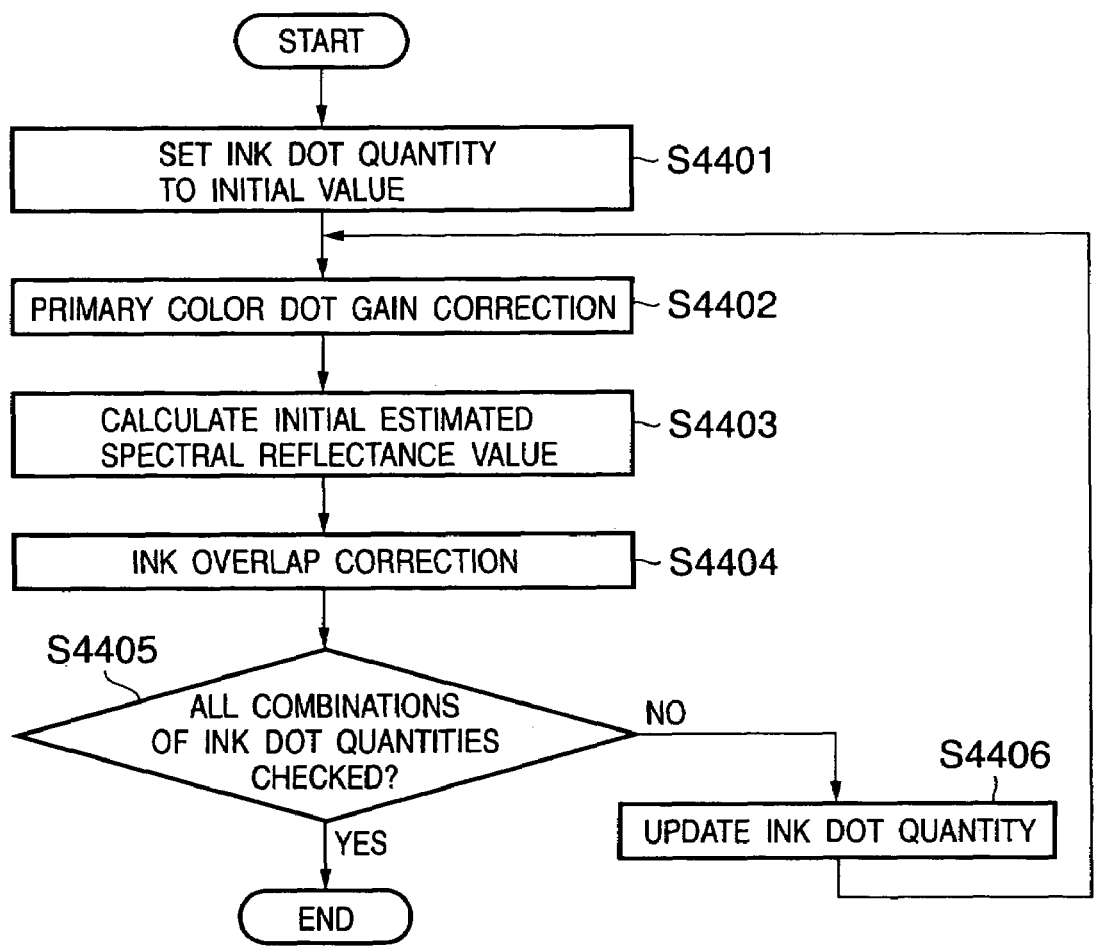
FIG. 30 is a flow chart for explaining an output estimation process according to the seventh embodiment.

Details of the output estimation process in step S4210 will be described below using FIG. 30. FIG. 30 is a flow chart showing the output estimation process executed in step S4210. In step S4401, the dot quantities of inks used are set to initial values (e.g., all dot quantities=0%). In step S4402, primary color dot gain correction is made (details will be described later). In step S4403, an initial estimated spectral reflectance value is calculated by equations (4) to (6) above using the spectral reflectance values of the inks that have undergone the primary color dot gain correction.

In step S4404, the initial estimated spectral reflectance value calculated in step S4403 undergoes ink overlap correction (details will be described later). It is checked in step S4405 if all combinations (e.g., in 1%-increments from 0% to 100%) of the dot quantities of the inks used have undergone output estimation. If YES in step S4405, the process ends; otherwise, the flow advances to step S4406. In step S4406, the ink dot quantities are changed by a given amount, and the flow returns to step S4402.

In this manner, spectral reflectance data of colors are estimated in correspondence with all the combination obtained by changing the ink dot quantities in 1%-increments from 0% to 100%.

<Primary Color Dot Gain Correction>

Primary color dot gain correction according to this embodiment will be explained below. It is generally assumed that the spectral reflectance characteristics (dot gain) of a primary color dot linearly change with respect to the dot quantity, while this embodiment makes primary color dot gain correction in consideration of the influence of nonlinearity of the dot gain.

As described above, primary color correction patches (FIG. 3), which are output in advance using a printer that is to undergo color reproduction prediction, are measured. The spectral reflectance data of such primary color correction patches correspond to the reflectance values of respective wavelength corresponding to discrete dot quantities of inks, as shown in FIG. 4A. Such measured reflectance data of respective wavelength are converted into an LUT that represents the relationship between the dot quantities and reflectance characteristics in correspondence with respective inks and wavelengths, as shown in FIG. 4B.

Since only discrete measurement results in 20%-increments of ink dot quantity are available, a primary color correction LUT is generated using a general interpolation method such as linear interpolation, spline interpolation, or the like. The primary color dot gain correction process (step S4402) makes primary color dot gain correction in correspondence with the input ink dot quantities using the LUT to estimate spectral reflectance characteristics of primary colors. Note that FIG. 4B illustrates only four graphs for the sake of simplicity. However, in practice, tables of all wavelengths (41 wavelengths in 10-nm increments from 380 to 780 nm) sampled in the visible wavelength range are generated. Using such LUT, spectral reflectance data that have undergone primary dot gain correction can be acquired in correspondence with the set ink dot quantities.

Note that the LUT may be generated using the dot gain estimation formulas (equations (8)) used in the third embodiment and the like.

<Calculation of Ink Overlap Correction Coefficient>

In the ink overlap correction process in step S4404, ink overlap correction patches (FIG. 5), which are output in advance using a printer that is to undergo color reproduction prediction, are measured as in the first embodiment. Since an optimal ink combination is determined depending on the type of printer, if the server apparatus 4002 is compatible to a plurality of types of printers, corresponding calorimetric data are required. However, the type of printer need not be transmitted to the server apparatus 4002 and, for example, calorimetric patches may assigned an identification number.

Then, the initial estimated spectral reflectance values of the overlap correction patches are estimated using data (the dot quantities of respective colors of the patches) used to record the overlap correction patches shown in FIG. 5 by equations (4) to (6) above, i.e., the same process as in step S4403. The calculated initial estimated spectral reflectance values have errors from actually measured data, which are obtained by measuring overlap correction patches in FIG. 5 in practice. Hence, in order to correct these errors from the actually measured data, correction coefficients $a_{h,\lambda}$, $b_{i,j,\lambda}$, and $c_{k,l,m,\lambda}$ are determined using equation (7) above and a method of least squares or the like to minimize the errors.

The correction coefficients determined in this way are stored in a predetermined storage device, and are read out upon execution of the ink overlap correction process in step S4404. That is, in the ink overlap correction process in step S4404, estimation errors due to ink overlap are corrected from the initial estimated spectral reflectance values calculated in step S4403 by applying equation (7) using the ink overlap correction coefficients.

As described above, according to the seventh embodiment, upon selecting color agents of an image output device, a target color is set, a reproduction color is estimated using the color agent characteristics of the image output device, and color agents are selected based on the reproduction color estimation result. Hence, color agents can be selected precisely. For this reason, upon setting color agents required to reproduce the target color, a service that which can remove the burden of the user who must select a desired ink set by trial and error by repeating trial production of inks/output by a printer, and allows the user to easily select an ink set using output estimation by a computer can be provided.

Eighth Embodiment

In the seventh embodiment, an optimal combination of inks required to reproduce one or a plurality of designated target colors is automatically selected. In the eighth embodiment, by designating image data, all colors used in that image data are set as target colors, and combinations of inks suited to reproduce these target colors are selected. The eighth embodiment will be described in detail below with reference to the accompanying drawings.

Figure 31:
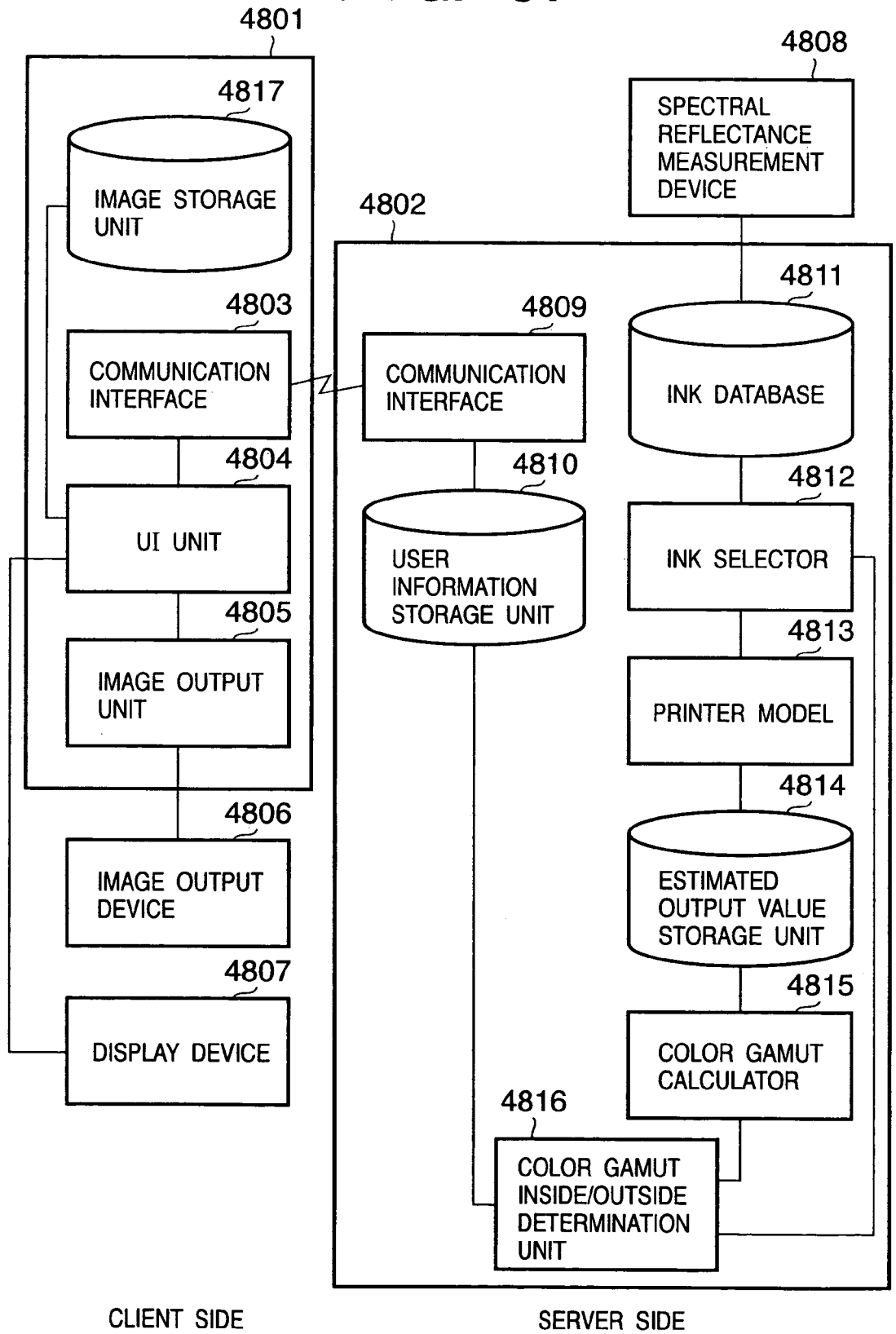
FIG. 31 is a block diagram showing the arrangement of an ink customize system according to the eighth embodiment.

FIG. 31 is a block diagram showing the arrangement of an ink customize system according to the eighth embodiment. Reference numeral 4801 denotes an image processing apparatus (to be referred to as a client apparatus hereinafter) on the client side in the ink customize system of the eighth embodiment; and 4802, an image processing apparatus (to be referred to as a server apparatus hereinafter) on the server side in the ink customize system. In this embodiment, the ink customize system which comprises the independent client and server apparatuses will be explained. However, the client and server apparatuses 4801 and 4802 may be integrated to implement an ink customize apparatus.

In the client apparatus 4801, reference numeral 4803 denotes a communication interface, which makes communications with devices on the server side on the network. Reference numeral 4804 denotes a UI unit, which provides, using a display device 4807, a user interface with which the user makes operations using the image processing apparatus 4801. Reference numeral 4805 denotes an image output unit, which makes an image output device 4806 output an image. Reference numeral 4806 denotes an image output device, which includes a printer of a laser beam method or ink-jet method. Reference numeral 4807 denotes a display device, which comprises a CRT, LCD, or the like, and is used to provide a target color input interface and to display a customize result under the control of the UI unit 4804. Reference numeral 4817 denotes an image storage unit, which stores an image (output image) to be output by the image output device 4806.

In the server apparatus 4802, reference numeral 4808 denotes a spectral reflectance measurement device, which comprises spectrophotometer or the like, and measures spectral reflectance data of inks. Reference numeral 4809 denotes a communication interface, which communicates with devices on the client side on the network. Reference numeral 4810 denotes a user information storage unit, which stores user information received via the communication interface. As will be described later, the user information storage unit 4810 stores image data and the like in this embodiment. Reference numeral 4811 denotes an ink database, which stores the spectral reflectance data of inks measured by the spectral reflectance measurement device 4808. Reference numeral 4812 denotes an ink selector, which selects the spectral reflectance data of arbitrary inks from those stored in the ink database 4811. Reference numeral 4813 denotes a printer model, which estimates output of a printer using the spectral reflectance data of inks selected by the ink selector 4812. Reference numeral 4814 denotes an estimated output value storage unit, which stores a predicted output value predicted by the printer model 4813. Reference numeral 4815 denotes a color gamut calculator, which calculates a color gamut on the basis of the estimated output value stored in the estimated output value storage unit 4814. Reference numeral 4816 denotes a color gamut inside/outside determination unit, which determines whether or not colors used in the image stored in the user information storage unit 4810 fall within the color gamut stored in the color gamut calculator 4815.

<Overall Process>

Figure 32A:
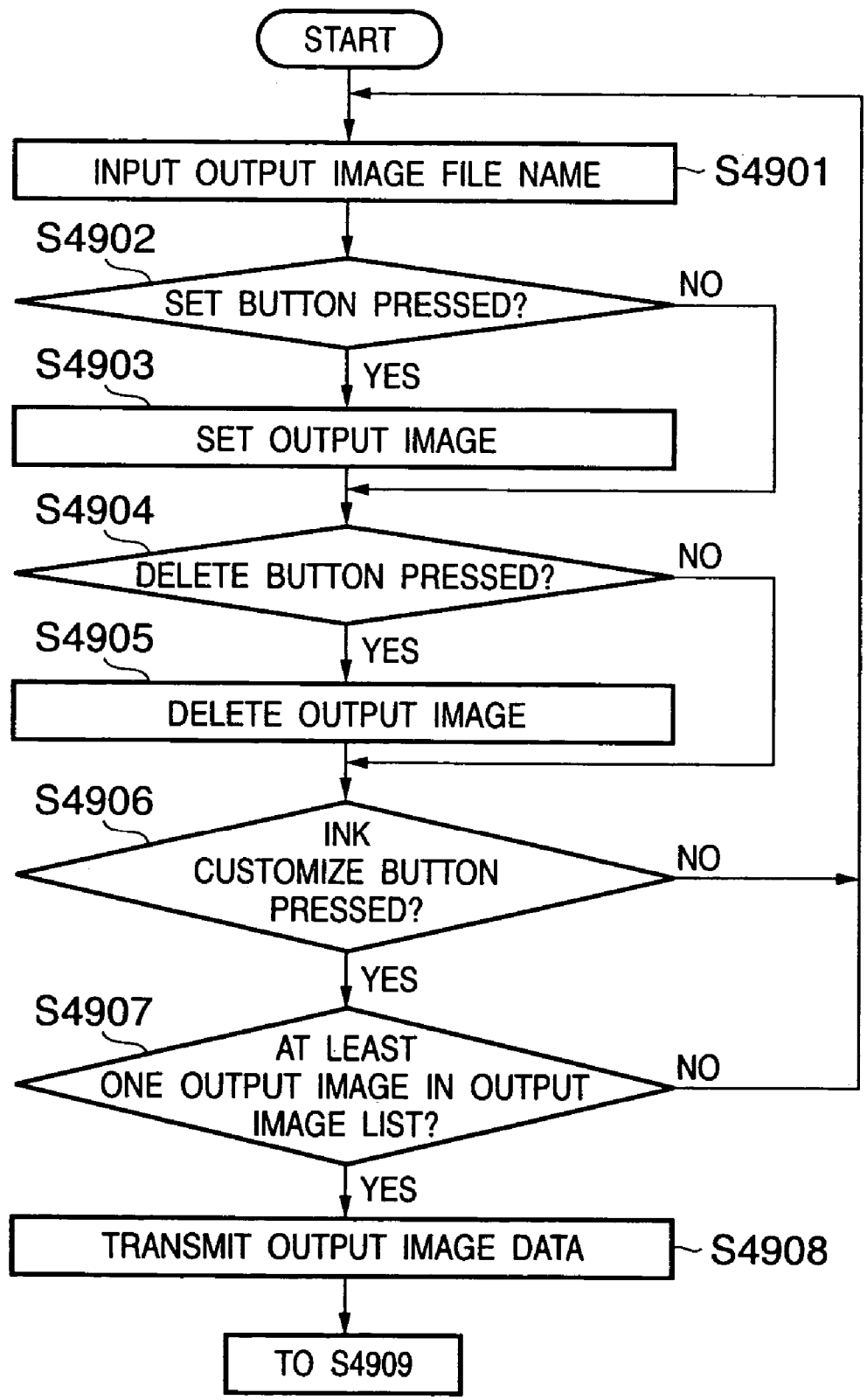
FIGS. 32A and 32B are flow charts for explaining an ink customize process according to the eighth embodiment.
Figure 32B:
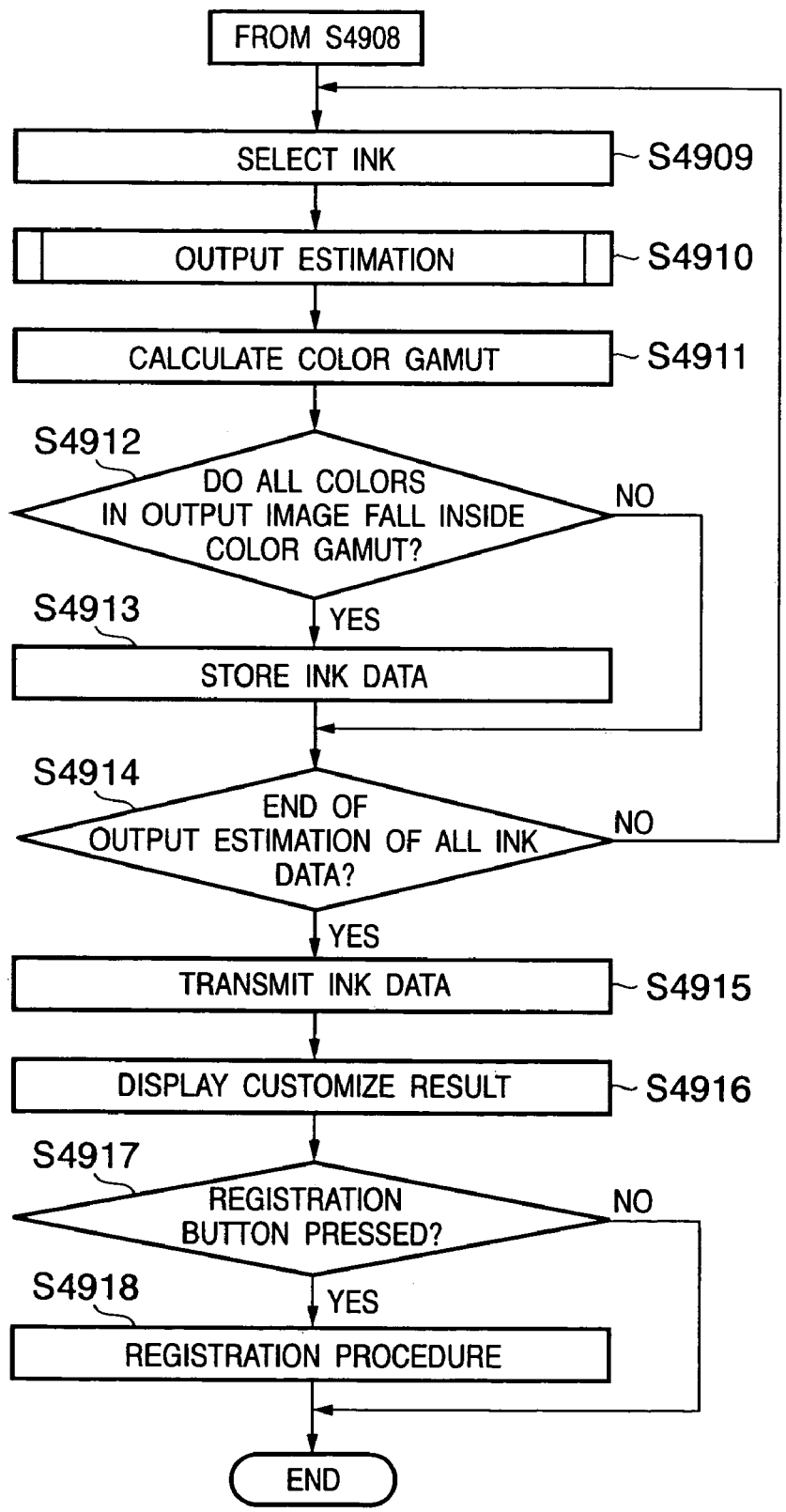
Figure 33:
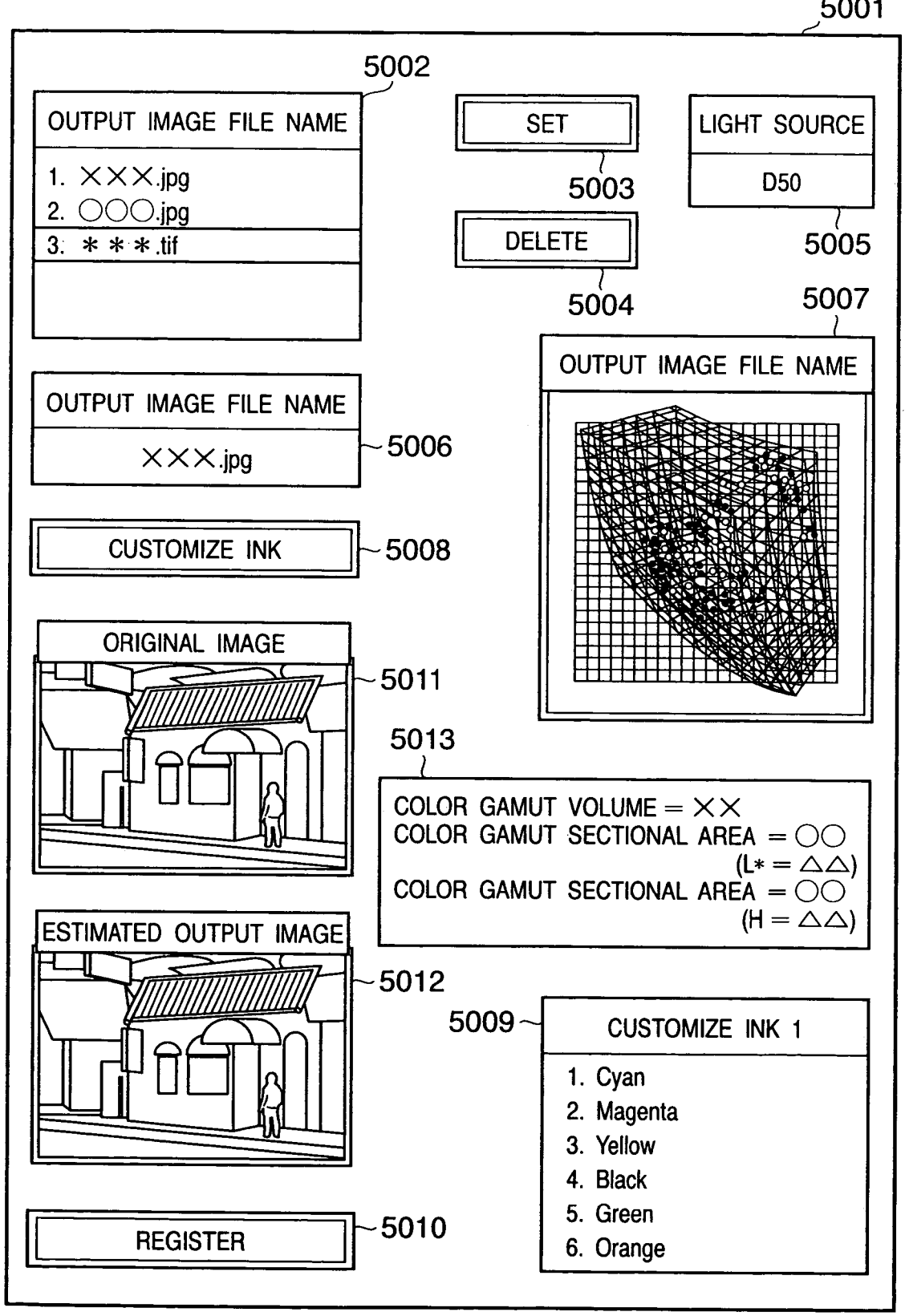
FIG. 33 shows an example of a user interface in the eighth embodiment.

The process in the aforementioned ink customize system will be described below. FIGS. 32A and 32B are flow charts showing the ink customize process by the ink customize system of the eighth embodiment. Note that in the flow charts shown in FIGS. 32A and 32B, steps S4901 to S4908 and steps S4916 to S4918 indicate processes of the client apparatus 4801, and steps S4909 to S4915 indicate processes of the server apparatus 4802. FIG. 33 shows an example of a user interface used in the ink customize process.

In step S4901, the user inputs an image file name that he or she wants to output in practice in an output image file name input area 5006. At this time, the UI unit 4804 reads the selected image from the image storage unit 4817, and displays it on an original image display area 5011. At this time, the UI unit converts the RGB values of all pixels of the selected image into tristimulus values Lab using an ICC profile or the like, and displays a color gamut based on these values on a color gamut display area 5007.

It is checked in step S4902 if the user has pressed a set button 5003. If YES in step S4902, the flow advances to step S4903; otherwise, the flow jumps to step S4904. In step S4903, the output image file name is set in an output image list display area 5002. It is checked in step S4904 if the user has pressed a delete button 5004. If YES in step S4904, the flow advances to step S4905; otherwise, the flow jumps to step S4906. In step S4905, the output image file name selected in the output image list display area 5002 is deleted from an output image list. In this way, images to be sent to the server apparatus 4802 are set in the output image list.

It is checked in step S4906 if the user has pressed an ink customize button 5008. If YES in step S4906, the flow advances to step S4907; otherwise, the flow returns to step S4901. It is checked in step S4907 if the output image list includes at least one output image. If YES in step S4907, the flow advances to step S4908; otherwise, the flow returns to step S4901. In step S4908, output image data listed in the output image list are sent to the server apparatus 4802 via the communication interfaces 4803 and 4809, and are stored in the user information storage unit 4810 in correspondence with the user as the transmission source. At this time, light source information selected by the user from a light source selection area 5005 is sent at the same time.

The ink selector 4812 of the server apparatus 4802 selects spectral reflectance data of arbitrary six color inks from the ink database 4811 in step S4909. Note that the ink database 4811 pre-stores spectral reflectance data for a plurality of different inks measured by the spectral reflectance measurement device 4808. In this embodiment, six colors are selected. However, the number of color inks to be used may be arbitrarily selected, and may be determined in accordance with a client's request or the like.

In step S4910, the printer model 4813 estimates printer outputs using the spectral reflectance data of inks selected by the ink selector 4812 as in the seventh embodiment, and stores the estimation results in the estimated output value storage unit 4814. In step S4911, the color gamut calculator 4815 calculates a color gamut that can be reproduced by combinations of the inks on the basis of the estimated output values calculated by the printer model 4813 (details will be described later).

The color gamut inside/outside determination unit 4816 determines in step S4912 whether or not all colors in the output image stored in the user information storage unit 4810 fall within the color gamut calculated by the color gamut calculator 4815. If YES in step S4912, the color gamut information, used ink names, and estimated output image are stored in the user information storage unit 4810, and the flow advances to step S4913. However, if NO in step S4912, the flow jumps to step S4914. In step S4913, the color gamut information of the color gamut calculated by the color gamut calculator 4815 and the ink names selected by the ink selector 4812 are stored in the user information storage unit 4810. It is checked in step S4914 if all combinations of inks stored in the ink database 4811 have undergone output estimation. If YES in step S4914, the flow advances to step S4915. On the other hand, if combinations of inks which are to undergo output estimation still remain, the flow returns to step S4909.

In step S4915, the color gamut information, ink names, and estimated output image stored in the user information storage unit 4810 are sent to the client apparatus 4801 via the communication interfaces 4803 and 4809. If a plurality of ink combinations are found, all combinations may be sent, or an ink combination that assures the largest color gamut volume may be sent. If no ink combination, whose estimated color gamut includes all colors used in an image, is found, a message indicating it may be sent to the client apparatus, or an ink combination which can reproduce a largest number of colors of those used in an image may be sent. Since spectral reflectance data of the estimated output image are estimated for respective pixels by output estimation, an estimated image (RGB image) can be generated by calculating values Lab from the spectral reflectance data and converting these values into RGB data via an ICC profile or the like.

The UI unit 4804 of the client apparatus 4801 displays the received customize result in step S4916. Upon displaying the customize result, the received color gamut information is displayed on the color gamut display area 5007. Also, the volume of that color gamut is displayed on a color gamut information display area 5013, and the sectional areas taken along ab and LC planes of arbitrary L* and H set by the user are also displayed on the color gamut information display area 5013. Note that L* and H are set using a keyboard or the like on the color gamut information display area 5013.

Furthermore, the received ink names are displayed on a customize ink name display area 5009. The received estimated output image is converted into device RGB data of the display device 4807 using an ICC profile or the like, and an image expressed by these RGB data is displayed on an estimated output image display area 5012. At this time, if there are a plurality of ink sets which can reproduce all colors in an output image, one or a plurality of pieces of ink set information selected by the user from those ink sets can be displayed.

It is checked in step S4917 if the user has pressed a registration button 5010. If YES in step S4917, the flow advances to step S4918; otherwise, this process ends. In step S4918, a signal that requests a registration procedure is stored in the user information storage unit 4810 via the communication interfaces 4803 and 4809, thus proceeding to the registration procedure. In the registration procedure, the output image, customize ink, and color gamut information may be stored in a database on the client or server side, and may be referred to later, or a purchase procedure for actually purchasing the customize ink may be done as in the seventh embodiment.

<Color Gamut Calculation>

The process for calculating the color gamut from the spectral reflectance estimation results stored in the estimated output value storage unit 4814 in step S4911 will be described below. The estimated output value storage unit 4814 stores the spectral reflectance estimation results estimated by the printer model 4813, and ink dot quantities corresponding to these spectral reflectance data. The color gamut calculator 4815 calculates the tristimulus values of spectral reflectance data obtained upon changing the respective ink dot quantities in given increments (e.g., in 10%-increments from 0% to 100%), three-dimensionally lays out the calculated tristimulus values on an Lab space, and interpolates respective points by polyhedrons. The polyhedrons on the Lab space obtained in this manner specify a color reproduction range of inks used in color gamut estimation.

<Output Estimation>

As the output estimation method in the printer models 4013 and 4813 in the above embodiments, the conventional output estimation method using a neural network may be used, or the Neugebauer equation using the Yule-Nielsen correction equation may be used in addition to that in the above embodiments. That is, the output estimation method is not particularly limited as long as it can predict an output using ink spectral reflectance data and dot quantities.

<Transmission Data>

In the above embodiments, the user sends as data the color sample name or image information to the server side. Alternatively, a color gamut shape itself, monitor profile, or actual print may be sent without the intervention of the server apparatus. That is, the data format is not particularly limited as long as color information that the user wants to output can be determined. Note that the color gamut shape is a "shape" on a three-dimensional space, and an ink combination having a color gamut including this is searched for. Also, the monitor profile describes a conversion formula used to convert the RGB values of image data into Lab values. Using this conversion formula, since Lab values upon changing data within the range of (R, G, B)=(0, 0, 0) to (255, 255, 255) can be determined, the color gamut shape that can be expressed by a monitor can be calculated. Using this monitor color gamut information, an optimal ink combination can be calculated.

<User Interface>

In the seventh and eighth embodiments, FIGS. 29 and 30 show examples of the UIs. However, the present invention is not limited to such specific UIs. For example, the color gamut shape is displayed as a wire frame model on the Lab space, but may be displayed in a display format on another color space such as an XYZ space or the like, and a three-dimensional polygon model may be used in place of the wire frame model. As for the light source information selection areas 4305 and 5005, the user selects a desired light source. Alternatively, a file that describes light source data in advance may be read. That is, the UI configuration is not particularly limited as long as the user can desirably make setups required for the embodiments.

<Number of Inks>

In the above embodiments, the number of inks used in a print process is six. Of course, the present invention is not limited to six colors, and the number of inks can be freely set in correspondence with an environment such as a printer to be used, and the like. Not all inks to be used need be customized. For example, two color inks may be fixed, and the remaining four inks may be customized.

As described above, according to the seventh and eighth embodiments, color agents required to reproduce a target color can be automatically set.

<Wavelength Calculation Range and Sampling Interval>

In the first to eighth embodiments, spectral reflectance need not always have a limited wavelength range and sampling intervals. In order to improve the error evaluation precision, the wavelength range may be broadened, or the sampling intervals may be narrowed. Conversely, the wavelength range may be narrowed, and the sampling intervals may be broadened to reduce the calculation volume. That is, the wavelength range and sampling intervals can be changed in correspondence with the precision and calculation volume of user's choice. Also, a user interface used to set these parameters may be provided.

<Color Space>

In the first to eighth embodiments, mixed color prediction based on equations (4) to (6), and predicted value correction based on equation (7) are made using spectral reflectance. However, these processes may be made using physical quantities other than spectral reflectance. For example, the ink density, ink tristimulus values (XYZ, L*a*b*), and the like may be used. Even when these physical quantities are used, the influence of dot gain can be handled as in the above embodiments. However, in such case, mixed color prediction based on the KM theory cannot be used, and mixed color prediction suited to the physical quantity is adopted.

<Correction Patch>

In the correction patches used in the first to eighth embodiments, primary color correction patches are single-color patches in 20%-increments from 0% to 100% (dot quantity), and ink overlap correction patches are secondary to quartic color patches in 20%-increments from 0% to 100% (dot quantity). However, the present invention is not limited to such specific patches. The interval of changing the dot quantity may be decreased to further improve the prediction, or may be increased to decrease the number of patches to be output. The dot quantities of all patches need not change in equal increments. For ink which exhibits strong nonlinearity between the dot quantity and spectral reflectance, the interval of changing the dot quantity may be decreased near a predetermined dot quantity. For example, in addition to patches in 20%-increments from 0% to 100%, patches having dot quantities=10%, 30%, and 50% may be added for only cyan ink.

<Order of Ink Overlap Correction Formula>

Furthermore, in the first to eighth embodiments, the ink overlap correction formula of equation (7) uses a polynomial up to m-th order of spectral reflectance $R_{p,\lambda}$ estimated by the KM theory, and $(K/S)_{i,j,\lambda}$ and $(K/S)_{k,l,m,\lambda}$ as (K/S) which also considers secondary and tertiary colors. Alternatively, in order to obtain the precision and calculation volume of user's choice, the order of $R_{p,\lambda}$ may be changed, (K/S) may be limited to secondary color, or quartic or higher color information may be used.

Another Embodiment

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the claims.

The invention claimed is:

1. A color processing apparatus comprising:
a primary-color correction unit configured to correct primary colors of recording agents used on the basis of dot quantities;
an estimation unit configured to estimate mixed colors corresponding to respective combinations of dot quantities of the color agents used, using the primary colors corrected by said primary-color correction unit;
a multi-order color correction unit configured to correct the mixed colors estimated by said estimation unit using correction coefficients which are determined based on differences between actual colors of patches and colors of the patches as estimated by said estimation unit; and
a prediction unit configured to predict a color gamut that can be reproduced by the recording agents on the basis of the mixed colors corrected by said multi-order color correction unit.

2. A color processing method comprising:
a primary-color correction step of correcting primary colors of recording agents used on the basis of dot quantities;
an estimation step of estimating mixed colors corresponding to respective combination of dot quantities of the color agents used using the primary colors corrected in the primary-color correction step;
a multi-order color correction step of correcting the mixed colors estimated in the estimation step using correction coefficients which are determined based on differences between actual colors of patches and colors of the patches as estimated in the estimation step; and
a prediction step of predicting a color gamut that can be reproduced by the recording agents on the basis of the mixed colors corrected in the multi-order color correction step.

3. The method according to claim 2, wherein the primary-color correction step includes steps of:
generating a lookup table by estimating a relationship between a dot quantity and spectral reflectance on the basis of spectral reflectance at a predetermined dot quantity of a color agent used; and
correcting a primary color of the color agent using the lookup table.

4. The method according to claim 3, wherein the estimation step includes a step of estimating the spectral reflectance of the mixed color on the basis of spectral reflectance data of respective color agents obtained in the primary-color correction step using Kubelka-Munk theory.

5. The method according to claim 2, further comprising:
a display step of displaying the color gamut predicted in the prediction step on a three-dimensional space based on a predetermined color system.

6. The method according to claim 5, further comprising:
a setting step of setting a desired combination of dot quantities; and
a step of estimating a mixed color corresponding to the combination of the dot quantities set in the setting step in the primary-color correction step, the estimation step and the multi-odder color correction step, and indicating a position of the estimated mixed color on the three-dimensional space displayed in the display step.

7. The method according to claim 2, further comprising:
a determination step of determining whether colors of respective pixels represented by designated image data fall inside or outside the color gamut predicted in the prediction step.

8. The method according to claim 7, further comprising:
a step of binarizing and displaying the respective pixels of the image data depending on whether the pixels fall inside or outside the predicted color gamut.

9. A computer-readable memory medium which stores a control program for making a computer execute a color processing method comprising:
a primary-color correction step of correcting primary colors of recording agents used on the basis of dot quantities;
an estimation step of estimating mixed colors corresponding to respective combination of dot quantities of the color agents used using the primary colors corrected in the primary-color correction step;
a multi-order color correction step of correcting the mixed colors estimated in the estimation step using correction coefficients which are determined based on differences between actual colors of patches and colors of the patches as estimated in the estimation step; and
a prediction step of predicting a color gamut that can be reproduced by the recording agents on the basis of the mixed colors corrected in the multi-order color correction step.

* * * * *